US010660303B2

(12) United States Patent
Volin

(10) Patent No.: US 10,660,303 B2
(45) Date of Patent: May 26, 2020

(54) UNIQUE TWELVE-DIFFERENT-APPLICATION UMBRELLA SYSTEM, HAVING PIVOTABLE POLE RECEIVER SYSTEMS, ROTATABLE POLE-RECEIVER-LOCKING ADJUSTOR SYSTEM, CURVED-SURFACE ADAPTOR SYSTEMS, TRAILER-HITCH ADAPTOR SYSTEM, AND SPIRAL-SHOVEL SPIKE SYSTEM

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 204 days.

(21) Appl. No.: 16/033,877

(22) Filed: Jul. 12, 2018

(65) Prior Publication Data

US 2019/0029216 A1 Jan. 31, 2019

Related U.S. Application Data

(60) Provisional application No. 62/536,471, filed on Jul. 25, 2017.

(51) Int. Cl.
*A01K 1/00* (2006.01)
*A01K 1/02* (2006.01)
(Continued)

(52) U.S. Cl.
CPC .......... *A01K 1/0245* (2013.01); *A01K 1/0005* (2013.01); *A01K 1/0017* (2013.01);
(Continued)

(58) Field of Classification Search
CPC ...... A01K 1/02; A01K 1/0236; A01K 1/0245; A01K 1/03; A01K 1/0272; A01K 1/0281;
(Continued)

(56) References Cited

U.S. PATENT DOCUMENTS 4,023,698 A 5/1977 Joseph
4,762,085 A 8/1988 Ondrasik
(Continued)

*Primary Examiner* — Richard T Price, Jr.

(57) ABSTRACT

A multi-pet locking-head-and-locking-tail-push-rod pet crate comprises: a handle bridge, a handle channel molded inside the handle bridge for containing grooming tools, handle clasps respectively molded in the handle bridge for fastening poop bags thereto, a top panel, a bottom panel, a left panel, a right panel, a front panel, a rear panel, at least one divider, panel-locking hooks and clamps for hooking and clamping the panels together, a slanted tray for draining urine, urine-storing gutters and ridges molded around the tray for supporting pet paws and for keeping pets away from urine, top and bottom low-friction rails welded to the front panel, multi-position door-glider-locking recesses formed in the bottom low-friction rail for locking the auto-indexing multi-position door gliders and for adjusting horizontal or slanted and stationary or moving positions of the auto-indexing multi-position doors, first and second auto-indexing multi-position doors inserted between the top and bottom low-friction rails, first and second auto-indexing multi-position door gliders respectively cast to the first and second doors for horizontally or slantedly being locked in the multi-position door-glider-locking recesses to horizontally or slantedly lock said first and the second doors in multiple horizontal or slanted and stationary or moving positions, first and second push-rods respectively and movably attached to the first and second doors, first and second door-locking push-rod heads respectively cast to the first and second push-rods for locking the first and second doors together, and first and second multi-position door-locking push-rod tails respectively cast to the first and second push-rods for locking and aligning the first and second doors to the front panel and for adjusting multiple positions of the first and second doors.

20 Claims, 62 Drawing Sheets

(51) Int. Cl.
*A01K 13/00* (2006.01)
*A01K 1/01* (2006.01)
*A01K 1/03* (2006.01)

(52) U.S. Cl.
CPC .......... *A01K 1/0107* (2013.01); *A01K 1/0114* (2013.01); *A01K 1/029* (2013.01); *A01K 1/034* (2013.01); *A01K 13/00* (2013.01)

(58) Field of Classification Search
CPC ........ A01K 1/032–1/034; A01K 1/035; A01K 1/0017; A01K 1/0035; A01K 31/00; A01K 31/02; A01K 31/005; A01K 31/06; A01K 31/07; A01K 31/08; A01K 31/10
USPC ........ 119/428–431, 452–456, 472, 474, 461, 119/481, 491, 501, 502, 496–499, 119/512–514, 524
See application file for complete search history.

(56) References Cited

U.S. PATENT DOCUMENTS

| | | |
|---|---|---|
| 4,763,606 A | 8/1988 | Ondrasik |
| 5,233,939 A | 8/1993 | Randolph |
| 5,373,810 A | 12/1994 | Martin |
| 6,192,834 B1 | 2/2001 | Kolozsvari |
| 6,681,720 B1 | 1/2004 | Skurdalsvold |
| 6,691,463 B1 | 2/2004 | Richmond |
| 6,883,463 B2 | 4/2005 | Link |
| 7,059,274 B2 * | 6/2006 | Cheng ............ A01K 1/03 119/452 |
| 7,213,368 B1 | 5/2007 | Eliasen |
| 7,918,188 B1 | 4/2011 | Harper |
| D652,999 S | 1/2012 | Jakubowski |
| 8,127,719 B2 | 3/2012 | Jakubowski |
| 8,141,517 B2 | 3/2012 | Shimoda |
| 8,210,127 B2 | 7/2012 | Kaneda |
| 8,230,816 B2 | 7/2012 | Hirokawa |
| 8,261,490 B2 | 9/2012 | Flannery |
| D673,737 S | 1/2013 | Cantwell |
| 8,408,416 B2 | 4/2013 | Cheng-Lung |
| 8,578,656 B2 | 11/2013 | Yates |
| 8,733,292 B2 * | 5/2014 | Nichols ............ A01K 1/03 119/452 |
| 8,899,184 B2 * | 12/2014 | Nagata ............ A01K 1/031 119/452 |
| 8,925,492 B2 | 1/2015 | Cantwell |
| 8,985,058 B2 | 3/2015 | Cantwell |
| 9,399,886 B2 | 7/2016 | Link |
| 9,399,889 B2 | 7/2016 | Cantwell |
| 9,420,757 B2 | 8/2016 | Cantwell |
| 9,506,286 B1 | 11/2016 | Flannery |
| 2010/0282179 A1 | 11/2010 | Ho |
| 2012/0186530 A1 | 7/2012 | Cantwell |

* cited by examiner

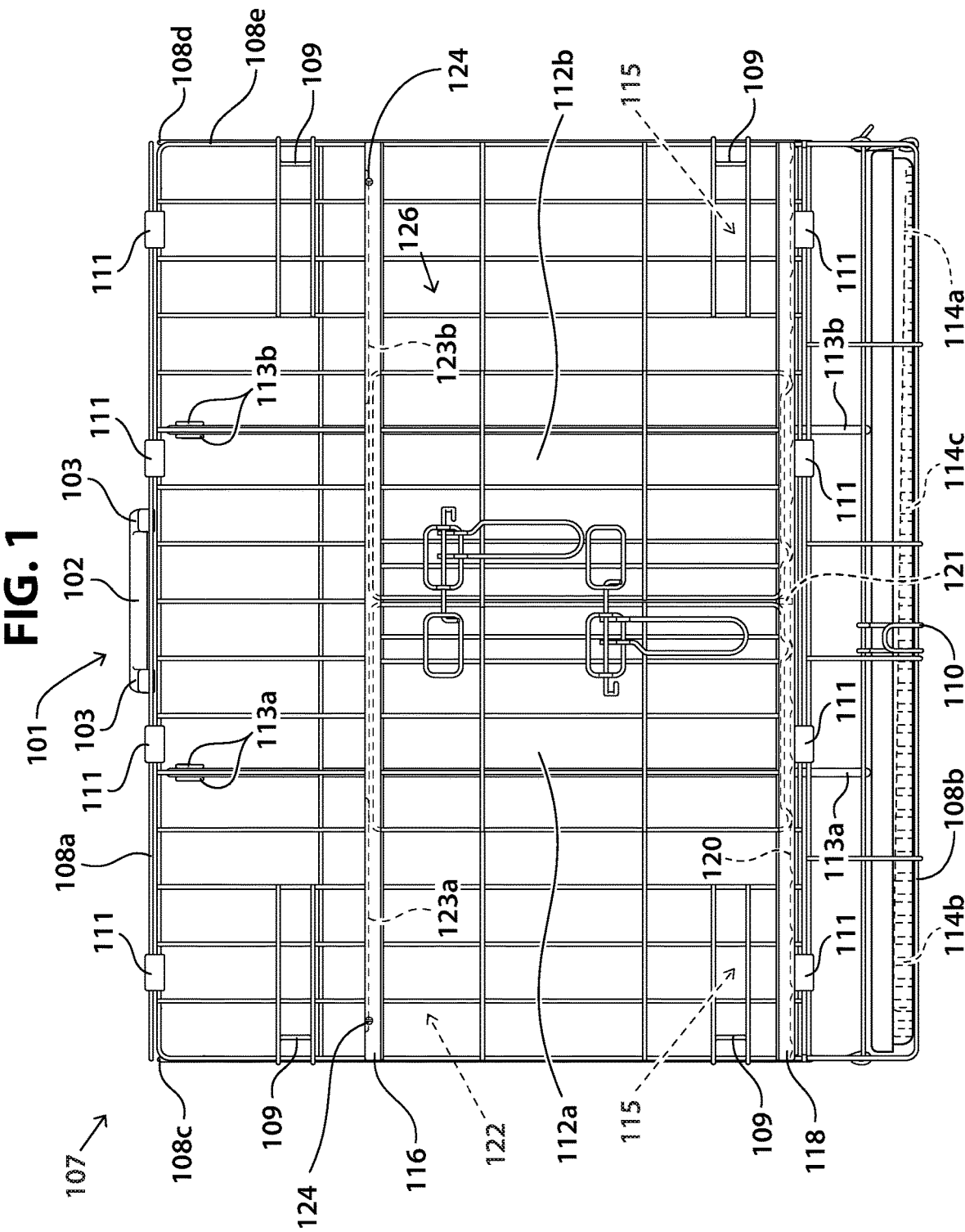

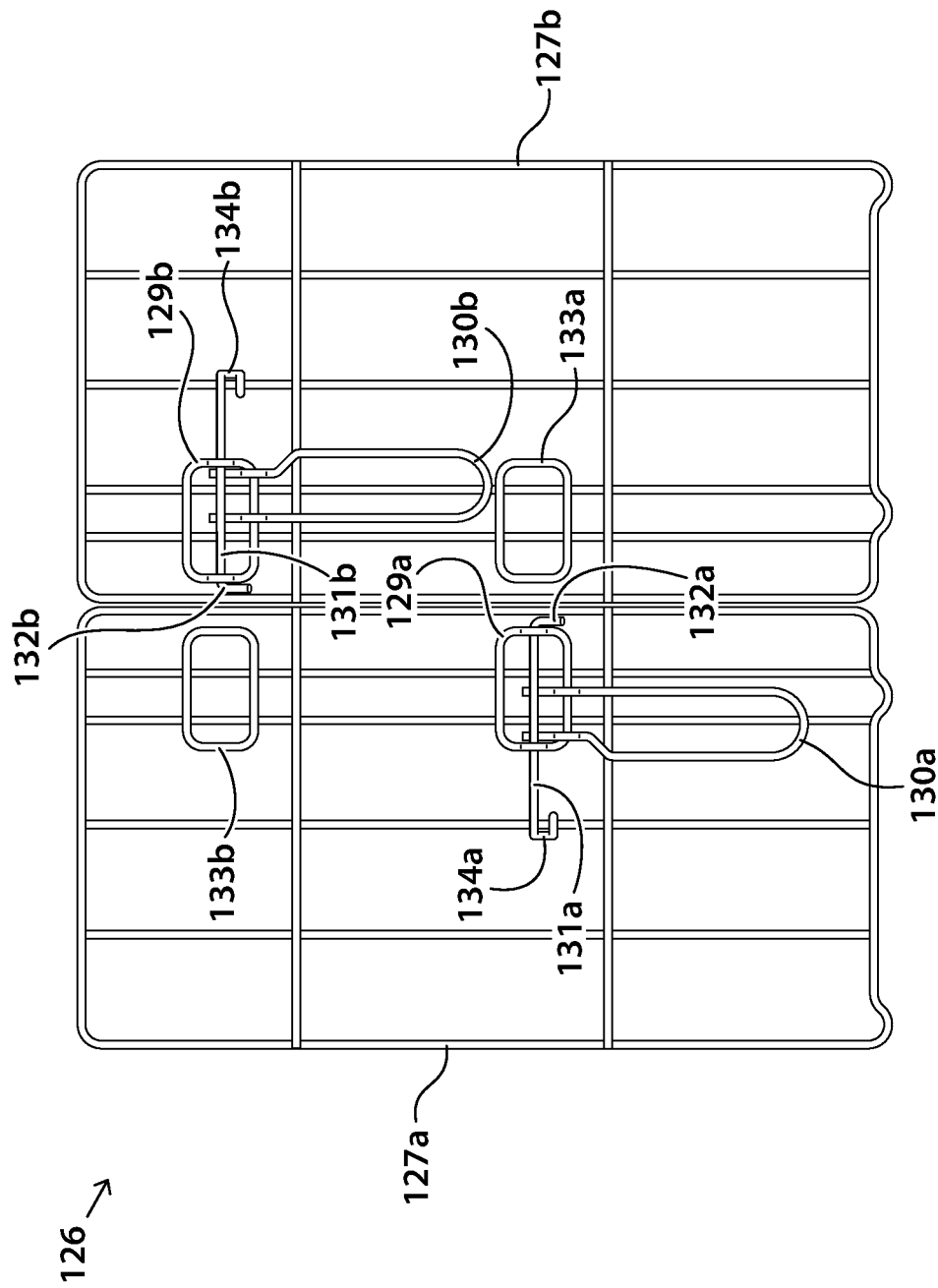

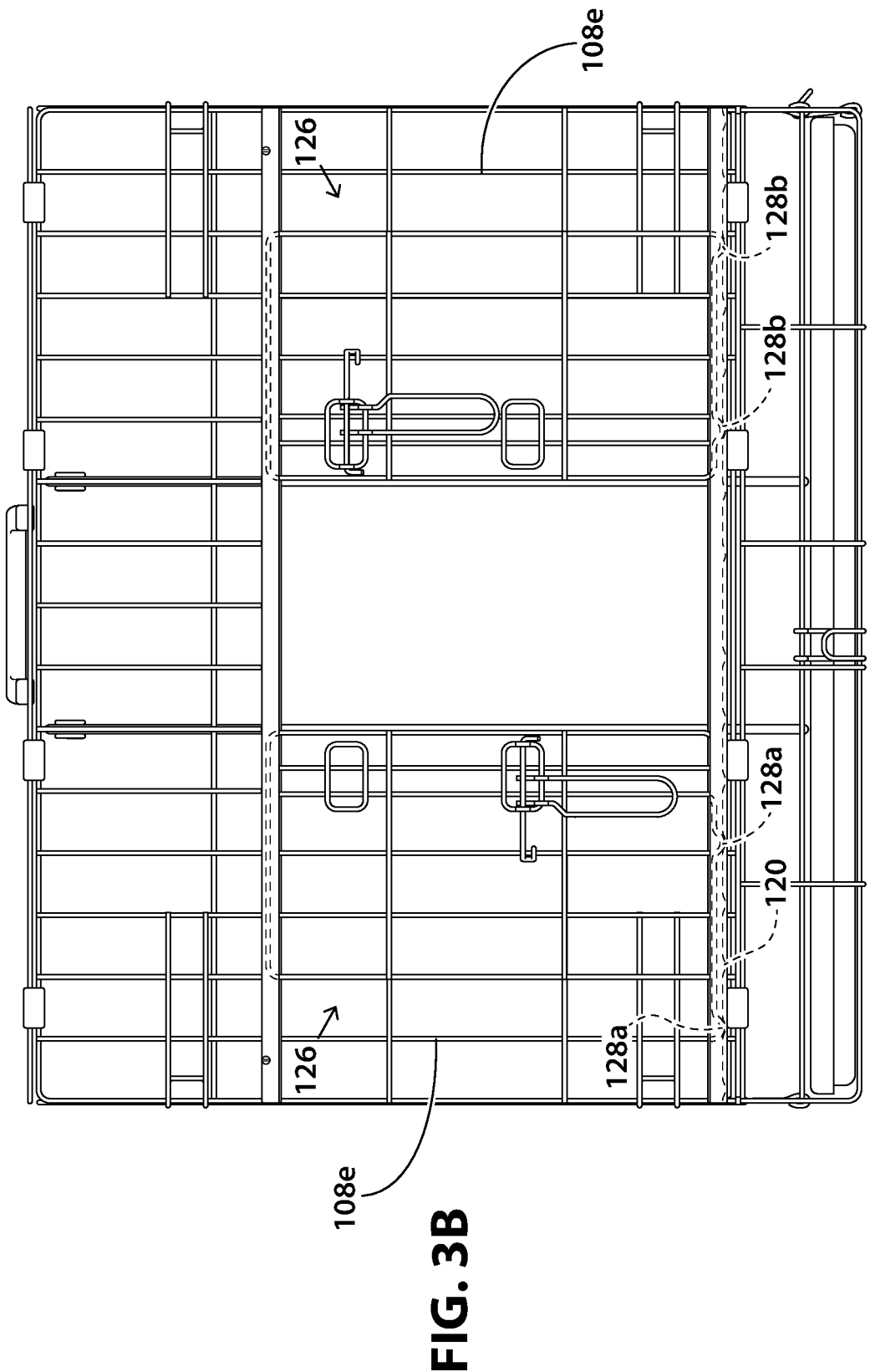

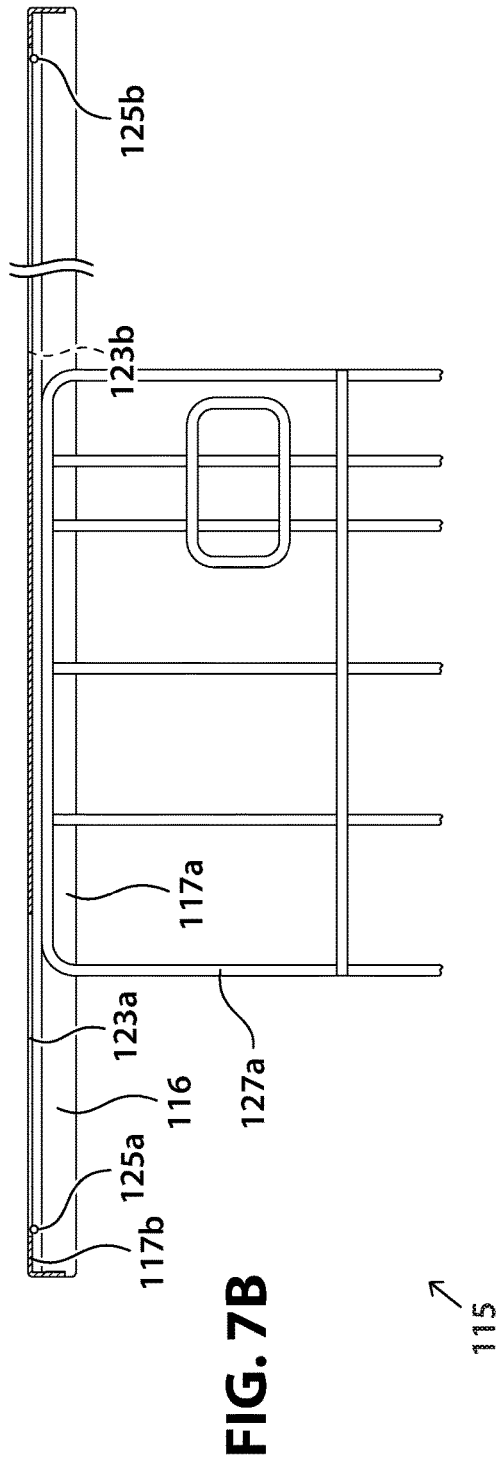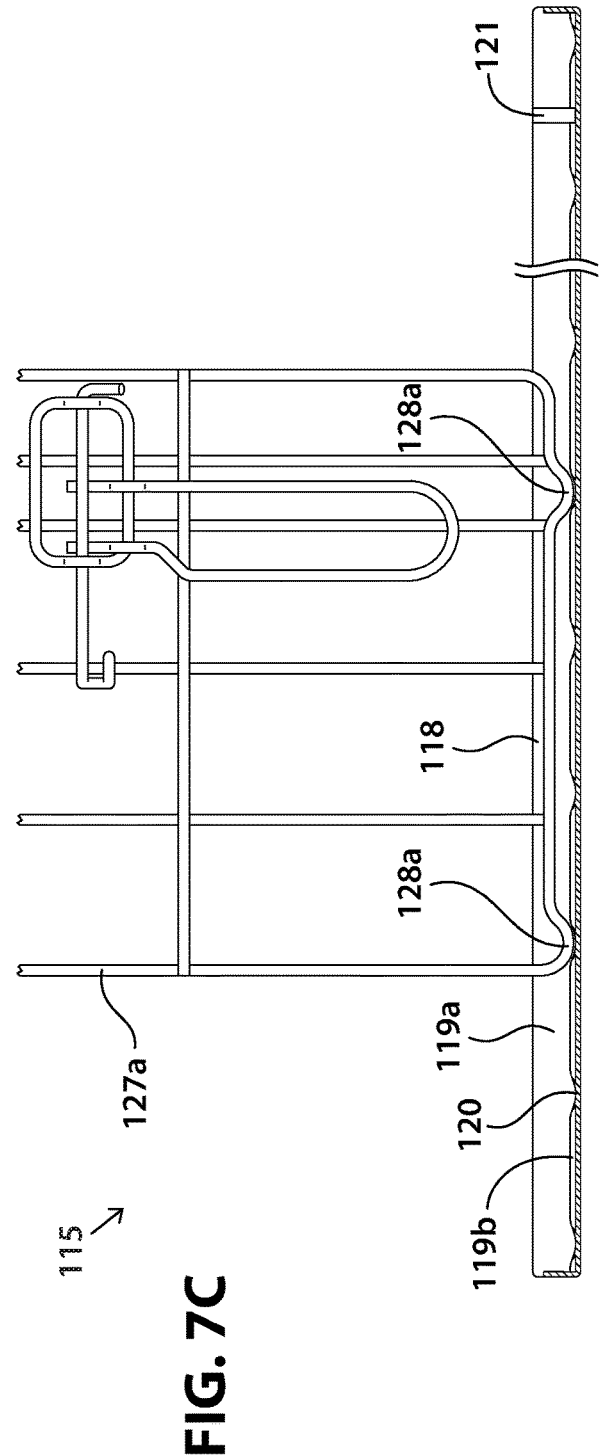

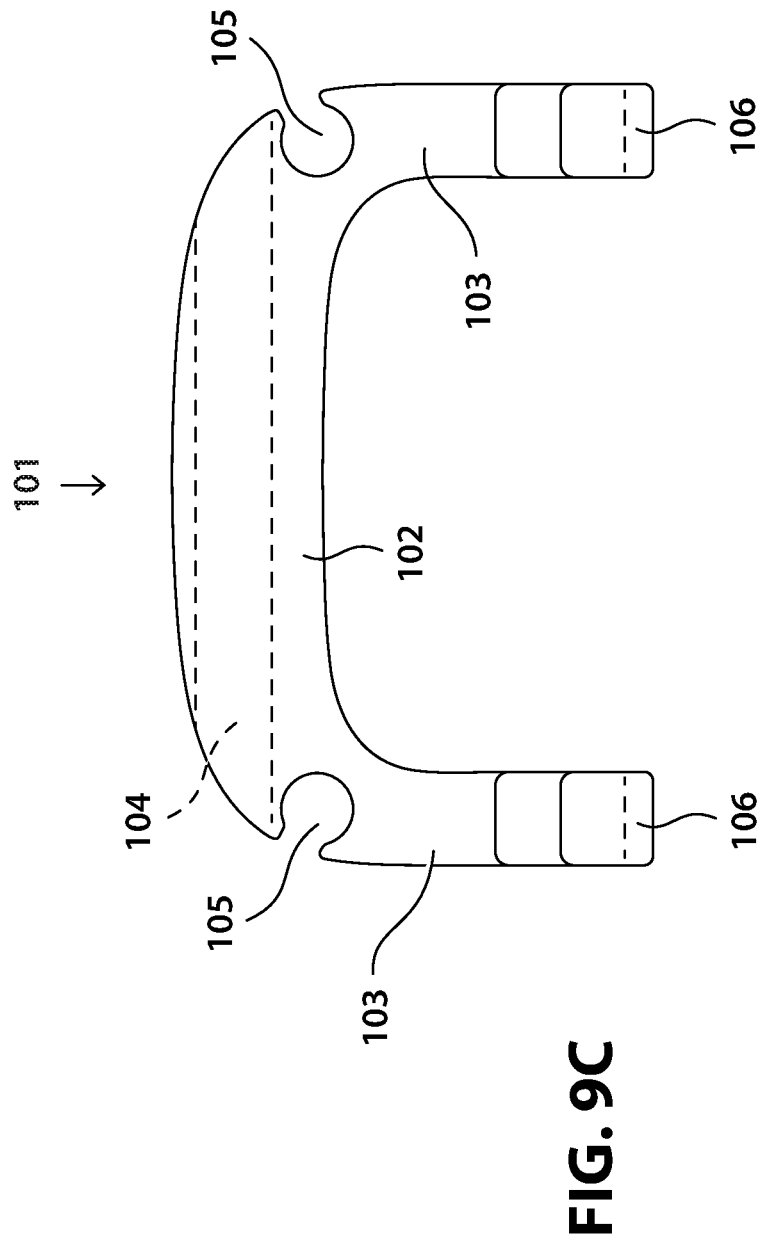
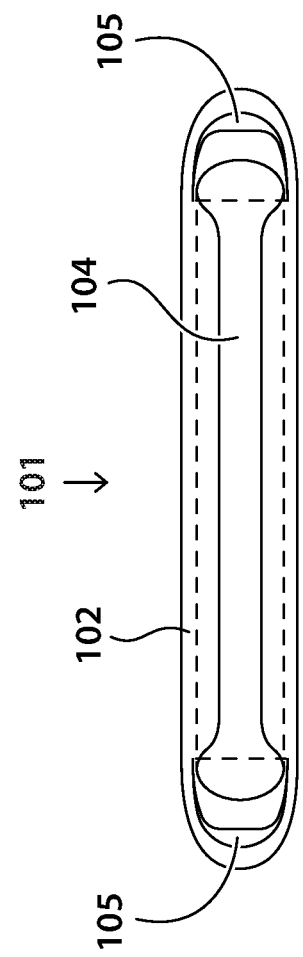
FIG. 9C
FIG. 9D

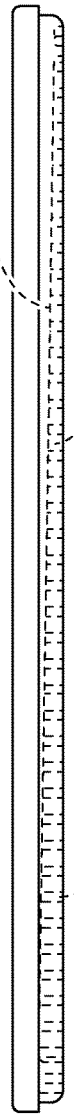
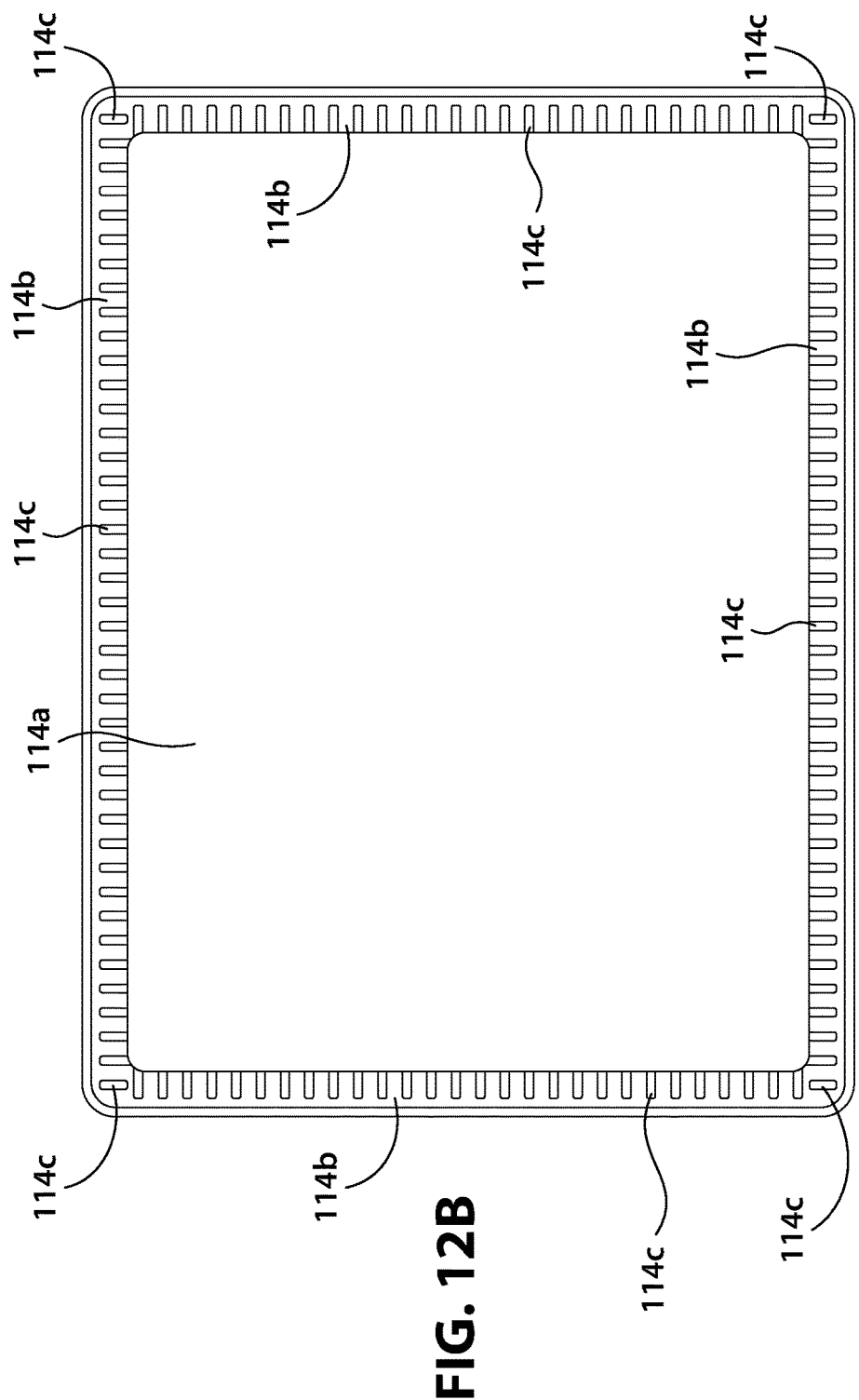
FIG. 12A
FIG. 12B

UNIQUE TWELVE-DIFFERENT-APPLICATION UMBRELLA SYSTEM, HAVING PIVOTABLE POLE RECEIVER SYSTEMS, ROTATABLE POLE-RECEIVER-LOCKING ADJUSTOR SYSTEM, CURVED-SURFACE ADAPTOR SYSTEMS, TRAILER-HITCH ADAPTOR SYSTEM, AND SPIRAL-SHOVEL SPIKE SYSTEM

1. FIELD OF THE INVENTION

The present invention relates to a pet crate, which is cheap to produce, is easy to ship as one unit, requires little assembly, and can be quickly and easily be unfolded. Particularly, the present invention relates to a multi-pet locking-head-and-locking-tail-push-rod pet crate, comprising:
1) Grooming-tool-poop-bag handle system,
2) Low-friction door-rail system,
3) Quick-assembly door system, and
4) Multi-position-double-locking-head-and-locking-tail multi-position-double-push-rod multi-position-double-door system.

2. DESCRIPTION OF THE PRIOR ART

A number of pet crates have been introduced.

U.S. Pat. No. 4,023,698, issued 1977 May 17, to Raymond Joseph, relates to a container, such as a tote box or pallet heightening container comprising an opening in one of its side walls, and at least one movable shutter for closing said opening. The shutter is hingedly mounted at its bottom edge by means of elongated rings to the bottom edge of the opening or of the next underlying shutter, if any. Side lock bolts are rigidly secured to the upper portion of each shutter and adapted to engage through notches a U-sectioned lateral slideway running along the lateral edges of the opening. Detent means are provided for holding the shutter in its open position.

U.S. Pat. No. 4,762,085, issued 1988 Aug. 9, to Vladimir J. Ondrasik, relates to a collapsible wire cage having opposite side walls, upper and lower walls, and end walls of wire grille construction defining an enclosure. Each end wall is pivoted at one side edge to a respective one of the side walls and has a releasable locking mechanism at its other side edge for releasably securing it to the other side wall. The upper and lower walls are each formed in two panel sections, one of which is pivoted to one of the side walls and the other of which is pivoted to the other side wall. The panel sections are pivotally connected together to allow them to pivot between an expanded position in which they are coplanar and a folded position in which they are pivoted inwardly and flattened against one another to collapse the cage. A releasable locking mechanism is provided on each of the collapsible walls to retain them in their expanded, coplanar position. In an alternative, the side walls may be collapsible with the end walls pivotally secured to the upper and lower walls.

U.S. Pat. No. 4,763,606, issued 1988 Aug. 16, to Vladimir J. Ondrasik, describes an animal cage comprising an outer frame defining the peripheral edges of a box like enclosure, and a series of wall panels for releasably mounting in respective faces of the enclosure to form spaced side, end, and top and bottom walls of the enclosure. Each panel is held in the surrounding frame by spring loaded latch pins adjacent each end of the frame which are urged into corresponding openings in the frame and can be released at either end for swinging the panel open about the opposite end latch pin, or released at both ends for removing the panel from the frame. The frame is releasably securable to one or more additional frames arranged one on top of the other, side to side, or end to end. The internal wall panels may be removed to increase the height, width or length of the enclosure, or left in place to provide an assembly of separate cages for different animals U.S. Pat. No. 5,233,939, issued 1997 Dec. 30, to Arthur J. Randolph, describes an animal cage comprising an outer frame defining the peripheral edges of a box like enclosure, and a series of wall panels for releasably mounting in respective faces of the enclosure to form spaced side, end, and top and bottom walls of the enclosure. Each panel is held in the surrounding frame by spring loaded latch pins adjacent each end of the frame which are urged into corresponding openings in the frame and can be released at either end for swinging the panel open about the opposite end latch pin, or released at both ends for removing the panel from the frame. The frame is releasably securable to one or more additional frames arranged one on top of the other, side to side, or end to end. The internal wall panels may be removed to increase the height, width or length of the enclosure, or left in place to provide an assembly of separate cages for different animals.

U.S. Pat. No. 5,373,810, issued 1994 Dec. 20, to Edwin R. Martin, discloses a combination cage locking and latching device made from a light gauge wire or molded plastic which is rotatably fixed to the cage door top horizontal wire. The device consists of shaped wire having a locking portion, a latching portion, and a "U"-shaped mounting portion formed between the locking portion and the latching portion at a position nearer to the locking portion. The locking portion is formed sufficiently long to extend below and to engage a first horizontal rod to prevent unauthorized opening, and the latching portion is formed and positioned to extend outside the cage for grasping and pulling the cage door upwardly to an open position and sufficiently long for engaging a second horizontal rod of said cage for holding the cage door in an open position.

U.S. Pat. No. 6,192,834, issued 2003 Jan. 7, to Kevin Kolozsvari, describes a collapsible cage for housing an animal having an expanded and a collapsed configuration. The collapsible cage comprises a top platform and a bottom platform defining the ceiling and floor of said collapsible cage, a first accordion wall, a second accordion wall, a first end wall, and a second end wall, which collectively define a cage interior when the collapsible cage is in an expanded configuration. The first end wall rotatably engages the bottom platform and the second end wall rotatably engages the top platform. During the transition of the collapsible cage from the expanded configuration to the collapsed configuration, the first and second end walls and the first and second accordion walls pivot into the cage interior and the top platform approaches the bottom platform.

U.S. Pat. No. 6,681,720, issued 2004 Jan. 28, to Scott A. Skurdalsvold, relates to a wire cage which is operable between an expanded position and a folded position which includes a top wall and a bottom wall, a first sidewall, a second sidewall, a front wall and a rear wall attach to the bottom and top walls. The front and rear walls contain rounded sides. The cage includes an entrance door. A pass through door is mounted on the entrance door. In order to open the pass through door, the entrance door must be closed and locked. The cage top wall optionally contains a top wall door hinged on the edge of the top wall so that the user can easily access the cage from the top wall. The top door can be rotated so that it rests flush with the cage sidewall. A pan is inserted over the bottom surface.

U.S. Pat. No. 6,691,463, issued 2004 Feb. 17, to Robert A. Richmond, relates to a kennel door apparatus for selectively "opening" and "closing" a kennel door, the kennel door is sized to cover an opening located in a kennel wall between a kennel pen and a common kennel area for selective access thereto. A door opening attachment may be used to cover the opening in the kennel wall. The kennel door apparatus is adapted for horizontal and vertical sliding door actuation. First and second opposing channel guides are secured to opposing sides of a protective panel. A sliding door is slidably received between the wall confronting side and the panel side of the opposing channel guides.

U.S. Pat. No. 6,883,463, issued 2005 Apr. 26, to David B. Link, relates to an animal enclosure, having a top wall panel, a bottom rack disposed opposite to the top wall panel, two opposite first side wall panels, a third side wall panel and a fourth side wall panel. Each of the first side wall panels has a top edge hinged to the top wall panels and a bottom edge hinged with the bottom rack at a first elevation. The second side wall panel disposed between and adjacent to the first side wall panels has a bottom edge hinged to the bottom rack at a second elevation. The third side wall panel is opposite to the second side wall panel and adjacent to the first side wall panels. The third side wall has a bottom edge hinged to the bottom rack at a third elevation. The first, second and third elevations are at different from each other such that the top wall panel, the first, second and fourth side wall panels can be folded stacked with each other on the bottom rack.

U.S. Pat. No. 7,213,368, issued 2007 May 8, to Mogens Eliasen, relates to a canopy with an automatic roof structure having improved structural stability. The canopy comprises a plurality of vertical support posts connected by trusses. A plurality of roof support rods extend from the vertical support posts to a central hub. At least one of the roof support rods has a cantilever support extending from the associated slide or thereabouts to a pivot on the roof support rod. The canopy also comprises central truss supports and stubs extending from the connection of the lateral trusses to the central hub. The canopy has an expanded, open configuration and a collapsed, closed configuration.

U.S. Pat. No. 7,918,188, issued 2011 Apr. 5, to Mike Harper, outlines a cage for housing an animal comprising a top wall, bottom, first and second sidewalls, a front wall and a rear wall. A door is disposed in at least one of the walls and is hinged for movement between an open and closed position. The door is mounted in a wall having a doorway. The door includes a plurality of loops on each side of the door. The wall includes a plurality of loops along each side of the doorway. The door loops are positionable adjacent the wall loops when the door is disposed within the doorway to form mating hinge structures. A hinge pin is selectively insertable into either of the door loops on one edge of the door together with the corresponding loops on the wall, to thereby hingedly mount the door to the wall for door swinging movement in either a first direction or a second direction with respect to the wall.

U.S. Pat. No. 8,127,719, issued 2012 Mar. 6, to Todd M. Jakubowski, outlines a pet crate is having a blow molded polymeric base along with side, front and top panels made with strong, lightweight polymeric frame members and grates. The grates are used in the front, back and side panels to provide strength as well as a large open mesh area for better visibility and pet comfort. The mesh preferably is provided as hinged access panels at least on the sides. The front and top of the crate are also openable for access to the pet crate. The pet crate is collapsible to a folded, flat condition by unlatching the front panel and stowing it along the inside of the top panel and releasing latches between the top and back panels and the side panels. The side panels, back panel and top panel can then be collapsed inwardly onto one another to form a generally flat, stowed configuration for the pet crate.

U.S. Pat. No. 8,141,517, issued 2012 Mar. 27, to Naoki Shimoda, refers to a pet pen comprising a plurality of enclosing members with each enclosing member having a wall body and an opening end. The enclosing members form the pen by overlapping a portion of the wall body at two or more of the opening ends, and the pen width can be adjusted by adjusting the length of the overlapping portion. The pen width can be adjusted without removing an enclosing member.

U.S. Pat. No. 8,210,127, issued 2012 Jul. 3, to Daisuke Kaneda, refers to a pet restriction device comprising an entry panel, at least one door located on the entry panel and comprising a door axis, and a locking device. The locking device comprises a handle, two bars, and two receivers. The handle is coupled to the door and located on the opposite side from the door axis. One end of each of the two bars is coupled to the handle. The two receivers are coupled to the entry panel, and each of the two receivers receives one of the two bars.

U.S. Pat. No. 8,230,816, issued 2012 Jul. 31, to Satoshi Hirokawa, refers to a self-supporting pet barrier comprising a front panel and two side panels, each panel having floor-contacting surfaces preferably to which a friction reducing substance has been applied is disclosed. The front and side panels preferably are attached so that the side panels can be positioned from generally perpendicularly to the front panel in use to a folded position adjacent said front panel for storage or travel. A generally triangular stabilizing leg may protrude forward from the plane of the front panel and can be attached in either the side panel or front panel.

U.S. Pat. No. 8,261,490, issued 2012 Sep. 11, to Mark A. Flannery, demonstrates a barrier for the inside of a home. The barrier includes two partitions that slide relative to each other to increase and decrease a distance between ends of the barrier. The partitions slide into and out of confronting relationships with each other. The partitions engage each other at upper and lower locations and further at a medial location where an elongate member of one partition is received in a tube engaged to the other partition. A threaded piece upon being turned brings pressure to bear upon an end of the tube such that the partitions can be incrementally expanded apart and thereby pressurized between two locations within the home so as to block off one portion of the home. The threaded piece is slideable along the elongate member.

U.S. Pat. No. 8,408,416, issued 2013 Apr. 2, to Wu Cheng-Lung, demonstrates a crate comprising a base, sides, front, and back that form an enclosure. The front includes and opening and a door positioned within the opening in the closed position. The door is hung by hinges, which are associated with uninterrupted rails on the top of the crate. To open the crate, the bottom of the door is swung outward and upward to pivot the door toward the horizontal position on the hinges. Then, the door can be slid into the enclosure along the uninterrupted guides. The door may also include locks that can secure the door in the closed position. Both of the sides or both the front and back can be releasably connected with the top and pivotable into the base. After both sides or both the front and back are pivoted into the base, the remaining walls and top can be pivoted to fold into the base as a unit.

U.S. Pat. No. 8,578,656, issued 2013 Nov. 12, to Adam John Yates, demonstrates a barrier comprising an expandable width barrier having opposing first and second ends. A locking arm is pivotably coupled to the expandable width barrier at the first end and slidably coupled to the expandable width barrier at the second end. The locking arm may be an adjustable-length construction. The pivoting of the locking arm causes the barrier to move between locked and unlocked states. When the locking arm is pivoted to lock the barrier, it causes the barrier to linearly expand a supplemental amount and fits the barrier to opposing sides of a passageway opening.

U.S. Pat. No. 8,925,492, issued 2015 Jan. 6, to Brad Cantwell, demonstrates a wire crate comprising a top panel, a bottom panel, a front panel, a back panel, and a pair of side panels oppositely disposed from one another. The crate also includes a front opening defined in the front panel. The front opening is configured to provide access to the interior of the crate. The crate further includes a pair of tracks coupled to each side of the front opening and a door slidably coupled to the pair of tracks. The door slides along the pair of tracks between an open position and a closed position.

U.S. Pat. No. 8,985,058, issued 2015 Mar. 24, to Brad Cantwell, defines a wire crate comprising a top panel, a bottom panel, a front panel, a back panel, and a pair of side panels oppositely disposed from one another. The crate also includes a front opening defined in the front panel. The front opening is configured to provide access to the interior of the crate. The crate further includes a pair of tracks coupled to each side of the front opening and a door slidably coupled to the pair of tracks. The door slides along the pair of tracks between an open position and a closed position.

U.S. Pat. No. 9,399,886, issued 2016 Jul. 26, to David Link, defines a camming member for a door comprising a camming surface which lifts the door as the door is traversed from an opened position to a closed position. The lifting movement of the door caused by the camming member facilitates one or more latches used to reinforce a periphery of the door to be engaged without further user intervention.

U.S. Pat. No. 9,399,889, issued 2016 Jul. 26, to Brad Cantwell, defines a door assembly for an animal enclosure. The assembly includes a door frame having a plurality of interconnected horizontal and vertical wires that define an opening for an animal to pass therethrough. The assembly also includes a door configured to move between an open position and a close position relative to the door frame. A latch is pivotally coupled to the door and includes a mechanism that is removably coupled to the door frame. The assembly further includes a first vertical wire and a second vertical wire of the door. A first guide wire and a second guide wire are coupled to the door frame. The first vertical wire is coupled to and moves along the first guide wire between the open and close positions, and the second vertical wire is coupled to and moves along the second guide wire between the open and close positions.

U.S. Pat. No. 9,420,757, issued 2016 Aug. 23, to Brad Cantwell, defines an animal enclosure including a plurality of members defining an interior of the enclosure. One of the plurality of members includes a first member having a frame structure and door assembly formed by a plurality of interconnected horizontal and vertical wires. At least two of the horizontal wires of the frame structure form a hook positioned inside the defined opening. The door assembly is coupled to the frame and moves between an open and closed positions. The door assembly includes a first door and a second door removably coupled to one another. The enclosure also includes a latch assembly for releasing the door assembly from the frame structure. In the closed position, at least one horizontal wire of the first door and at least one horizontal wire of the second door are coupled to the hooks formed by the at least two horizontal wires of the frame structure.

U.S. Pat. No. 9,506,286, issued 2016 Nov. 29, to Mark A. Flannery, defines a barrier employed to keep children and/or pets in or out of certain areas in the house. The barrier includes four panels. Two main panels slide parallel to each other to lengthen or shorten the barrier as a whole. Two side panels stabilize the main panels and extend to the front and rear faces of the main panels to provide a self-supporting in-house barrier. Each of the panels includes a wooden frame. The wood lends less weight, less sharp edges, and more pleasing aesthetics than, for example, a metal gate. Legs are connected to the side panels to further stabilize the side panels and main panels.

U.S. Pat. No. D652,999, issued 2012 Jan. 24, to Todd M. Jakubowski, depicts an ornamental design for a for a pet crate.

U.S. Pat. No. D673,737, issued 2013 Jan. 1, to Brad Cantwell, depicts an ornamental design for a wire animal containment system.

U.S. Publication No. 20100282179, published 2010 Nov. 11, by Ho Ying-Kuan, reveals a combination-type pet cage which is constructed as follows. Two lateral panels are assembled to a base by inserting flanges and screw rod sections extended from lower ends of the lateral panels into corresponding slots and holes of the base. Then, a front panel and a rear panel are attached to the lateral panels by fitting receiving portions of the front and rear panels onto projections formed at front ends and rear ends of the lateral panels, so that flanges and screw rod sections extended from lower ends of the front and rear panels pass through corresponding slots and holes of the base. The lateral, front, and rear panels are secured in position to the base by wing nuts. Finally, a top panel is secured in position to upper ends of the lateral, front, and rear panels. Plural such pet cages are connectable and easily securable in position to one another.

U.S. Publication No. 20120186530, published 2012 Jul. 26, by Brad Cantwell, reveals a wire crate for housing an animal. The wire crate includes a top panel, a bottom panel, a front panel, a back panel, and a pair of side panels oppositely disposed from one another. The crate also includes a front opening defined in the front panel. The front opening is configured to provide access to the interior of the crate. The crate further includes a pair of tracks coupled to each side of the front opening and a door slidably coupled to the pair of tracks. The door slides along the pair of tracks between an open position and a closed position.

DISADVANTAGES OF THE PRIOR ART

The prior art have failed to solve many problems associated with such pet crates, as follows:
1) No prior art mention or disclose any pet crates, having multi-grooming-tool-clamping handle channel 104.
   Therefore, the prior art of pet crates:
   a) Can not be used as a hook,
      to store multi-grooming tools
      (see FIG. 9E);
   b) Can not be used as a hook,
      to store pet toys
      (see FIG. 9E);

c) Can not be used as a hook,
   to hold leashes
   (see FIG. 9E); and
d) Can not be used as a clamp,
   to hold papers and documents
   (see FIG. 9E).

2) No prior art mention or disclose any pet crates, having poop-bag-clamping handle clasps 105.
   Therefore, the prior art of pet crates:
   a) Can not be used as hooks,
      to securely fasten poop bags to handle bridge 102
      (see FIG. 9F);
   b) Can not be used as hooks,
      to store multi-grooming tools
      (see FIG. 9F);
   c) Can not be used as hooks,
      to hold pet toys
      (see FIG. 9F); and
   d) Can not be used as hooks,
      to hold leashes
      (see FIG. 9F).

3) No prior art mention or disclose any pet crates, having first and second door openings 112a and 112b.
   Therefore, the prior art of pet crates:
   a) Can not be locked in multiple positions,
      to allow multiple pets to enter and exit
      (see FIG. 3B, FIG. 3C, FIG. 3D, and FIG. 3E,);
   b) Can not be locked in multiple positions,
      to allow pets of various sizes to enter and exit
      (see FIG. 3B, FIG. 3C, FIG. 3D, and FIG. 3E,);
   c) Can not be locked in multiple positions,
      to separately allow access to multiple pet-containing compartments
      (see FIG. 8A, and FIG. 8B,); and
   d) Can not be locked in multiple positions,
      to provide security to multiple pets
      (see FIG. 8A, and FIG. 8B).

4) No prior art mention or disclose any pet crates, having first and second movable crate dividers 113a and 113b.
   Therefore, the prior art of pet crates:
   a) Can not create multiple pet-containing compartments,
      to accommodate multiple pets
      (see FIG. 8A and FIG. 8B);
   b) Can not provide separation to pets,
      to keep pets safe from each other
      (see FIG. 8A and FIG. 8B);
   c) Can not create multiple sized pet-containing compartments,
      to accommodate pet growth from puppy to adult stage; and
   d) Can not create multiple sized pet-containing compartments,
      to accommodate large and small pets simultaneously.

5) No prior art mention or disclose any pet crates, having a slanted urine-storing-gutter tray 114a.
   Therefore, the prior art of pet crates:
   a) Can not drain urine into urine-storing-gutters 114b,
      to keep slanted urine-storing-gutter tray 114a dry
      (see FIG. 12A and FIG. 12B);
   b) Can not comfortably accommodate pets,
      to allow pets to sit, stand, play, rest and sleep thereon
      (see FIG. 12A and FIG. 12B);
   c) Can not conveniently keep pets away and not on their urine,
      to keep pets dry; and
   d) Can not conveniently keep pets away and not on their urine,
      to prevent pets from getting diseases and infections caused by their own urine.

6) No prior art mention or disclose any pet crates, having urine-storing gutters 114b.
   Therefore, the prior art of pet crates:
   a) Can not store urine run-off from slanted urine-storing-gutter tray 114a,
      to keep slanted urine-storing-gutter tray 114a dry
      (see FIG. 12A and FIG. 12B);
   b) Can not conveniently keep pets away and not on their urine,
      to keep pets dry
      (see FIG. 12A and FIG. 12B);
   c) Can not conveniently keep pets away and not on their urine,
      to prevent pets from getting diseases and infections caused by their own urine
      (see FIG. 12A and FIG. 12B); and
   d) Can not allow quick and easy cleaning,
      to help save on maintenance time.

7) No prior art mention or disclose any pet crates, having gutter ridges 114c.
   Therefore, the prior art of pet crates:
   a) Can not support a pet's paws while stepping upon,
      to help pets to be comfortable and safe
      (see FIG. 12A and FIG. 12B);
   b) Can not conveniently keep pets away and not on their urine,
      to keep pets dry;
   c) Can not provide protrusions and recesses for urine to flow therein,
      to separate urine from pet's area
      (see FIG. 12A and FIG. 12B); and
   d) Can not prevent pets from submersion in urine,
      to avoid infections and disease.

8) No prior art mention or disclose any pet crates, having top low-friction rail 116.
   Therefore, the prior art of pet crates:
   a) Can not slidably secure first and second auto-indexing multi-position doors 127a and 127b,
      to prevent cage rattling during transport
      (see FIG. 7A. FIG. 7B and FIG. 7E);
   b) Can not provide low-friction surfaces,
      to enable easy sliding motions of first and second auto-indexing multi-position doors 127a and 127b
      (see FIG. 7A. FIG. 7B and FIG. 7E);
   c) Can not provide top low-friction rail arcs 117a, 117b, and 117c to allow easy sliding motions of first and second auto-indexing multi-position doors 127a and 127b,
      to make operation easier
      (see FIG. 7E); and
   d) Can not provide top low-friction rail arcs 117a, 117b, and 117c,
      to maintain minimum surface contact, for minimum friction
      (see FIG. 7E).

9) No prior art mention or disclose any pet crates, having top low-friction rail arcs 117a, 117b, and 117c.
   Therefore, the prior art of pet crates:
   a) Can reduce surface contact, thereby lowering friction between top low-friction rail 116 and first and second auto-indexing multi-position doors 127a and 127b,
      to make operation easier
      (see FIG. 7E);

b) Can slidably secure the tops of first and second auto-indexing multi-position doors 127a and 127b,
to provide a secure channel for first and second auto-indexing multi-position doors 127a and 127b to easily slide horizontally
(see FIG. 7E);
c) Can slidably secure the tops of first and second auto-indexing multi-position doors 127a and 127b,
to prevent crate rattling during transport
(see FIG. 7E); and
d) Can provide a tall rear wall of top low-friction rail arc 117a,
to minimize potential fur and paws being caught in top low-friction rail 116.

10) No prior art mention or disclose any pet crates, having a bottom low-friction rail 118.
Therefore, the prior art of pet crates:
a) Can not slidably secure first and second auto-indexing multi-position doors 127a and 127b,
to prevent cage rattling during transport
(see FIG. 7C, FIG. 7F and FIG. 7H);
b) Can not provide low-friction surfaces,
to enable easy sliding motions of first and second auto-indexing multi-position doors 127a and 127b
(see FIG. 7C, FIG. 7F and FIG. 7H);
c) Can not provide bottom low-friction rail arcs 119a, 119b, and 119c to allow easy sliding motions of first and second auto-indexing multi-position doors 127a and 127b
to make operation easier
(see FIG. 7F and FIG. 7H); and
d) Can not provide a tall rear wall of bottom low-friction rail arc 119a,
to minimize potential fur and paws being caught in bottom low-friction rail 118.

11) No prior art mention or disclose any pet crates, having bottom low-friction rail arcs 119a, 119b, and 119c.
Therefore, the prior art of pet crates:
a) Can not reduce surface contact, thereby lowering friction between bottom low-friction rail 118 and first and second auto-indexing multi-position doors 127a and 127b,
to make operation easier
(see FIG. 7C, FIG. 7F, and FIG. 7H);
b) Can not slidably secure the bottoms of first and second auto-indexing multi-position doors 127a and 127b,
to provide a secure channel for first and second auto-indexing multi-position doors 127a and 127b to easily slide horizontally
(see FIG. 7C, FIG. 7F, and FIG. 7H);
c) Can not slidably secure the bottoms of first and second auto-indexing multi-position doors 127a and 127b,
to prevent crate rattling during transport
(see FIG. 7C, FIG. 7F, and FIG. 7H); and
d) Can not provide a tall rear wall of bottom low-friction rail arc 119a,
to minimize potential fur and paws being caught in bottom low-friction rail 118.

12) No prior art mention or disclose any pet crates, having multi-position door-corner-glider-locking recesses 120.
Therefore, the prior art of pet crates:
a) Can not horizontally and slantedly lock first and second auto-indexing multi-position door-corner-gliders therein to horizontally and slantedly lock first and second auto-indexing multi-position doors 127a and 127b in multiple horizontal and slanted positions
to allow for different door locking configurations
(see FIG. 6, FIG. 7C, FIG. 7D, FIG. 7F, FIG. 7G, and FIG. 7H);
b) Can not allow multiple locked horizontal positions for first and second auto-indexing multi-position doors 127a and 127b, at multiple locations,
to allow for different door opening configurations
(see FIG. 6, FIG. 7C, FIG. 7D, and FIG. 7G);
c) Can not precisely self-adjust each available incremental door position,
to make operation easier; and
d) Can not make door position adjustments quicker and easier for the user,
to help in ease of use
(see FIG. 6, FIG. 7C, FIG. 7D, and FIG. 7G).

13) No prior art mention or disclose any pet crates, having door extracting-inserting slots 123a and 123b.
Therefore, the prior art of pet crates:
a) Can not quickly assemble first and second auto-indexing multi-position doors 127a and 127b by inserting them therethrough,
to make installation of doors easier
(see FIG. 5A, FIG. 5B, FIG. 5D, and FIG. 5E);
b) Can not quickly insert to assemble first and second auto-indexing multi-position doors 127a and 127b,
to allow installation of doors without tools;
(see FIG. 5A, FIG. 5B, FIG. 5D, and FIG. 5E)
c) Can not create an access opening to extract first and second auto-indexing multi-position doors 127a and 127b during manufacturing and by the user,
to make operation easier
(see FIG. 5C); and
d) Can not create an access opening to extract first and second auto-indexing multi-position doors 127a and 127b during manufacturing and by the user,
to help in disassembly.

14) No prior art mention or disclose any pet crates, having first and second auto-indexing multi-position door-corner-gliders 128a and 128b.
Therefore, the prior art of pet crates:
a) Can not reduce friction to sliding movement of first and second auto-indexing multi-position doors 127a and 127b,
to make opening and closing doors easier
(see FIG. 6, FIG. 7C and FIG. 7F);
b) Can not precisely stop door at incremental door positions,
to operation easier
(see FIG. 6 and FIG. 7C);
c) Can not provide a precise alignment for multi-position door-locking push-rod tails 134a and 134b with multi-position push-rod-tail-locking wires 135a and 135b, so that locking action requires no user judgment,
to make operation easier
(see FIG. 6 and FIG. 7C);
d) Can not eliminate door lubrication maintenance,
to reduce cost and maintenance; and
e) Can not provide two equal points of contact and balance for easy sliding movements,
to make opening and closing doors easier
(see FIG. 7C).

15) No prior art mention or disclose any pet crates, having first and second multi-position door-locking push-rod tails 134a and 134b.

Therefore, the prior art of pet crates:
  a) Can not horizontally and slantedly lock and self-align positions of first and second auto-indexing multi-position doors 127*a* and 127*b* to respectively first and second multi-position push-rod-tail-locking wires 135*a* and 135*b*,
    to make operation easier
    (see FIG. 2A, FIG. 2B, FIG. 2C, FIG. 3A, FIG. 3B, FIG. 3C, FIG. 3D, FIG. 3E, FIG. 3F, FIG. 13A, FIG. 13B, and FIG. 13C);
  b) Can not lock first and second auto-indexing multi-position doors 127*a* and 127*b* to front panel 108*e*,
    to keep pets safe and secure;
  c) Can not allow first and second auto-indexing multi-position doors 127*a* and 127*b* to maintain a closed, locked, or open position when the multi-pet locking-tail-push-rod pet crate, is situated on:
    A non-moving, flat house floor;
    A non-moving, inclined driveway or other surface;
    A moving vehicle floor;
    A moving, upwardly inclined vehicle floor; and
    A moving, downwardly inclined vehicle floor;
    Bumped or pushed by an object;
    Shaken by an energetic pet; and
    Moved or relocated,
      to provide added pet safety and security
      (see FIG. 11A and FIG. 11B);
  d) Can not allow minimal materials to manufacture,
    to reduce production costs; and
  e) Can not allow minimal manufacturing resources,
    to save labor, time, material, and money.
16) No prior art mention or disclose any pet crates, having First and second multi-position push-rod-tail-locking wires 135*a* and 135*b*.
  Therefore, the prior art of pet crates:
    a) Can not provide multiple locations to which to horizontally and slantedly lock first and second multi-position door-locking push-rod tails 134*a* and 134*b*,
      to allow for options in horizontal and slanted configuration of doors
      (see FIG. 2A, FIG. 2B, FIG. 2C, FIG. 13A, FIG. 13B, and FIG. 13C);
    b) Can not provide safety and security to pets,
      to keep pet safe and secure;
    c) Can not provide a locking point for first and second auto-indexing multi-position doors 127*a* and 127*b*,
      to keep doors locked when moving
      (see FIG. 2A, FIG. 2B, FIG. 2C, FIG. 11A, FIG. 11B, FIG. 13A, FIG. 13B, and FIG. 13C); and
    d) Can not give the multi-pet locking-head-and-locking-tail-push-rod pet crate additional strength,
      to keep the crate from collapsing.

OBJECTS AND ADVANTAGES OF THE INVENTION

The present invention substantially departs from the conventional concepts and designs of the prior art. In doing so, the present invention provides multi-pet locking-head-and-locking-tail-push-rod pet crate (having: a) Grooming-tool-poop-bag handle system, b) Low-friction door-rail system, c) Quick-assembly door system, d) and Multi-position locking-head-and-locking-tail push-rod system) having many unique and significant features, functions, and advantages, which overcome all the disadvantages of the prior art, as follows:

1) It is an object of the new invention to provide a multi-pet locking-head-and-locking-tail-push-rod pet crate, having multi-grooming-tool-clamping handle channel 104.
  Therefore, the multi-pet locking-head-and-locking-tail-push-rod pet crate:
    a) Can be used as a hook,
      to store multi-grooming tools
      (see FIG. 9E);
    b) Can be used as a hook,
      to store pet toys
      (see FIG. 9E);
    c) Can be used as a hook,
      to hold leashes
      (see FIG. 9E); and
    d) Can be used as a clamp,
      to hold papers and documents
      (see FIG. 9E).
2) It is another object of the new invention to provide a multi-pet locking-head-and-locking-tail-push-rod pet crate, having
  poop-bag-clamping handle clasps 105.
  Therefore, the multi-pet locking-head-and-locking-tail-push-rod pet crate:
    a) Can be used as hooks,
      to securely fasten poop bags to handle bridge 102
      (see FIG. 9F);
    b) Can be used as hooks,
      to store multi-grooming tools
      (see FIG. 9F);
    c) Can be used as hooks,
      to hold pet toys
      (see FIG. 9F); and
    d) Can be used as hooks,
      to hold leashes
      (see FIG. 9F).
3) It is still another object of the new invention to provide a multi-pet locking-head-and-locking-tail-push-rod pet crate, having
  first and second door openings 112*a* and 112*b*.
  Therefore, the multi-pet locking-head-and-locking-tail-push-rod pet crate:
    a) Can be locked in multiple positions,
      to allow multiple pets to enter and exit
      (see FIG. 3B, FIG. 3C, FIG. 3D, and FIG. 3E,);
    b) Can be locked in multiple positions,
      to allow pets of various sizes to enter and exit
      (see FIG. 3B, FIG. 3C, FIG. 3D, and FIG. 3E,);
    c) Can be locked in multiple positions,
      to separately allow access to multiple pet-containing compartments
      (see FIG. 8A and FIG. 8B,); and
    d) Can be locked in multiple positions,
      to provide security to multiple pets
      (see FIG. 8A and FIG. 8B,).
4) It is a further object of the new invention to provide a multi-pet locking-head-and-locking-tail-push-rod pet crate, having
  first and second movable crate dividers 113*a* and 113*b*.
  Therefore, the multi-pet locking-head-and-locking-tail-push-rod pet crate:
    a) Can create multiple pet-containing compartments,
      to accommodate multiple pets
      (see FIG. 8A and FIG. 8B);
    b) Can provide separation to pets,
      to keep pets safe from each other
      (see FIG. 8A and FIG. 8B);

c) Can create multiple sized pet-containing compartments,
  to accommodate pet growth from puppy to adult stage; and
d) Can create multiple sized pet-containing compartments,
  to accommodate large and small pets simultaneously.

5) It is an even further object of the new invention to provide a multi-pet locking-head-and-locking-tail-push-rod pet crate, having
a slanted urine-storing-gutter tray 114a.
Therefore, the multi-pet locking-head-and-locking-tail-push-rod pet crate:
  a) Can drain urine into urine-storing-gutters 114b,
    to keep slanted urine-storing-gutter tray 114a dry
    (see FIG. 12A and FIG. 12B);
  b) Can comfortably accommodate pets,
    to allow pets to sit, stand, play, rest and sleep thereon
    (see FIG. 12A and FIG. 12B);
  c) Can conveniently keep pets away and not on their urine,
    to keep pets dry; and
  d) Can conveniently keep pets away and not on their urine,
    to prevent pets from getting diseases and infections caused by their own urine.

6) It is still another object of the new invention to provide a multi-pet locking-head-and-locking-tail-push-rod pet crate, having
urine-storing gutters 114b.
Therefore, the multi-pet locking-head-and-locking-tail-push-rod pet crate:
  a) Can store urine run-off from slanted urine-storing-gutter tray 114a,
    to keep slanted urine-storing-gutter tray 114a dry
    (see FIG. 12A and FIG. 12B);
  b) Can conveniently keep pets away and not on their urine,
    to keep pets dry
    (see FIG. 12A and FIG. 12B);
  d) Can conveniently keep pets away and not on their urine,
    to prevent pets from getting diseases and infections caused by their own urine
    (see FIG. 12A and FIG. 12B); and
  e) Can allow quick and easy cleaning,
    to help save on maintenance time.

7) It is yet another object of the new invention to provide a multi-pet locking-head-and-locking-tail-push-rod pet crate, having
gutter ridges 114c.
Therefore, the multi-pet locking-head-and-locking-tail-push-rod pet crate:
  a) Can support a pet's paws while stepping upon,
    to help pets to be comfortable and safe
    (see FIG. 12A and FIG. 12B);
  b) Can conveniently keep pets away and not on their urine,
    to keep pets dry;
  c) Can provide protrusions and recesses for urine to flow therein,
    to separate urine from pet's area
    (see FIG. 12A and FIG. 12B); and
  d) Can prevent pets from submersion in urine,
    to avoid infections and disease.

8) It is still yet another object of the new invention to provide a multi-pet locking-head-and-locking-tail-push-rod pet crate, having
top low-friction rail 116.
Therefore, the multi-pet locking-head-and-locking-tail-push-rod pet crate:
  a) Can slidably secure first and second auto-indexing multi-position doors 127a and 127b,
    to prevent cage rattling during transport
    (see FIG. 7A. FIG. 7B and FIG. 7E);
  b) Can provide low-friction surfaces,
    to enable easy sliding motions of first and second auto-indexing multi-position doors 127a and 127b
    (see FIG. 7A. FIG. 7B and FIG. 7E);
  c) Can provide top low-friction rail arcs 117a, 117b, and 117c to allow easy sliding motions of first and second auto-indexing multi-position doors 127a and 127b,
    to make operation easier
    (see FIG. 7E); and
  d) Can provide top low-friction rail arcs 117a, 117b, and 117c,
    to maintain minimum surface contact, for minimum friction
    (see FIG. 7E).

9) It is still yet another object of the new invention to provide a multi-pet locking-head-and-locking-tail-push-rod pet crate, having
top low-friction rail arcs 117a, 117b, and 117c.
Therefore, the multi-pet locking-head-and-locking-tail-push-rod pet crate:
  a) Can reduce surface contact, thereby lowering friction between top low-friction rail 116 and first and second auto-indexing multi-position doors 127a and 127b,
    to make operation easier
    (see FIG. 7E);
  b) Can slidably secure the tops of first and second auto-indexing multi-position doors 127a and 127b,
    to provide a secure channel for first and second auto-indexing multi-position doors 127a and 127b to easily slide horizontally
    (see FIG. 7E);
  c) Can slidably secure the tops of first and second auto-indexing multi-position doors 127a and 127b,
    to prevent crate rattling during transport
    (see FIG. 7E); and
  d) Can provide a tall rear wall of top low-friction rail arc 117a,
    to minimize potential fur and paws being caught in top low-friction rail 116.

10) It is still yet another object of the new invention to provide a multi-pet locking-head-and-locking-tail-push-rod pet crate, having
a bottom low-friction rail 118.
Therefore, the multi-pet locking-head-and-locking-tail-push-rod pet crate:
  a) Can slidably secure first and second auto-indexing multi-position doors 127a and 127b,
    to prevent cage rattling during transport
    (see FIG. 7C, FIG. 7F, and FIG. 7H);
  b) Can provide low-friction surfaces,
    to enable easy sliding motions of first and second auto-indexing multi-position doors 127a and 127b
    (see FIG. 7C, FIG. 7F, and FIG. 7H);

c) Can provide bottom low-friction rail arcs 119a, 119b, and 119c to allow easy sliding motions of first and second auto-indexing multi-position doors 127a and 127b
to make operation easier
(see FIG. 7F and FIG. 7H); and
d) Can provide a tall rear wall of bottom low-friction rail arc 119a,
to minimize potential fur and paws being caught in bottom low-friction rail 118.

11) It is still yet another object of the new invention to provide a multi-pet locking-head-and-locking-tail-push-rod pet crate, having
bottom low-friction rail arcs 119a, 119b, and 119c.
Therefore, the multi-pet locking-head-and-locking-tail-push-rod pet crate:
a) Can reduce surface contact, thereby lowering friction between bottom low-friction rail 118 and first and second auto-indexing multi-position doors 127a and 127b,
to make operation easier
(see FIG. 7C, FIG. 7F, and FIG. 7H);
b) Can slidably secure the bottoms of first and second auto-indexing multi-position doors 127a and 127b,
to provide a secure channel for first and second auto-indexing multi-position doors 127a and 127b to easily slide horizontally
(see FIG. 7C, FIG. 7F, and FIG. 7H);
c) Can slidably secure the bottoms of first and second auto-indexing multi-position doors 127a and 127b,
to prevent crate rattling during transport
(see FIG. 7C, FIG. 7F, and FIG. 7H); and
d) Can provide a tall rear wall of bottom low-friction rail arc 119a,
to minimize potential fur and paws being caught in bottom low-friction rail 118.

12) It is still yet another object of the new invention to provide a multi-pet locking-head-and-locking-tail-push-rod pet crate, having
multi-position door-corner-glider-locking recesses 120.
Therefore, the multi-pet locking-head-and-locking-tail-push-rod pet crate:
a) Can horizontally and slantedly lock first and second auto-indexing multi-position door-corner-gliders therein to horizontally and slantedly lock first and second auto-indexing multi-position doors 127a and 127b in multiple horizontal and slanted positions
to allow for different door locking configurations
(see FIG. 6, FIG. 7C, FIG. 7D, FIG. 7F, FIG. 7G, and FIG. 7H);
b) Can allow multiple locked horizontal positions for first and second auto-indexing multi-position doors 127a and 127b, at multiple locations,
to allow for different door opening configurations
(see FIG. 6, FIG. 7C, FIG. 7D, and FIG. 7G);
c) Can precisely self-adjust each available incremental door position,
to make operation easier; and
d) Can make door position adjustments quicker and easier for the user,
to help in ease of use
(see FIG. 6, FIG. 7C, FIG. 7D, and FIG. 7G).

13) It is still yet another object of the new invention to provide a multi-pet locking-head-and-locking-tail-push-rod pet crate, having
door extracting-inserting slots 123a and 123b.
Therefore, the multi-pet locking-head-and-locking-tail-push-rod pet crate:
a) Can quickly assemble first and second auto-indexing multi-position doors 127a and 127b by inserting them therethrough,
to make installation of doors easier
(see FIG. 5A, FIG. 5B, FIG. 5D, and FIG. 5E);
b) Can quickly insert to assemble first and second auto-indexing multi-position doors 127a and 127b,
to allow installation of doors without tools;
(see FIG. 5A, FIG. 5B, FIG. 5D, and FIG. 5E)
c) Can create an access opening to extract first and second auto-indexing multi-position doors 127a and 127b during manufacturing and by the user,
to make operation easier
(see FIG. 5C); and
d) Can create an access opening to extract first and second auto-indexing multi-position doors 127a and 127b during manufacturing and by the user,
to help in disassembly.

14) It is still yet another object of the new invention to provide a multi-pet locking-head-and-locking-tail-push-rod pet crate, having
first and second auto-indexing multi-position door-corner-gliders 128a and 128b.
Therefore, the multi-pet locking-head-and-locking-tail-push-rod pet crate:
a) Can reduce friction to sliding movement of first and second auto-indexing multi-position doors 127a and 127b,
to make opening and closing doors easier
(see FIG. 6, FIG. 7C and FIG. 7F);
b) Can precisely stop door at incremental door positions,
to operation easier
(see FIG. 6 and FIG. 7C);
c) Can provide a precise alignment for multi-position door-locking push-rod tails 134a and 134b with multi-position push-rod-tail-locking wires 135a and 135b, so that locking action requires no user judgment,
to make operation easier
(see FIG. 6 and FIG. 7C);
d) Can eliminate door lubrication maintenance,
to reduce cost and maintenance; and
e) Can provide two equal points of contact and balance for easy sliding movements,
to make opening and closing doors easier
(see FIG. 7C).

15) It is still yet another object of the new invention to provide a multi-pet locking-head-and-locking-tail-push-rod pet crate, having
first and second multi-position door-locking push-rod tails 134a and 134b.
Therefore, the multi-pet locking-head-and-locking-tail-push-rod pet crate:
a) Can horizontally and slantedly lock and self-align positions of first and second auto-indexing multi-position doors 127a and 127b to respectively first and second multi-position push-rod-tail-locking wires 135a and 135b,
to make operation easier
(see FIG. 2A, FIG. 2B, FIG. 2C, FIG. 3A, FIG. 3B, FIG. 3C, FIG. 3D, FIG. 3E, FIG. 3F, FIG. 13A, FIG. 13B, and FIG. 13C);
b) Can lock first and second auto-indexing multi-position doors 127a and 127b to front panel 108e, to keep pets safe and secure;
c) Can allow first and second auto-indexing multi-position doors 127a and 127b to maintain a closed, locked, or open position when the multi-pet locking-tail-push-rod pet crate, is situated on:
A non-moving, flat house floor;
A non-moving, inclined driveway or other surface;
A moving vehicle floor;
A moving, upwardly inclined vehicle floor; and
A moving, downwardly inclined vehicle floor;
Bumped or pushed by an object;
Shaken by an energetic pet; and
Moved or relocated,
to provide added pet safety and security
(see FIG. 11A and FIG. 11B);
d) Can allow minimal materials to manufacture,
to reduce production costs; and
e) Can allow minimal manufacturing resources,
to save labor, time, material, and money.
16) It is still yet another object of the new invention to provide a multi-pet locking-head-and-locking-tail-push-rod pet crate, having
First and second multi-position push-rod-tail-locking wires 135a and 135b.
Therefore, the multi-pet locking-head-and-locking-tail-push-rod pet crate:
a) Can provide multiple locations to which to horizontally and slantedly lock first and second multi-position door-locking push-rod tails 134a and 134b,
to allow for options in horizontal and slanted configuration of doors
(see FIG. 2A, FIG. 2B, FIG. 2C, FIG. 13A, FIG. 13B, and FIG. 13C);
b) Can provide safety and security to pets,
to keep pet safe and secure;
c) Can provide a locking point for first and second auto-indexing multi-position doors 127a and 127b,
to keep doors locked when moving
(see FIG. 2A, FIG. 2B, FIG. 2C, FIG. 11A, FIG. 11B, FIG. 13A, FIG. 13B, and FIG. 13C); and
d) Can give the multi-pet locking-head-and-locking-tail-push-rod pet crate additional strength,
to keep the crate from collapsing.

Other objects and advantages of the present invention will become apparent from a consideration of the accompanying drawings and ensuing description.

SUMMARY OF THE INVENTION

A multi-pet locking-head-and-locking-tail-push-rod pet crate comprises: a handle bridge, a handle channel molded inside the handle bridge for containing grooming tools, handle clasps respectively molded in the handle bridge for fastening poop bags thereto, a top panel, a bottom panel, a left panel, a right panel, a front panel, a rear panel, at least one divider, panel-locking hooks and clamps for hooking and clamping the panels together, a slanted tray for draining urine, urine-storing gutters and ridges molded around the tray for supporting pet paws and for keeping pets away from urine, top and bottom low-friction rails welded to the front panel, multi-position door-glider-locking recesses formed in the bottom low-friction rail for locking the auto-indexing multi-position door gliders and for adjusting horizontal or slanted and stationary or moving positions of the auto-indexing multi-position doors, first and second auto-indexing multi-position doors inserted between the top and bottom low-friction rails, first and second auto-indexing multi-position door gliders respectively cast to the first and second doors for horizontally or slantedly being locked in the multi-position door-glider-locking recesses to horizontally or slantedly lock said first and the second doors in multiple horizontal or slanted and stationary or moving positions, first and second push-rods respectively and movably attached to the first and second doors, first and second door-locking push-rod heads respectively cast to the first and second push-rods for locking the first and second doors together, and first and second multi-position door-locking push-rod tails respectively cast to the first and second push-rods for locking and aligning the first and second doors to the front panel and for adjusting multiple positions of the first and second doors.

BRIEF DESCRIPTION OF THE DRAWINGS

FIG. 1. illustrates a front view of the multi-pet locking-tail-push-rod pet crate, having the grooming-tool-poop-bag handle system, the low-friction door-rail system, the quick-assembly door system, and the multi-position locking-head-and-locking-tail push-rod system.

FIGS. 2A, 2B and 2C illustrate front views of the locked, unlocked, and secondary locking positions of the multi-pet multi-position-double-door system.

FIGS. 3A, 3B, 3C, 3D, and 3E illustrate front views of the low-friction door-corner-recess-arc-rail system, and the first and second multi-pet multi-position-double-door systems in various door-locking positions.

FIGS. 7B, and 7C illustrate sectional views of the relationship between the top and bottom low-friction rails, the first and second auto-indexing multi-position door-corner-gliders, and the multi-position door-corner-glider-locking recesses.

FIGS. 9A, 9B, 9C, 9D, 9E, and 9F illustrate top, side, and front views of the mobile-grooming-tool-and-poop-bag-retaining handle system.

FIGS. 12A and 12B illustrate side and top views of the the slanted urine-storing-gutter tray, urine-storing gutters, and gutter ridges.

DETAILED DESCRIPTION OF THE INVENTION

Figure 2A:
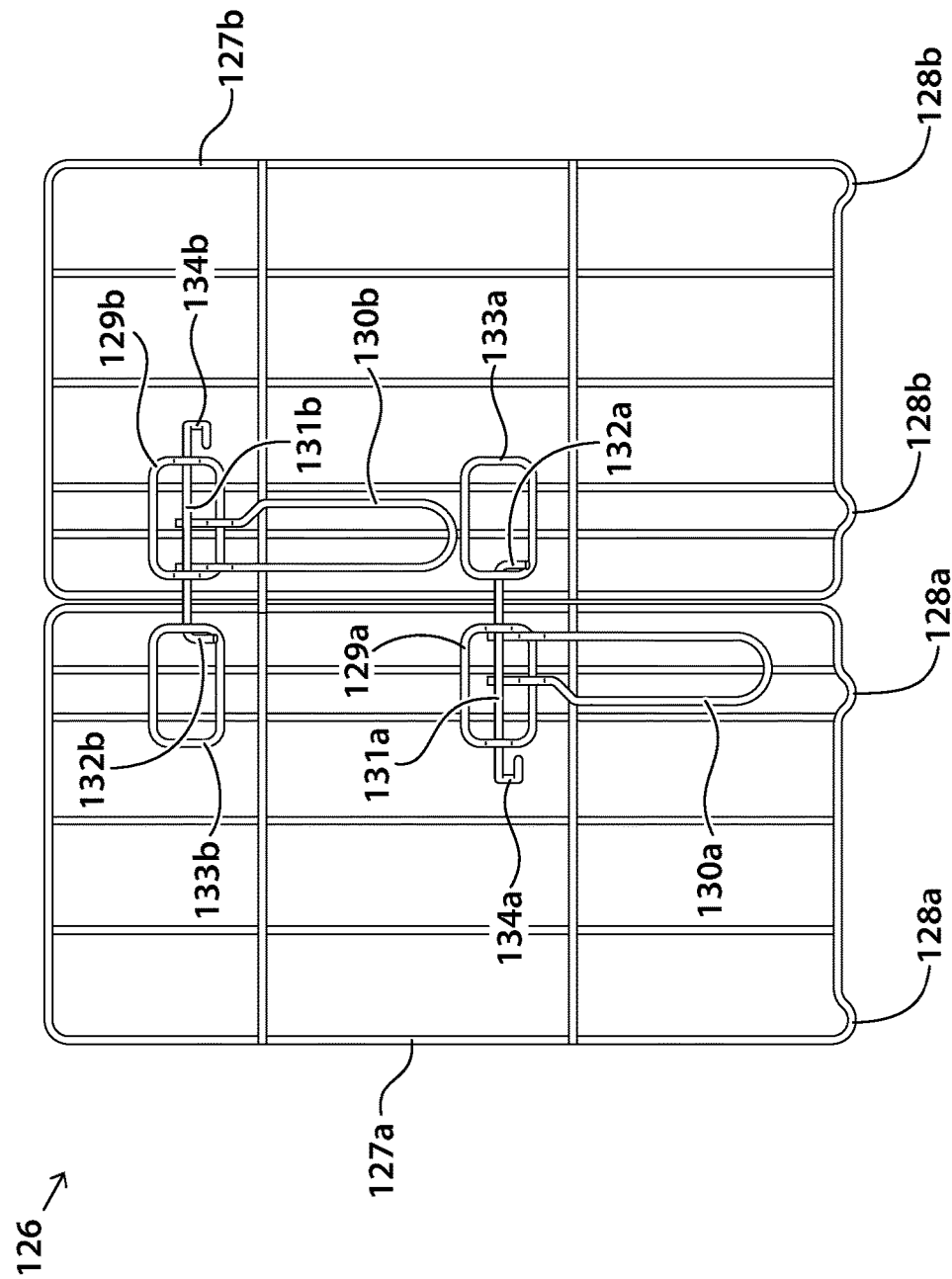
Figure 2B:
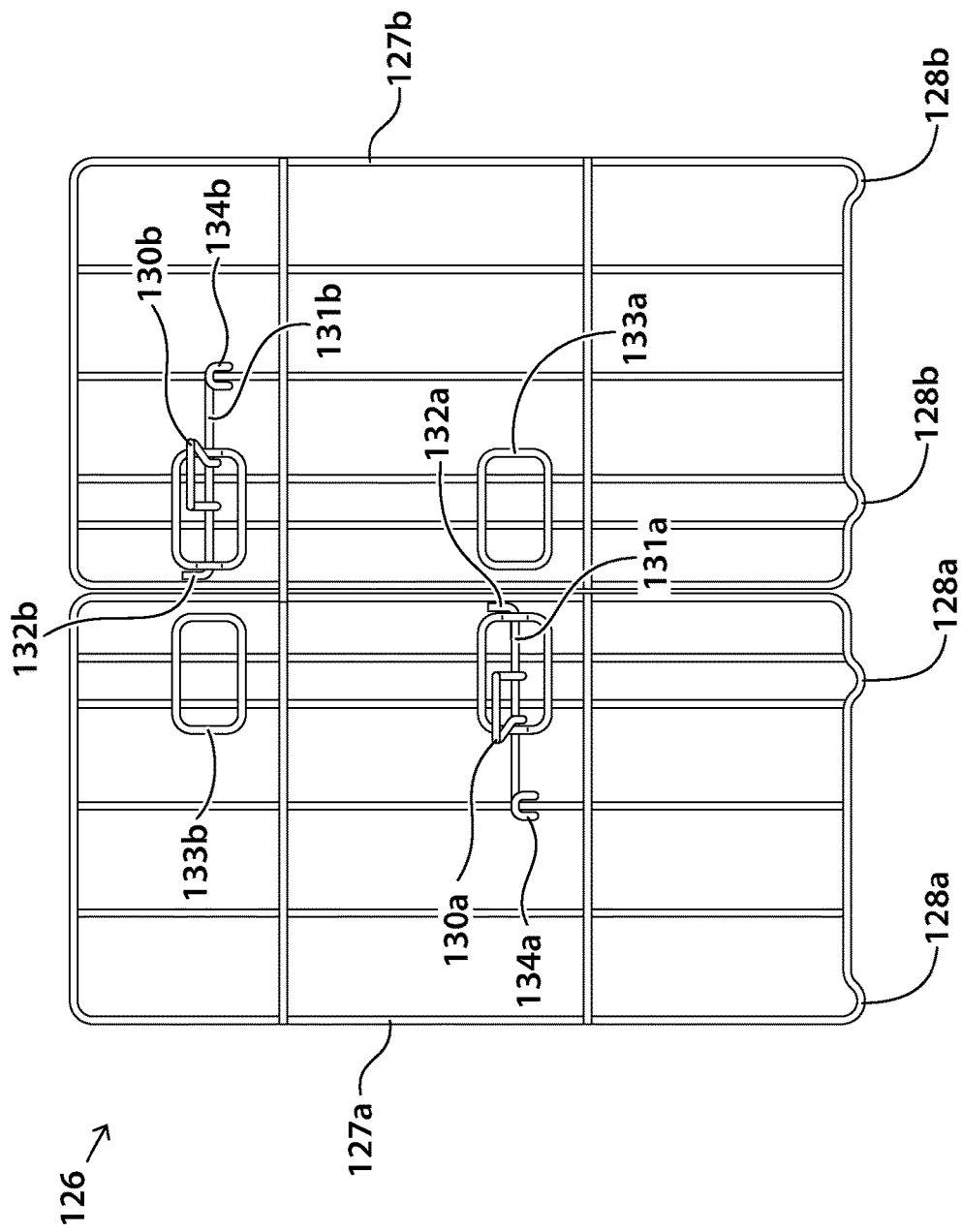
Figure 3A:
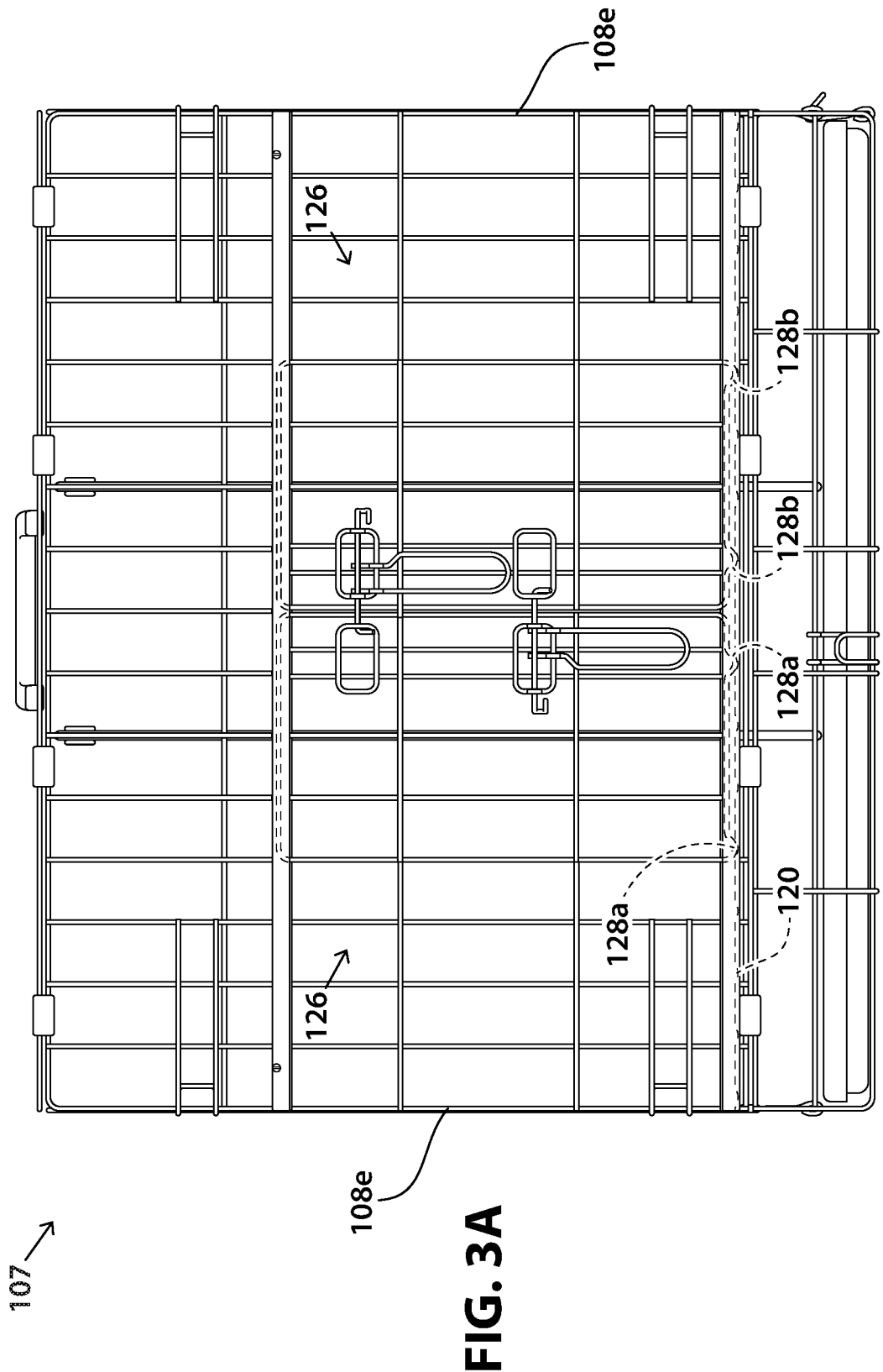
Figure 3C:
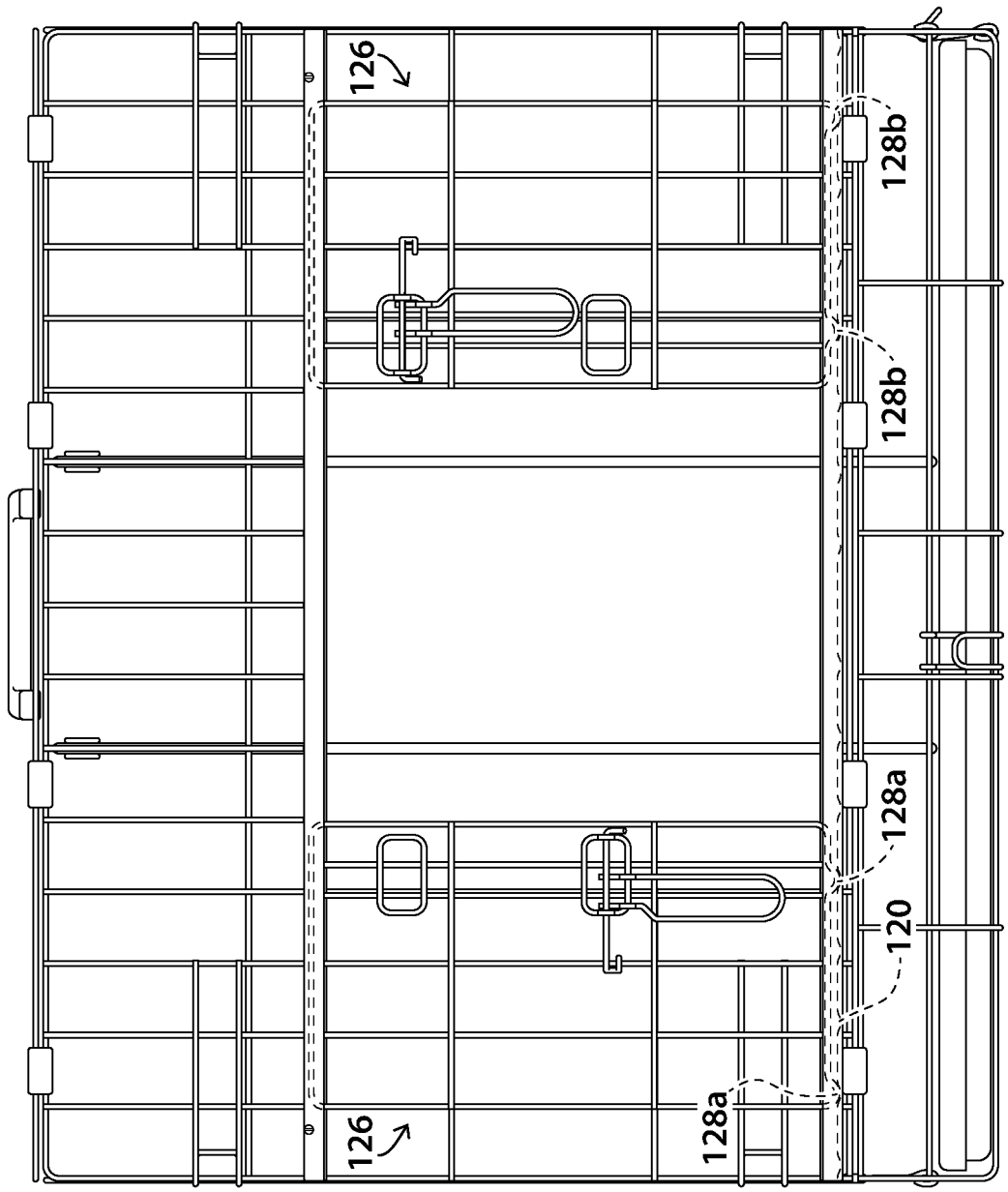
Figure 3D:
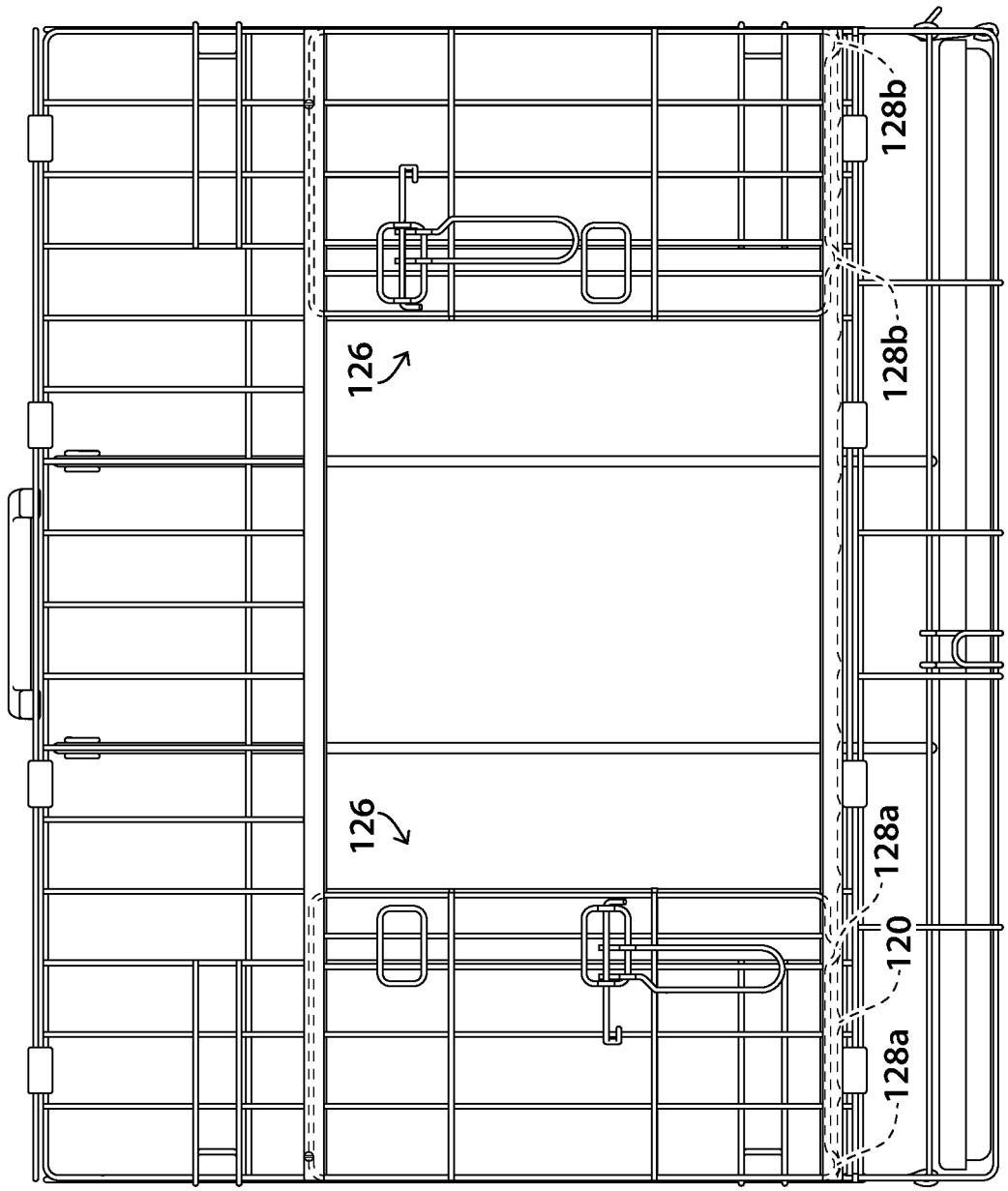
Figure 3E:
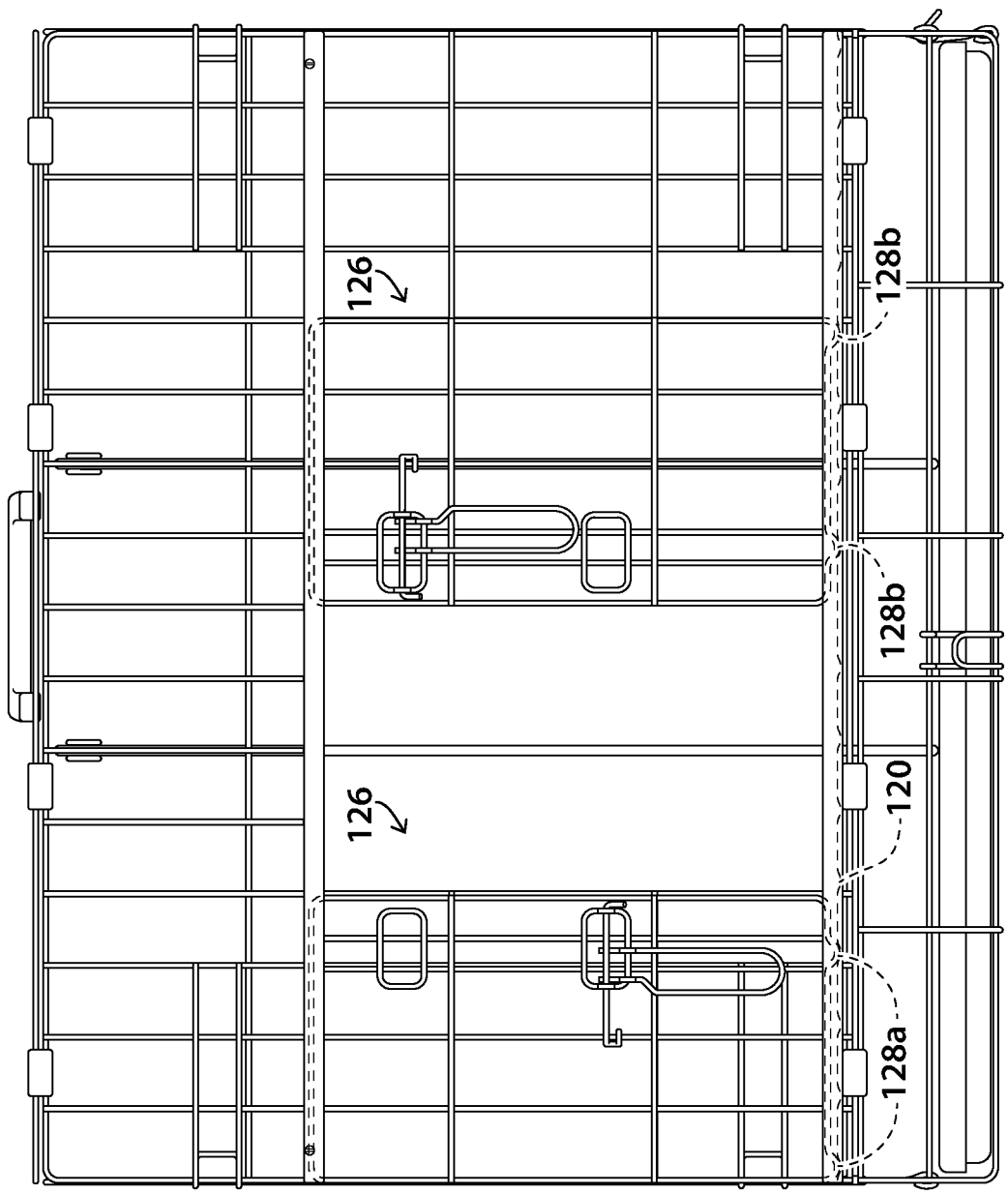
Figure 3F:
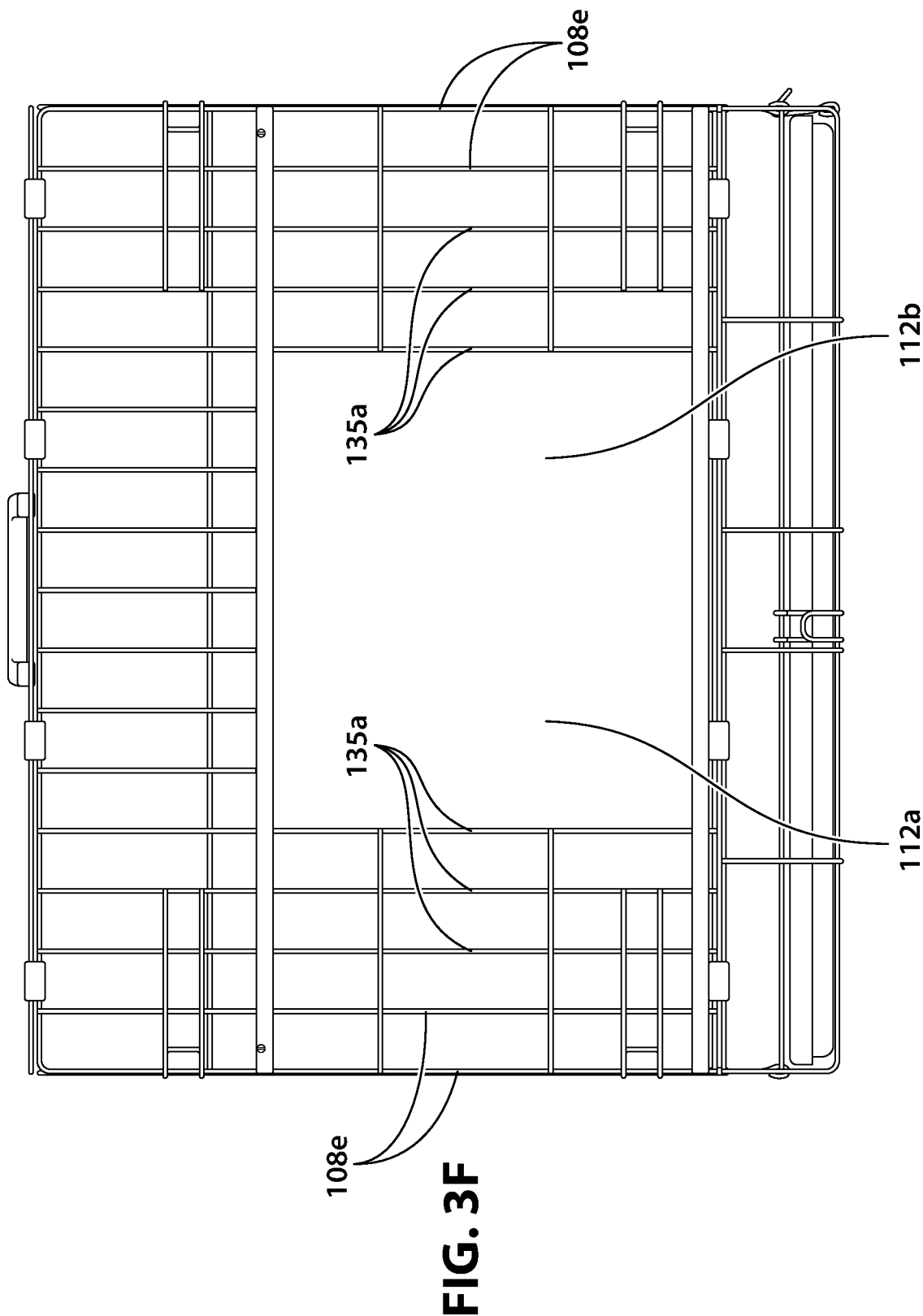
FIG. 3F illustrates a front view of the multi-pet-containing panel system without the first and second auto-indexing multi-position doors, and without the first and second movable crate dividers.
Figure 4B:
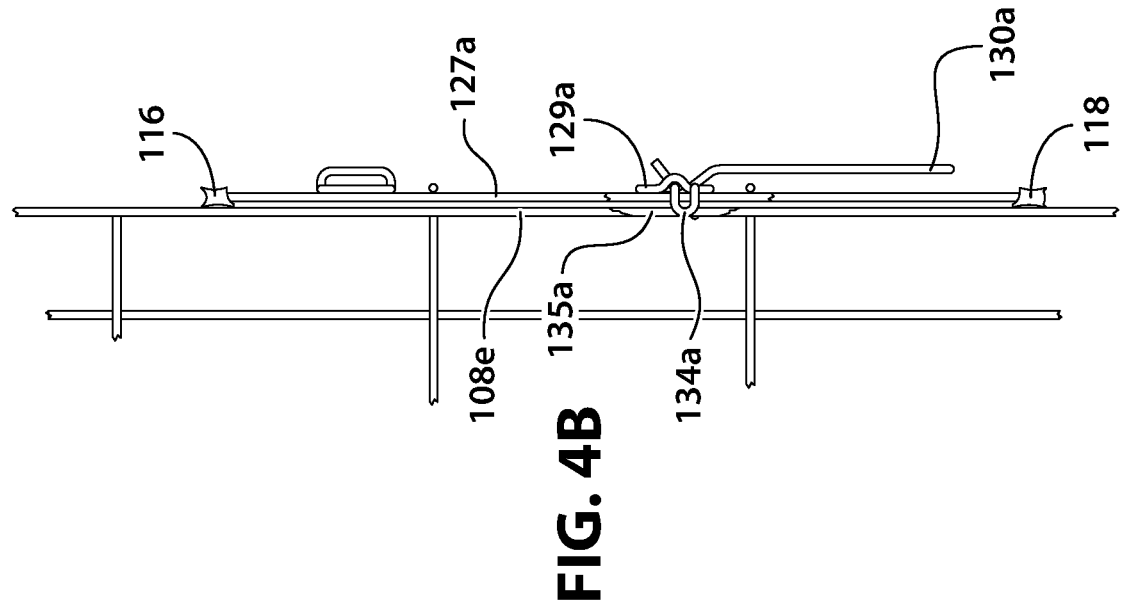
FIGS. 4A, 4B, 4C, 4D, 4E, 4F, and 4G illustrate side and perspective views of the interaction between the first push-rod levers, the first door-locking push-rod heads, the first multi-position push-rod-tail-locking tails, and the first multi-position push-rod-tail-locking wire, in locked and unlocked positions.
Figure 4A:
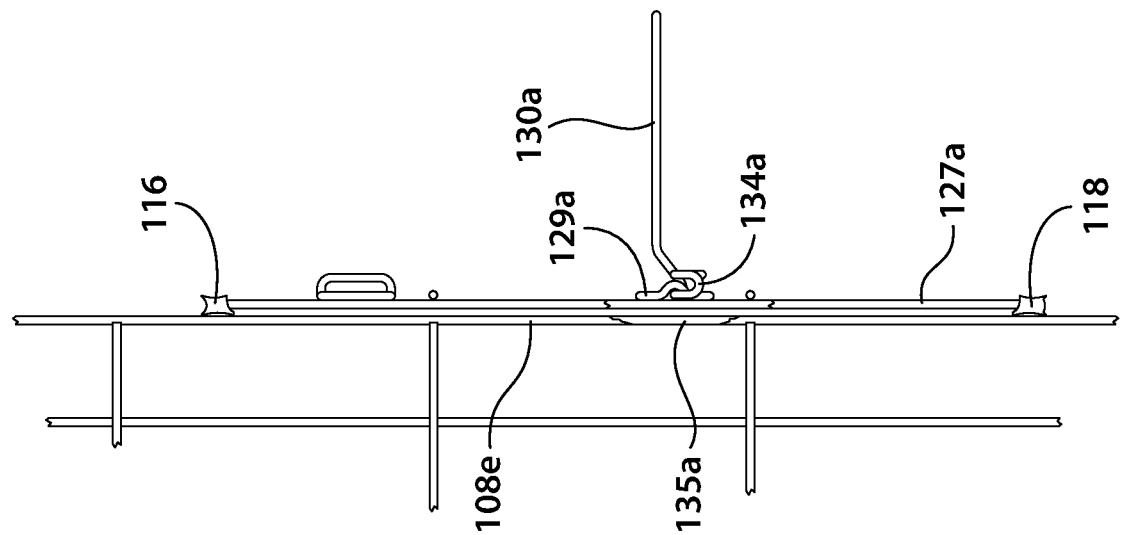
Figure 4D:
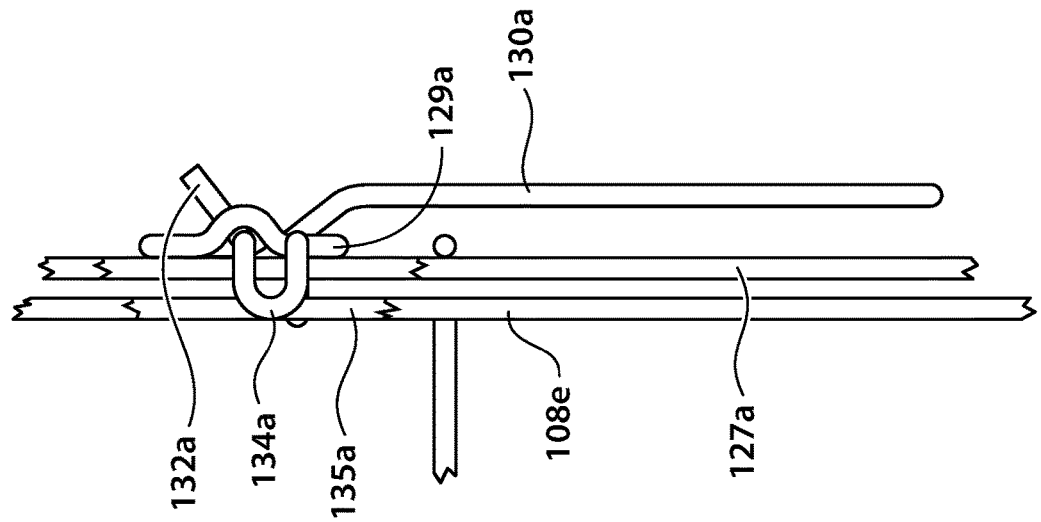
Figure 4C:
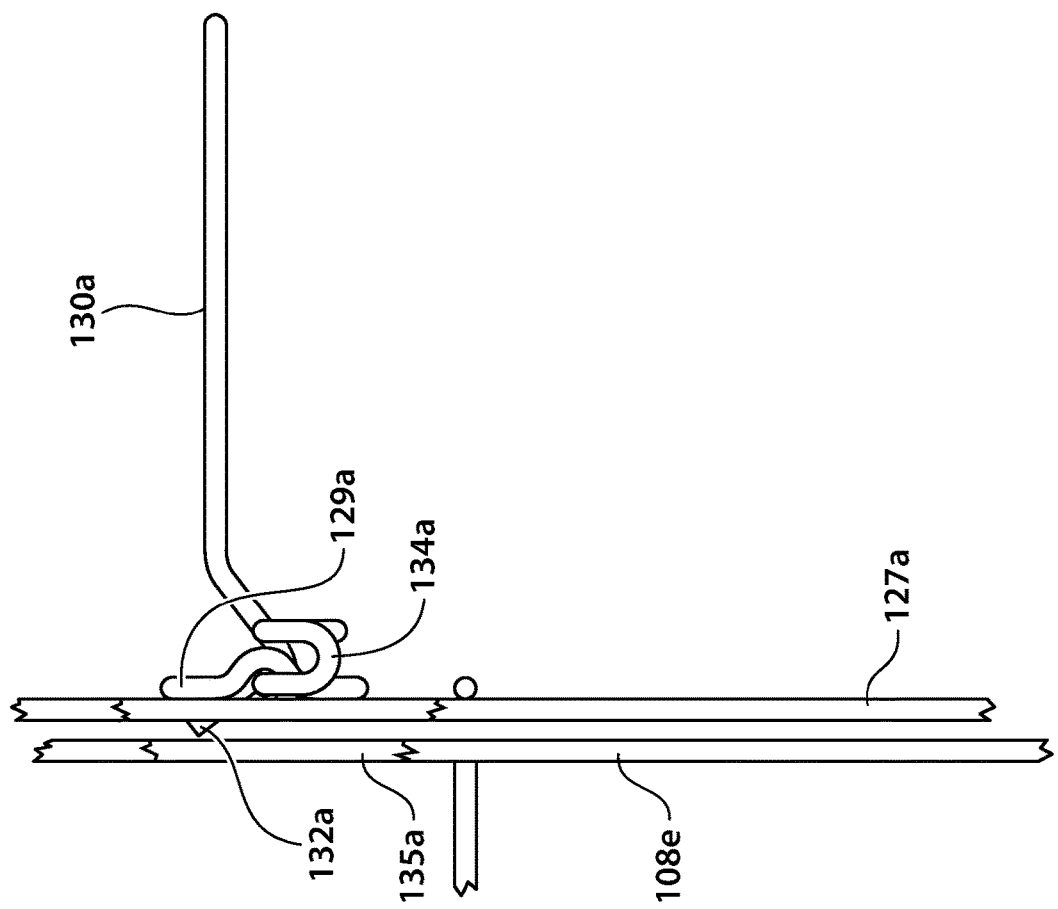
Figure 4E:
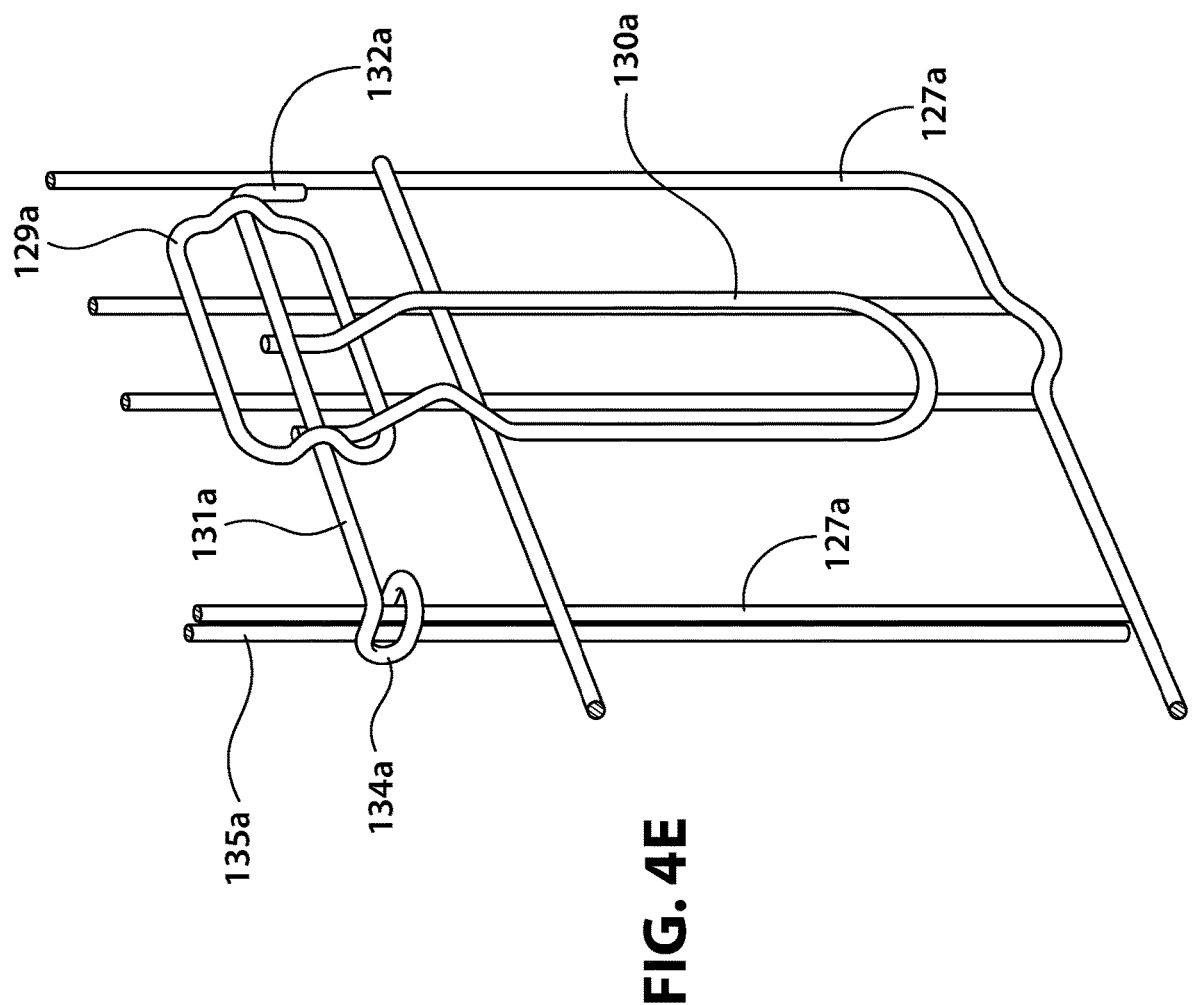
Figure 4F:
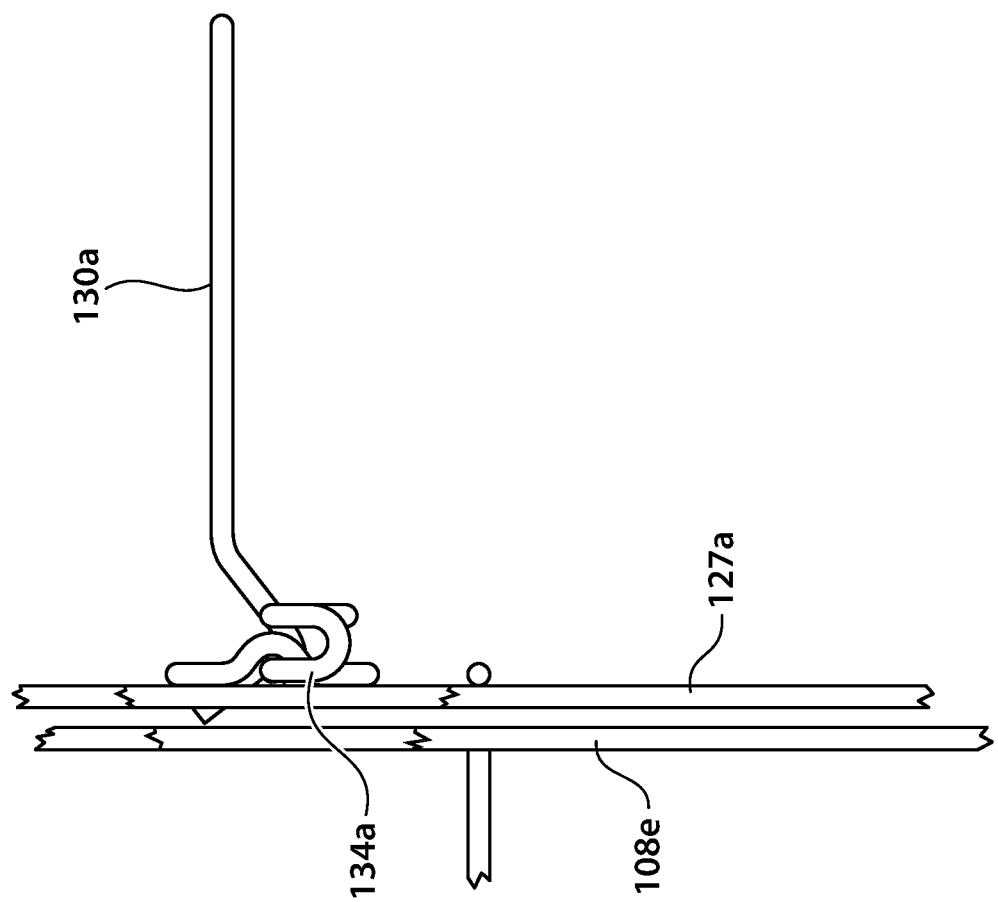
Figure 4G:
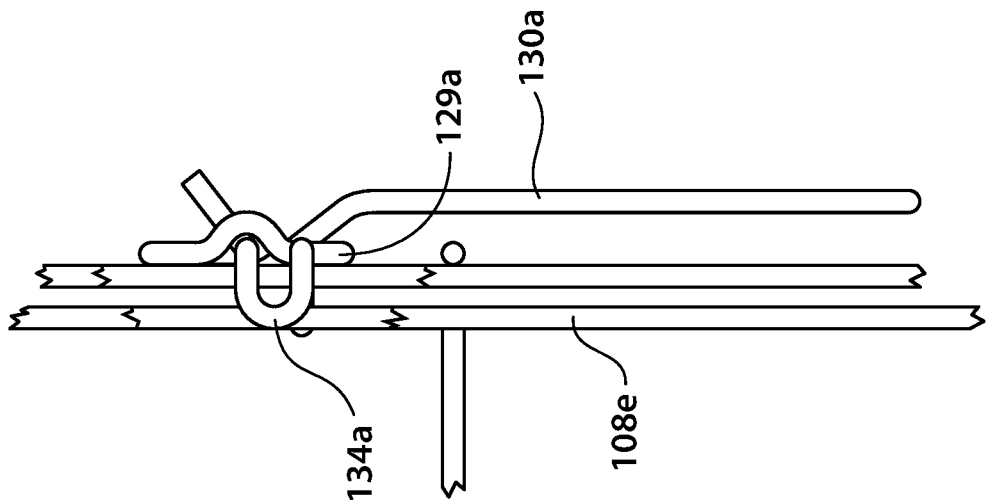
Figure 5A:
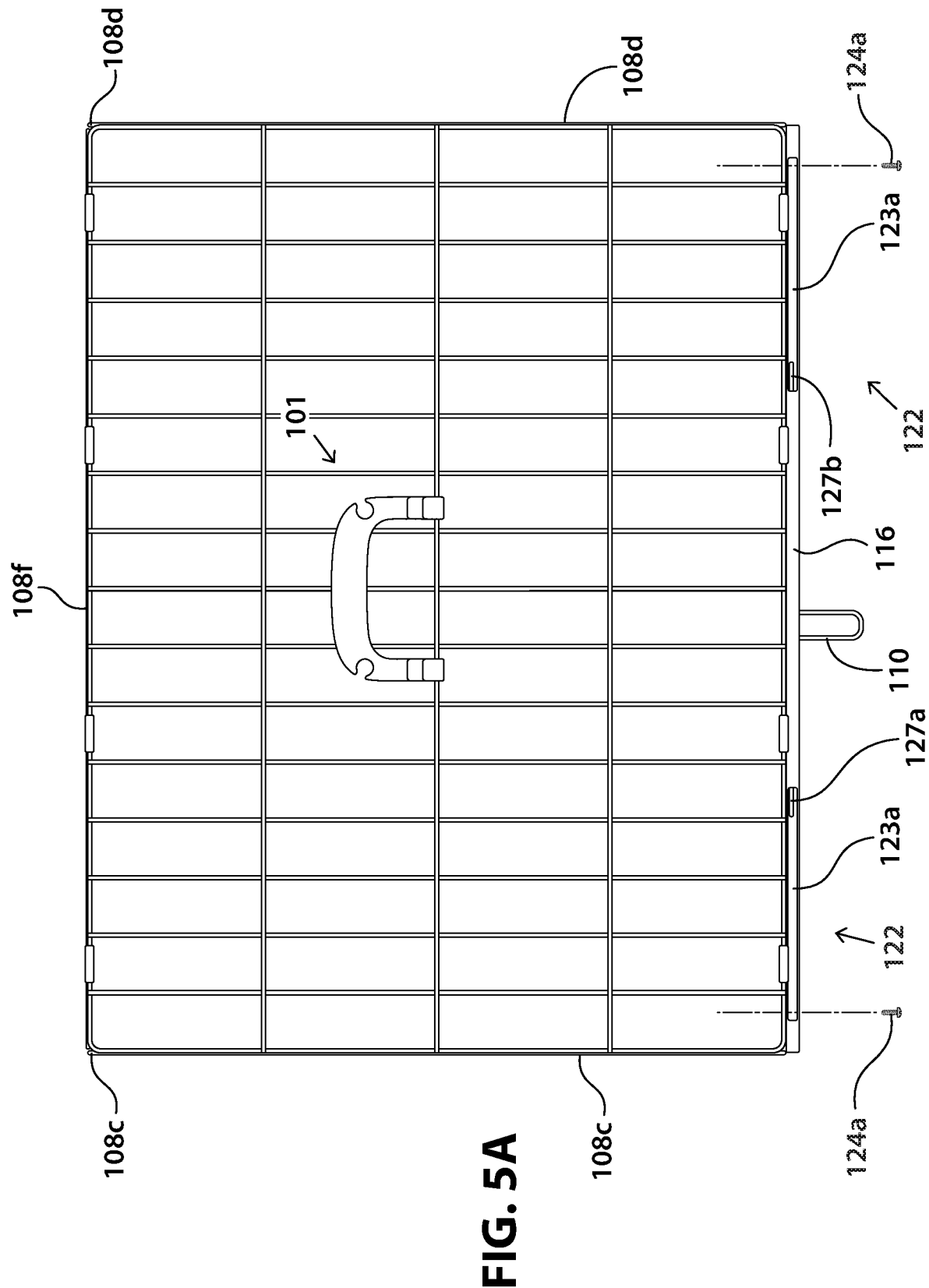
FIG. 5A illustrates a top view of the multi-pet-containing panel system, and the quick-assembly door-extracting-inserting system, especially the door extracting-inserting slots.
Figure 5B:
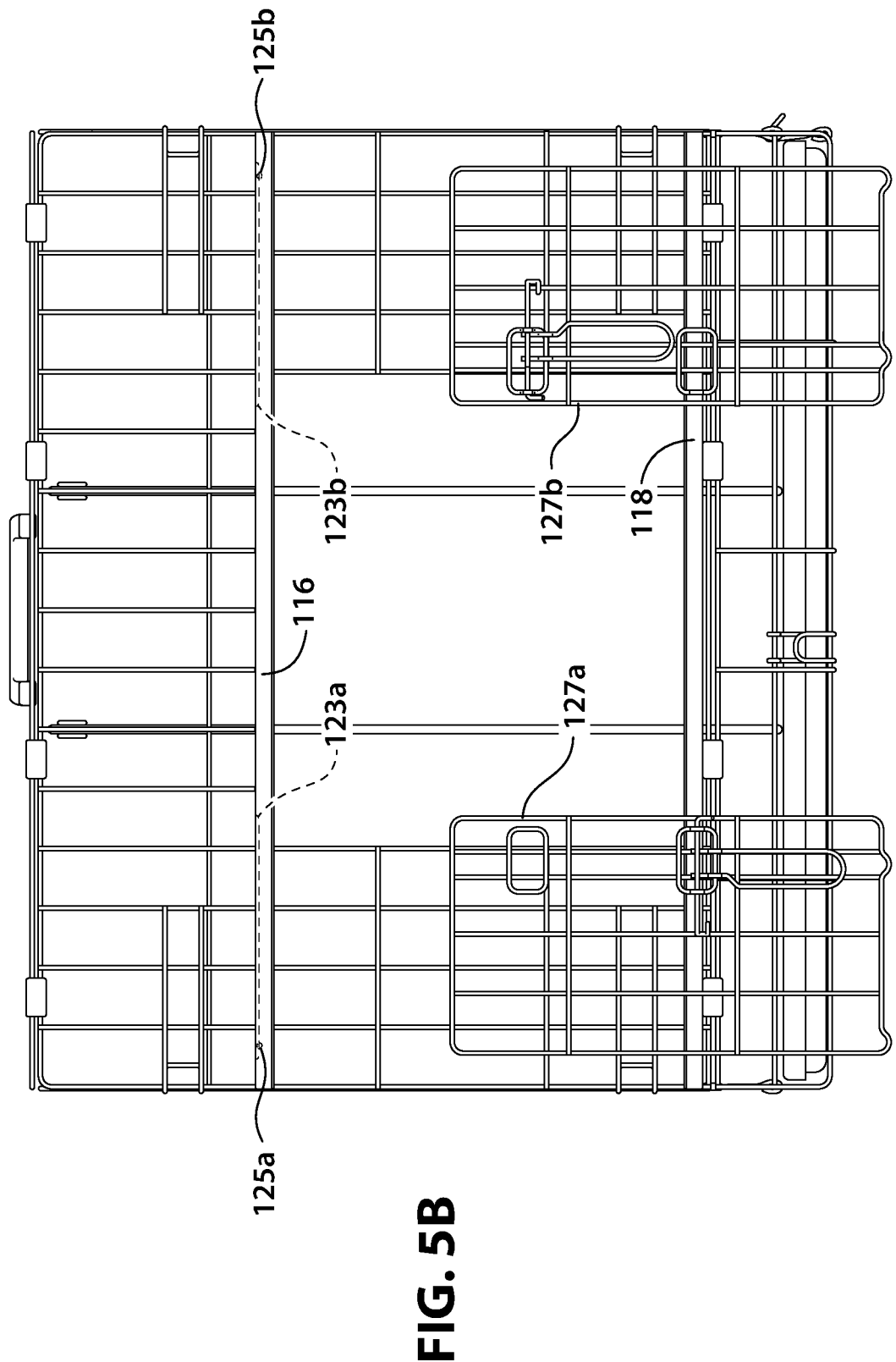
FIGS. 5B, 5C, and 5D illustrate front views of the installation of the first and second auto-indexing multi-position doors.
Figure 5C:
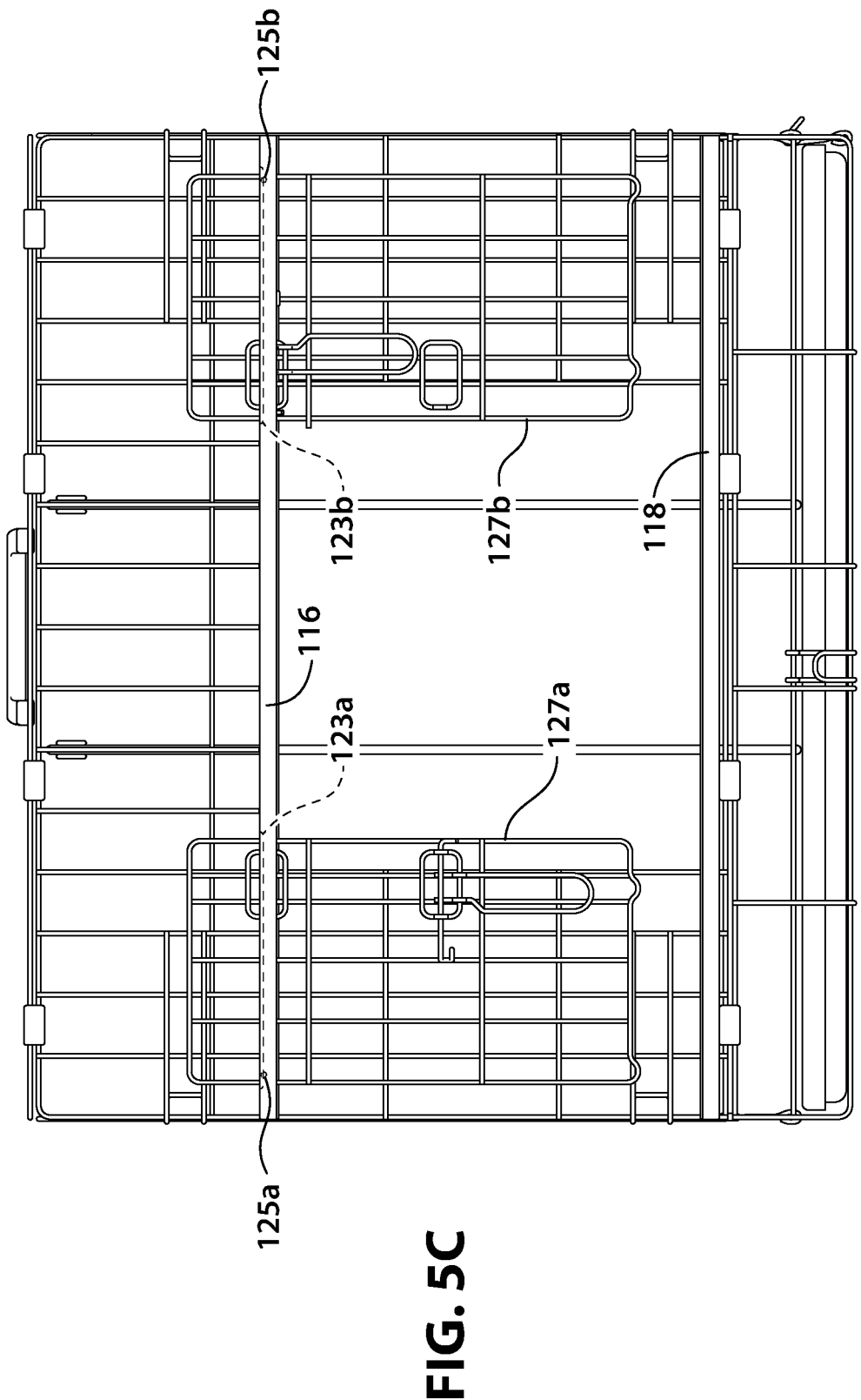
Figure 5D:
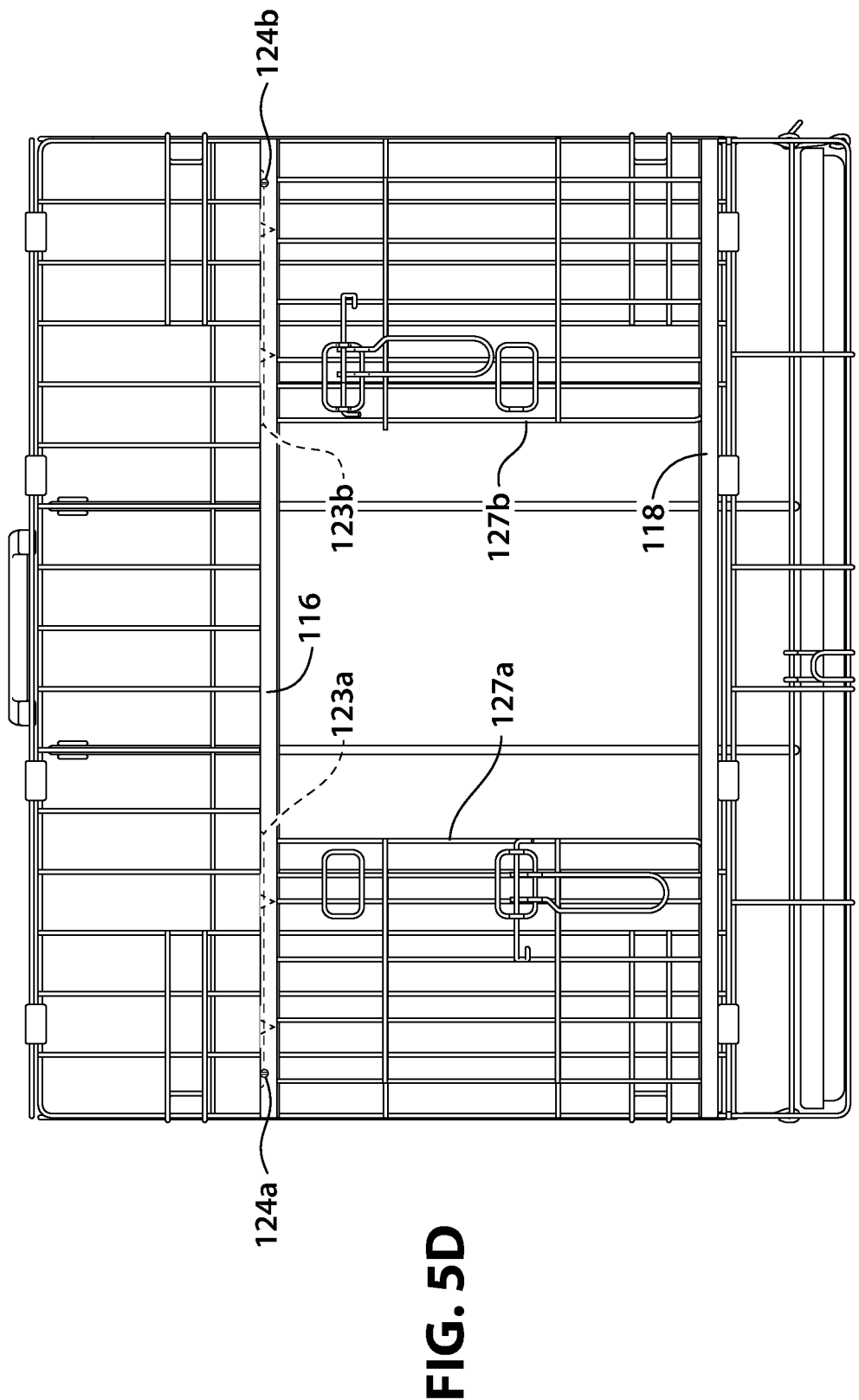
Figure 6:
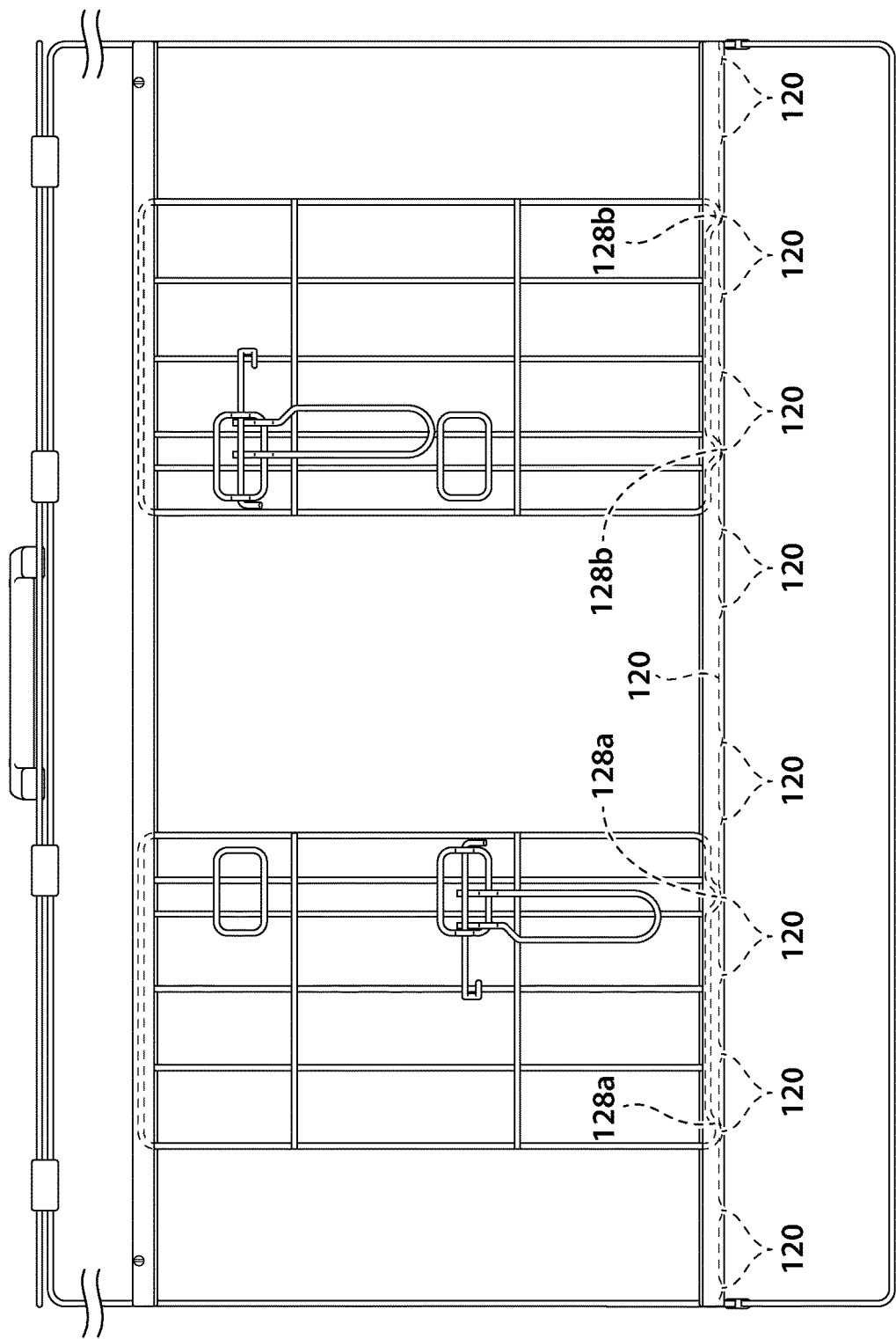
FIG. 6 illustrates a front view of the series of the door-corner-glider-locking recesses in the bottom low-friction rail, for positioning the first and second multi-position door-locking push-rod tails, to line up with the first and second multi-position push-rod-tail-locking wires.

The multi-pet locking-head-and-locking-tail-push-rod pet crate comprises:

1) Grooming-tool-poop-bag handle system,
2) Low-friction door-rail system,
3) Quick-assembly door system, and
4) Multi-position-double-locking-head-and-locking-tail multi-position-double-push-rod multi-position-double-door system.

Component

Referring to FIG. 1, FIG. 2A, FIG. 2B, FIG. 2C, FIG. 3A, FIG. 3B, FIG. 3C, FIG. 3D, FIG. 3E, FIG. 4A, FIG. 4B, FIG. 4C, FIG. 4D, FIG. 4E, FIG. 5A, FIG. 5B, FIG. 5C, FIG. 5D, FIG. 6, FIG. 7A, FIG. 7B, FIG. 7C, FIG. 7D, FIG. 7E, FIG. 7F, FIG. 7G, FIG. 7H, FIG. 8A, FIG. 8B, FIG. 9A, FIG. 9B, FIG. 9C, FIG. 9D, FIG. 9E, FIG. 9F, FIG. 10, FIG. 11A, FIG. 11b, FIG. 12A, and FIG. 12B, the multi-pet locking-tail-push-rod pet crate, (having grooming-tool-poop-bag handle system, low-friction door-rail system, quick-assembly door system, and multi-position locking-head-and-locking-tail push-rod system), comprises:

1) Mobile-grooming-tool-and-poop-bag-retaining handle system 101, comprising:
2) Handle bridge 102,
3) Handle stabilizers 103,
4) Multi-grooming-tool-clamping handle channel 104,
5) Poop-bag-clamping handle clasps 105, and
6) Handle hooks 106;
7) Multi-pet-containing panel system 107, comprising:
8) Top, bottom, left, right, front, and rear panels 108a, 108b, 108c, 108d, 108e, and 108f,
9) Panel-locking hooks 109,
10) Panel-folding clamp 110,
11) Panel-coupling clamps 111,
12) First and second door openings 112a and 112b,
13) First and second movable crate dividers 113a and 113b,
14) Slanted urine-storing-gutter tray 114a,
Urine-storing gutters 114b, and
Gutter ridges 114c;
15) Low-friction door-corner-recess-arc-rail system 115, comprising:
16) Top low-friction rail 116,
17) Top low-friction rail arcs 117a, 117b, and 117c,
18) Bottom low-friction rail 118,
19) Bottom low-friction rail arcs 119a, 119b, and 119c,
20) Multi-position door-corner-glider-locking recesses 120, and
21) Central doorstop 121;
22) Quick-assembly door-extracting-inserting system 122, comprising:
23) Door extracting-inserting slots 123a and 123b,
24) Door-blocking slot screws 124a and 124b, and
25) Slot-screw holes 125a and 125b; and
26) Multi-pet multi-position-double-locking-head-and-locking-tail multi-position-double-door system 126, comprising:
27) First and second auto-indexing multi-position doors 127a and 127b,
28) First and second auto-indexing multi-position door-corner-gliders 128a and 128b,
29) First and second push-rod hinges 129a and 129b,
30) First and second push-rod levers 130a and 130b,
31) First and second push-rods 131a and 131b,
32) First and second door-locking push-rod heads 132a and 132b,
33) First and second push-rod-head-locking rings 133a and 133b,
34) First and second multi-position door-locking push-rod tails 134a and 134b, and 35) First and second multi-position push-rod-tail-locking wires 135*a* and 135*b*.

Material

Referring to FIG. 1, FIG. 2A, FIG. 2B, FIG. 2C, FIG. 3A, FIG. 3B, FIG. 3C, FIG. 3D, FIG. 3E, FIG. 4A, FIG. 4B, FIG. 4C, FIG. 4D, FIG. 4E, FIG. 5A, FIG. 5B, FIG. 5C, FIG. 5D, FIG. 6, FIG. 7A, FIG. 7B, FIG. 7C, FIG. 7D, FIG. 7E, FIG. 7F, FIG. 7G, FIG. 7H, FIG. 8A, FIG. 8B, FIG. 9A, FIG. 9B, FIG. 9C, FIG. 9D, FIG. 9E, FIG. 9F, FIG. 10, FIG. 11A, FIG. 11*b*, FIG. 12A, and FIG. 12B:

1) Mobile-grooming-tool-and-poop-bag-retaining handle system 101 is made of the combined materials of its components.
2) Handle bridge 102
   is made of plastic material.
3) Handle stabilizers 103
   each are made of plastic material.
4) Multi-grooming-tool-clamping handle channel 104
   is made of empty space.
5) Poop-bag-clamping handle clasps 105
   each are made of plastic material.
6) Handle hooks 106
   each are made of plastic material.
7) Multi-pet-containing panel system 107 is made of the combined materials of its components.
8) Top, bottom, left, right, front, and rear panels 108*a*, 108*b*, 108*c*, 108*d*, 108*e*, and 108*f*
   each are made of metallic material.
9) Panel-locking hooks 109
   each are made of metallic material.
10) Panel-folding clamp 110
    is made of metallic material.
11) Panel-coupling clamps 111
    each are made of metallic material.
12) First and second door openings 112*a* and 112*b*
    each are made of empty space.
13) First and second movable crate dividers 113*a* and 113*b*
    each are made of metallic material.
14) Slanted urine-storing-gutter tray 114*a*
    is made of plastic material.
    Urine-storing gutters 114*b*
    each are made of plastic material.
    Gutter ridges 114*c*
    each are made of plastic material.
15) Low-friction door-corner-recess-arc-rail system 115 is made of the combined materials of its components.
16) Top low-friction rail 116
    is made of metallic material.
17) Top low-friction rail arcs 117*a*, 117*b*, and 117*c*
    each are made of metallic material.
18) Bottom low-friction rail 118
    is made of metallic material.
19) Bottom low-friction rail arcs 119*a*, 119*b*, and 119*c*
    each are made of metallic material.
20) Multi-position door-corner-glider-locking recesses 120
    each are made of empty space material.
21) Central doorstop 121
    is made of metallic material.
22) Quick-assembly door-extracting-inserting system 122 is made of the combined materials of its components.
23) Door extracting-inserting slots 123*a* and 123*b*
    each are made of empty space.
24) Door-blocking slot screws 124*a* and 124*b*
    each are made of metallic material.
25) Slot-screw holes 125*a* and 125*b*
    each are made of empty space.
26) Multi-pet multi-position-double-door system 126 is made of the combined materials of its components.
27) First and second auto-indexing multi-position doors 127*a* and 127*b*
    each are made of metallic material.
28) First and second auto-indexing multi-position door-corner-gliders 128*a* and 128*b*
    each are made of metallic material.
29) First and second push-rod hinges 129*a* and 129*b*
    each are made of metallic material.
30) First and second push-rod levers 130*a* and 130*b*
    each are made of metallic material.
31) First and second push-rods 131*a* and 131*b*
    each are made of metallic material.
32) First and second door-locking push-rod heads 132*a* and 132*b*
    each are made of metallic material.
33) First and second push-rod-head-locking rings 133*a* and 133*b*
    each are made of metallic material.
34) First and second multi-position door-locking push-rod tails 134*a* and 134*b*
    each are made of metallic material.
35) First and second multi-position push-rod-tail-locking wires 135*a* and 135*b*
    each are made of metallic material.

Shape

Referring to FIG. 1, FIG. 2A, FIG. 2B, FIG. 2C, FIG. 3A, FIG. 3B, FIG. 3C, FIG. 3D, FIG. 3E, FIG. 4A, FIG. 4B, FIG. 4C, FIG. 4D, FIG. 4E, FIG. 5A, FIG. 5B, FIG. 5C, FIG. 5D, FIG. 6, FIG. 7A, FIG. 7B, FIG. 7C, FIG. 7D, FIG. 7E, FIG. 7F, FIG. 7G, FIG. 7H, FIG. 8A, FIG. 8B, FIG. 9A, FIG. 9B, FIG. 9C, FIG. 9D, FIG. 9E, FIG. 9F, FIG. 10, FIG. 11A, FIG. 11*b*, FIG. 12A, and FIG. 12B:

1) Mobile-grooming-tool-and-poop-bag-retaining handle system 101 has the combined shapes of its components.
2) Handle bridge 102
   has an I shape with a C-shaped cross-section.
3) Handle stabilizers 103
   each have a cylindrical shape.
4) Multi-grooming-tool-clamping handle channel 104
   has a cylindrical shape.
5) Poop-bag-clamping handle clasps 105
   each have a C shape.
6) Handle hooks 106
   each have a C shape.
7) Multi-pet-containing panel system 107 has the combined shapes of its components.
8) Top, bottom, left, right, front, and rear panels 108*a*, 108*b*, 108*c*, 108*d*, 108*e*, and 108*f*
   each have a rectangular shape.
9) Panel-locking hooks 109
   each have a J shape.
10) Panel-folding clamp 110
    has a C shape.
11) Panel-coupling clamps 111
    each have a C shape.
12) First and second door openings 112*a* and 112*b*
    each have a rectangular shape.
13) First and second movable crate dividers 113*a* and 113*b*
    each have a rectangular shape.
14) Slanted urine-storing-gutter tray 114*a*
    has a rectangular shape.
    Urine-storing gutters 114*b*
    each have an O shape with a U-shaped cross-section.
    Gutter ridges 114*c*
    each have an I shape.

15) Low-friction door-corner-recess-arc-rail system 115 has the combined shapes of its components.
16) Top low-friction rail 116
    has an I shape with a U-shaped cross-section.
17) Top low-friction rail arcs 117*a*, 117*b*, and 117*c*
    each have a C shape.
18) Bottom low-friction rail 118
    has an I shape with a U-shaped cross-section.
19) Bottom low-friction rail arcs 119*a*, 119*b*, and 119*c*
    each have a C shape.
20) Multi-position door-corner-glider-locking recesses 120
    each have a cup shape.
21) Central doorstop 121
    has a I shape.
22) Quick-assembly door-extracting-inserting system 122
    has the combined shapes of its components.
23) Door extracting-inserting slots 123*a* and 123*b*
    each have a rectangular shape.
24) Door-blocking slot screws 124*a* and 124*b*
    each have a screw shape.
25) Slot-screw holes 125*a* and 125*b*.
    each have a circular shape.
26) Multi-pet multi-position-double-door system has the combined shapes of its components.
27) First and second auto-indexing multi-position doors 127*a* and 127*b*
    each have a rectangular shape.
28) First and second auto-indexing multi-position door-corner-gliders 128*a* and 128*b*
    each have a U shape.
29) First and second push-rod hinges 129*a* and 129*b*
    each have an O shape.
30) First and second push-rod levers 130*a* and 130*b*
    each have a G shape.
31) First and second push-rods 131*a* and 131*b*
    each have a I shape.
32) First and second door-locking push-rod heads 132*a* and 132*b*
    each have an L shape.
33) First and second push-rod-head-locking rings 133*a* and 133*b*
    each have a rectangular-ring shape.
34) First and second multi-position door-locking push-rod tails 134*a* and 134*b*
    each have a U shape.
35) First and second multi-position push-rod-tail-locking wires 135*a* and 135*b*
    each have an I shape.
Connection
    Referring to FIG. 1, FIG. 2A, FIG. 2B, FIG. 2C, FIG. 3A, FIG. 3B, FIG. 3C, FIG. 3D, FIG. 3E, FIG. 4A, FIG. 4B, FIG. 4C, FIG. 4D, FIG. 4E, FIG. 5A, FIG. 5B, FIG. 5C, FIG. 5D, FIG. 6, FIG. 7A, FIG. 7B, FIG. 7C, FIG. 7D, FIG. 7E, FIG. 7F, FIG. 7G, FIG. 7H, FIG. 8A, FIG. 8B, FIG. 9A, FIG. 9B, FIG. 9C, FIG. 9D, FIG. 9E, FIG. 9F, FIG. 10, FIG. 11A, FIG. 11*b*, FIG. 12A, and FIG. 12B:
1) Mobile-grooming-tool-and-poop-bag-retaining handle system 101 has the combined connections of its components.
2) Handle bridge 102
    is molded to handle stabilizers 103.
3) Handle stabilizers 103
    respectively are molded to handle hooks 106.
4) Multi-grooming-tool-clamping handle channel 104
    is molded inside handle bridge 102.
5) Poop-bag-clamping handle clasps 105
    respectively are molded in handle stabilizers 103.
6) Handle hooks 106
    respectively are hooked on top panel 108*a*.
7) Multi-pet-containing panel system 107 has the combined connections of its components.
8) Top, bottom, left, right, front, and rear panels 108*a*, 108*b*, 108*c*, 108*d*, 108*e*, and 108*f*,
    respectively are hooked together.
9) Panel-locking hooks 109
    respectively are hooked on top, left, right, front, and rear panels
    108*a*, 108*c*, 108*d*, 108*e*, and 108*f*.
10) Panel-folding clamp 110
    is clamped on top, bottom, left, right, front, and rear panels
    108*a*, 108*b*, 108*c*, 108*d*, 108*e*, and 108*f*.
11) Panel-coupling clamps 111
    respectively are clamped on top, bottom, left, right, front, and rear panels
    108*a*, 108*b*, 108*c*, 108*d*, 108*e*, and 108*f*.
12) First and second door openings 112*a* and 112*b*
    respectively are created inside front panel 108*e*.
13) First and second movable crate dividers 113*a* and 113*b*
    respectively are disposed inside top, bottom, left, right, front, and rear panels 108*a*, 108*b*, 108*c*, 108*d*, 108*e*, and 108*f*.
14) Slanted urine-storing-gutter tray 114*a*
    is disposed on bottom panel 108*b*.
    Urine-storing gutters 114*b*
    respectively are molded around slanted urine-storing-gutter tray 114*a*.
    Gutter ridges 114*c*
    respectively are molded inside urine-storing gutters 114*b*.
15) Low-friction door-corner-recess-arc-rail system 115 has the combined connections of its components.
16) Top low-friction rail 116
    is welded to front panel 108*e*.
17) Top low-friction rail arcs 117*a*, 117*b*, and 117*c*
    respectively are cast in top low-friction rail 116.
18) Bottom low-friction rail 118
    is welded to front panel 108*e*.
19) Bottom low-friction rail arcs 119*a*, 119*b*, and 119*c*
    respectively are cast in bottom low-friction rail 118.
20) Multi-position door-corner-glider-locking recesses 120
    respectively are formed in bottom low-friction rail 118.
21) Central doorstop 121
    is welded to bottom low-friction rail 118.
22) Quick-assembly door-extracting-inserting system 122
    has the combined connections of its components.
23) Door extracting-inserting slots 123*a* and 123*b*
    respectively are formed in top low-friction rail 116.
24) Door-blocking slot screws 124*a* and 124*b*
    respectively are screwed into slot-screw holes 125*a* and 125*b*.
25) Slot-screw holes 125*a* and 125*b*
    respectively are drilled in top low-friction rail 116.
26) Multi-pet multi-position-double-door system 126 has the combined connections of its components.
27) First and second auto-indexing multi-position doors 127*a* and 127*b*
    respectively and slidably are inserted between top low-friction rail 116 and bottom low-friction rail 118.
28) First and second auto-indexing multi-position door-corner-gliders 128*a* and 128*b*
    respectively are cast to first and second auto-indexing multi-position doors 127*a* and 127*b*.
29) First and second push-rod hinges 129*a* and 129*b* respectively are welded to first and second auto-indexing multi-position doors 127*a* and 127*b*.

30) First and second push-rod levers 130*a* and 130*b* respectively are welded to first and second push-rod hinges 129*a* and 129*b*.

31) First and second push-rods 131*a* and 131*b* respectively and rotatably are attached to first and second push-rod hinges 129*a* and 129*b*.

32) First and second door-locking push-rod heads 132*a* and 132*b* respectively are cast to first and second push-rods 131*a* and 131*b*.

33) First and second push-rod-head-locking rings 133*a* and 133*b* respectively are welded to first and second auto-indexing multi-position doors 127*a* and 127*b*.

34) First and second multi-position door-locking push-rod tails 134*a* and 134*b* respectively are cast to first and second push-rods 131*a* and 131*b*.

35) First and second multi-position push-rod-tail-locking wires 135*a* and 135*b* respectively are welded to front panel 108*e*.

Function

Referring to FIG. 13A, FIG. 13B, FIG. 13C, FIG. 14A, FIG. 14B, FIG. 14C, FIG. 14D, FIG. 14E, FIG. 15A, FIG. 15B, FIG. 15C, FIG. 15D, FIG. 15E, FIG. 15F, FIG. 16A, FIG. 16B, FIG. 16C, and FIG. 17:

1) Mobile-grooming-tool-and-poop-bag-retaining handle system 101 is for performing the combined functions of its components.

2) Handle bridge 102 is for:
   Being held on to carry the multi-pet locking-tail push-rod pet crate.

3) Handle stabilizers 103 respectively are for:
   Providing vertical support between the ends of handle bridge 102.

Figure 9B:
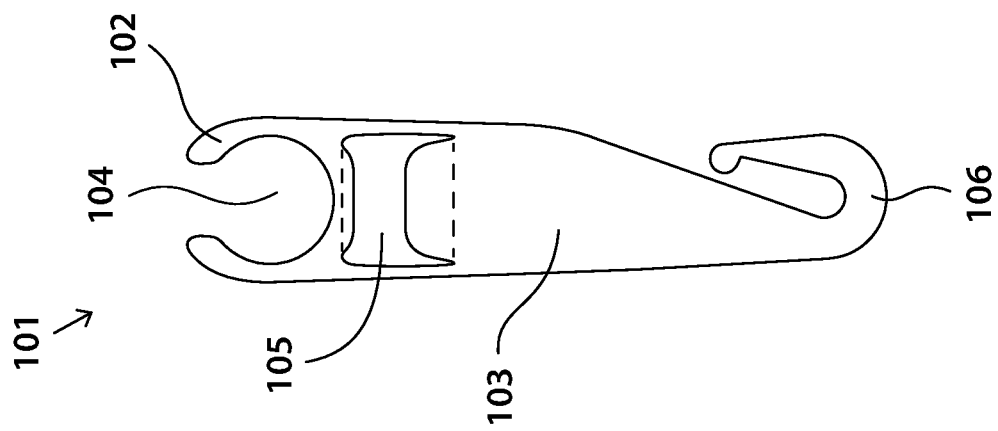
Figure 9A:
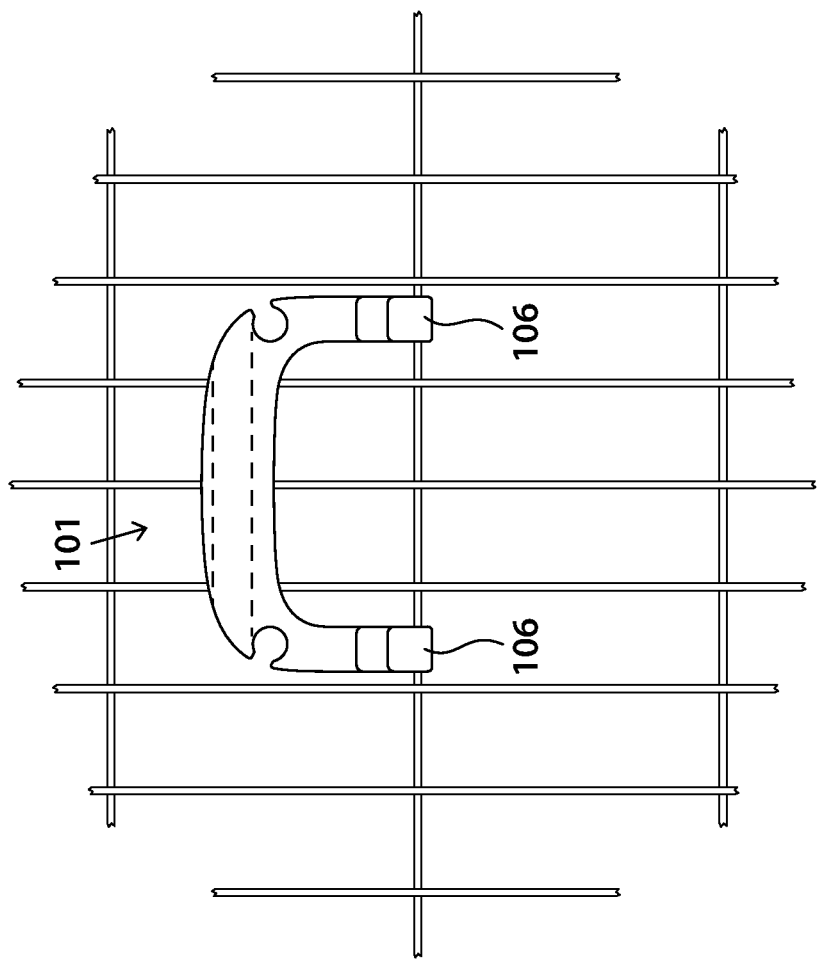
Figure 9E:
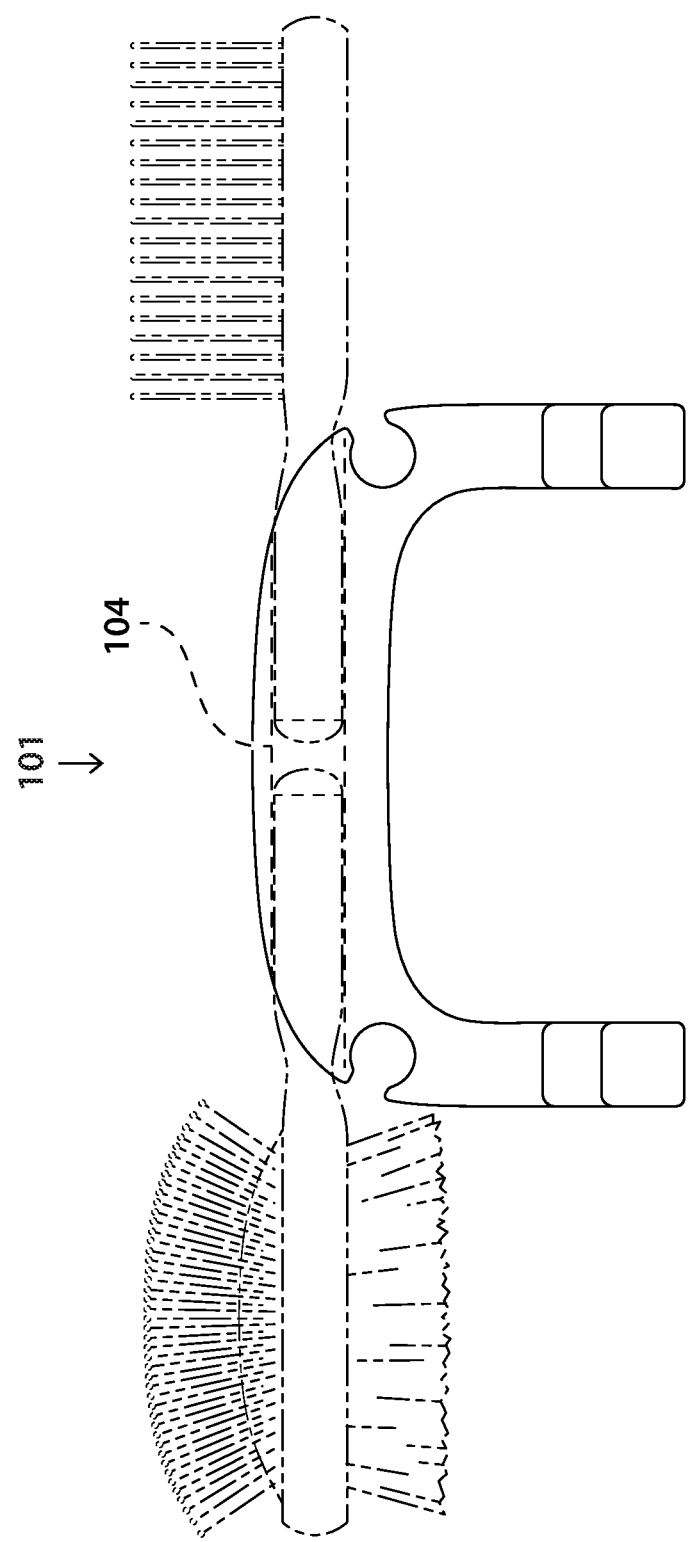

4) Multi-grooming-tool-clamping handle channel 104 is for:
   a) Insertably containing multi-grooming tools;
   b) Being used as a hook,
      to store multi-grooming tools
      (see FIG. 9E);
   c) Being used as a hook,
      to store pet toys
      (see FIG. 9E);
   d) Being used as a hook,
      to hold leashes
      (see FIG. 9E); and
   e) Being used as a clamp,
      to hold papers and documents
      (see FIG. 9E).

Figure 9F:
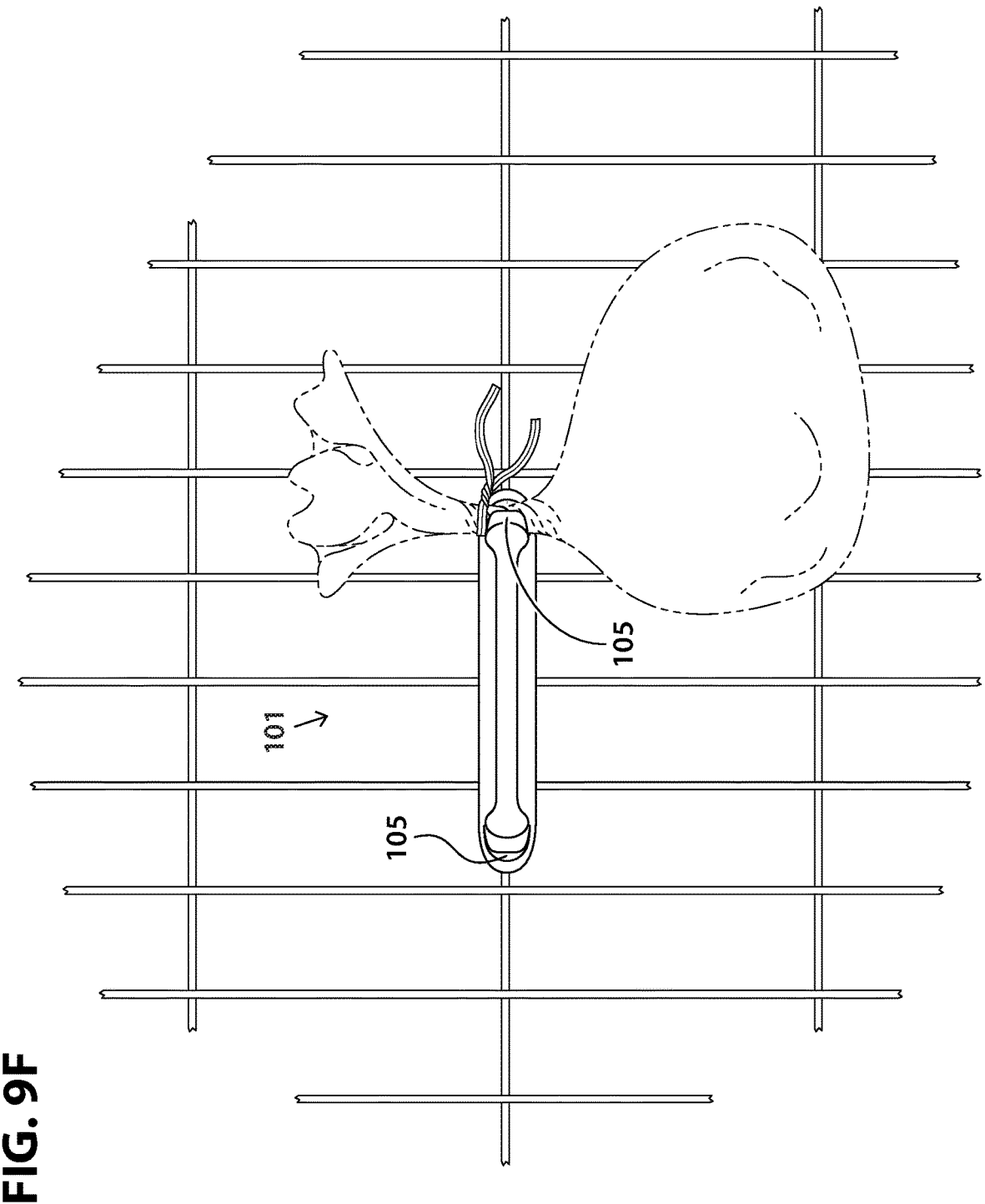
Figure 10:
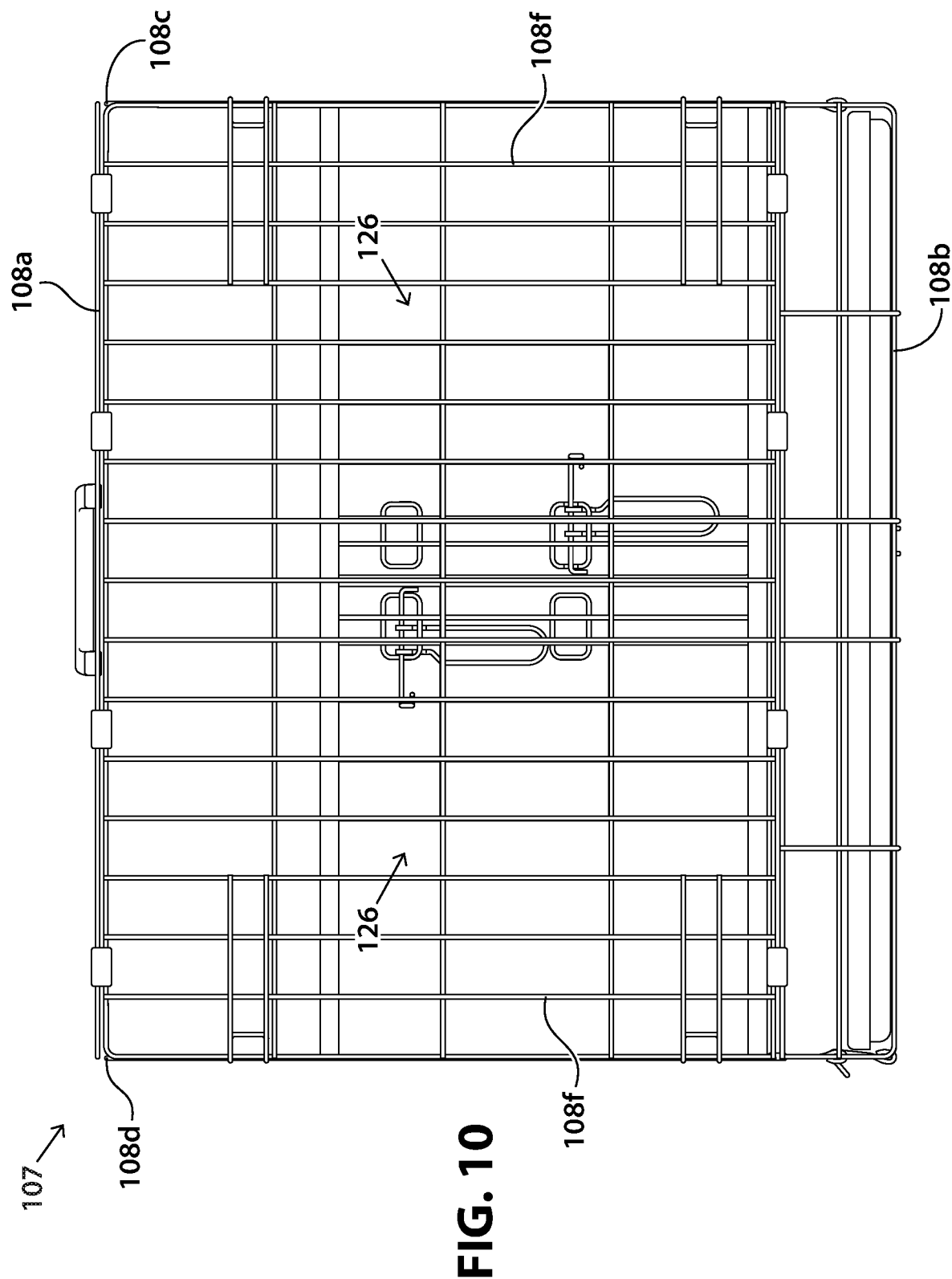
FIG. 10 illustrates a back view of the multi-pet-containing panel system, showing the rear panel.
Figure 11A:
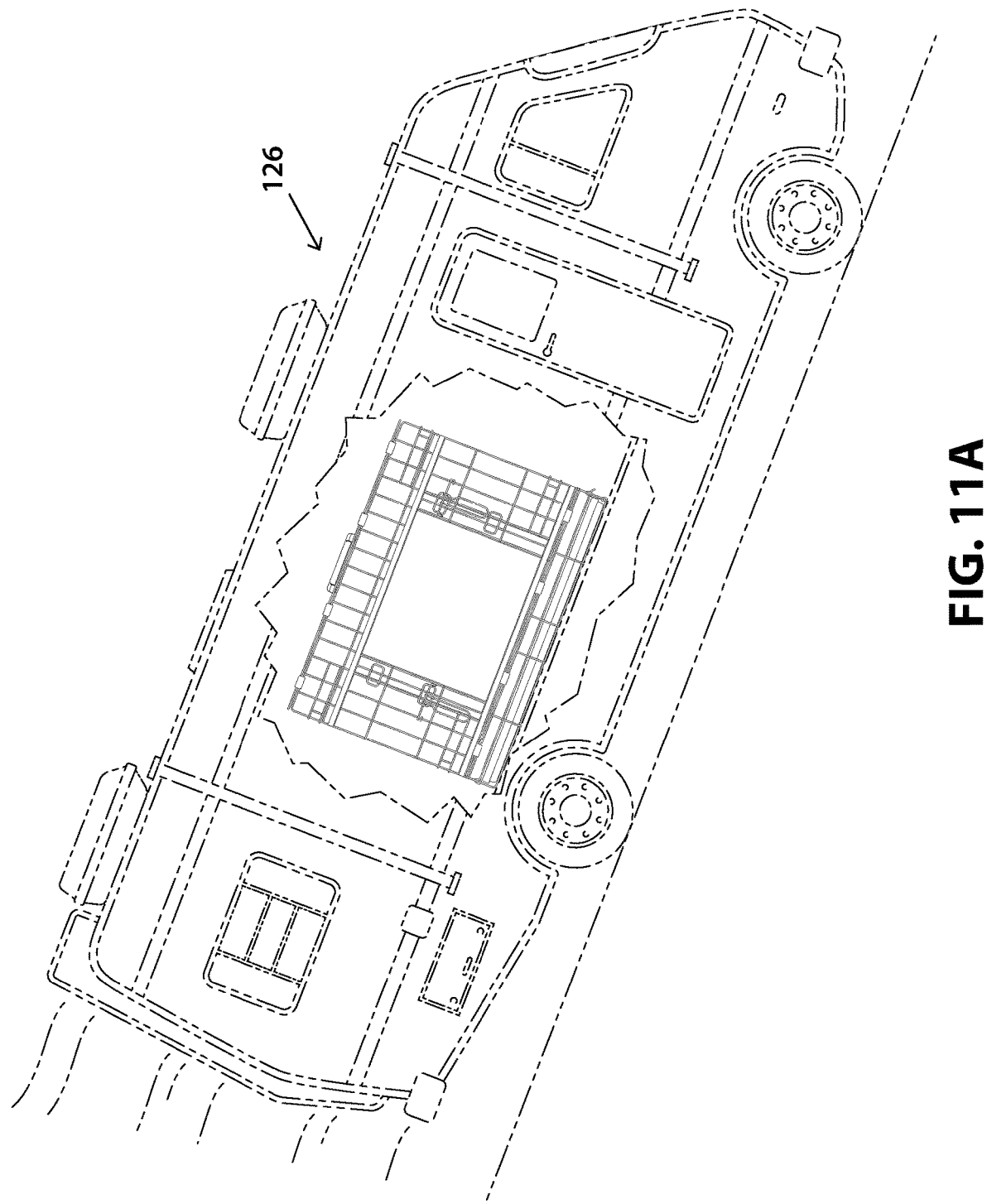
FIGS. 11A and 11B illustrate front views of the multi-pet locking-tail-push-rod pet crate overcoming the gravitational forces when positioned on a moving, inclined vehicle floor, a non-moving, inclined driveway, or other stationary surface.
Figure 11B:
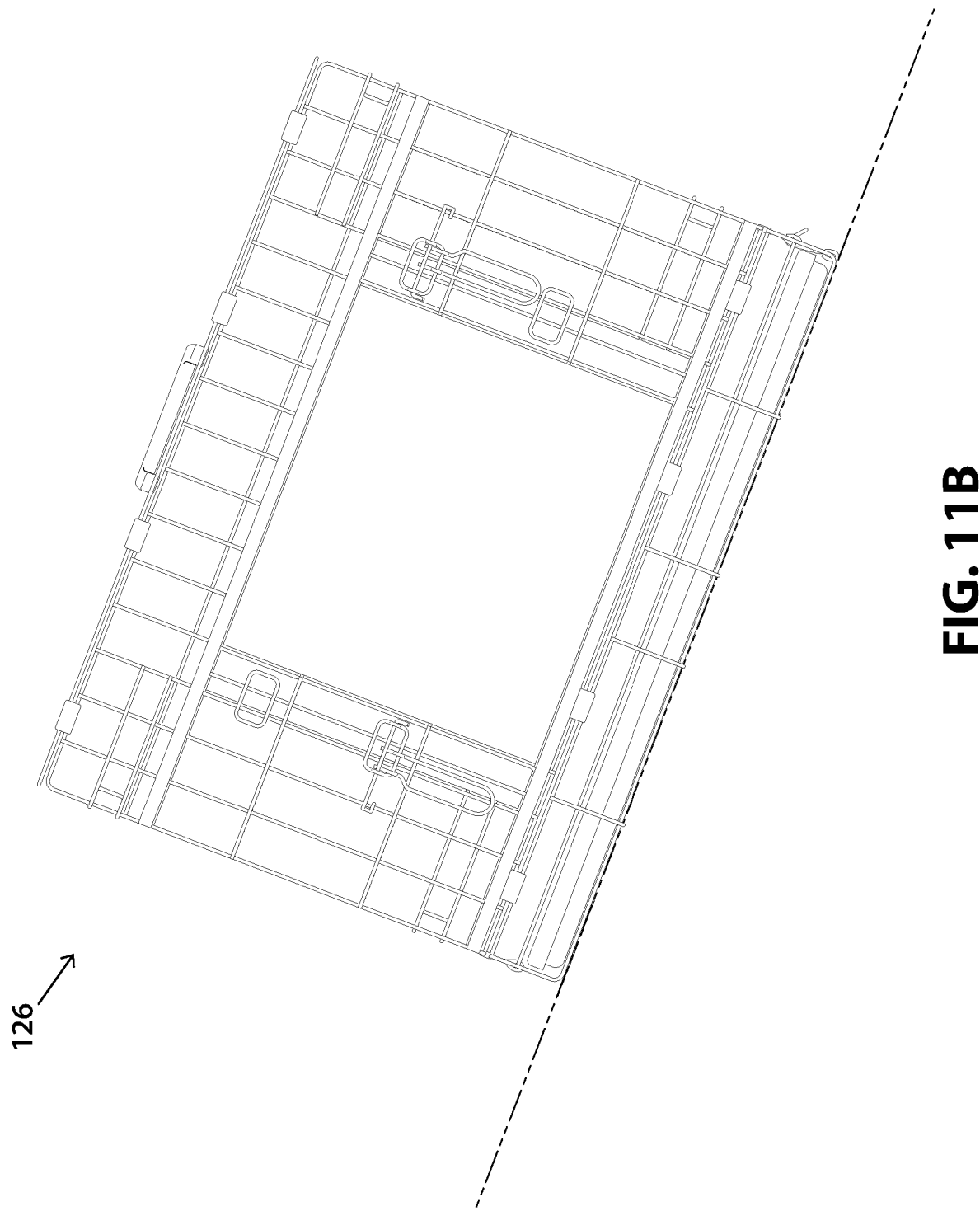
Figure 13A:
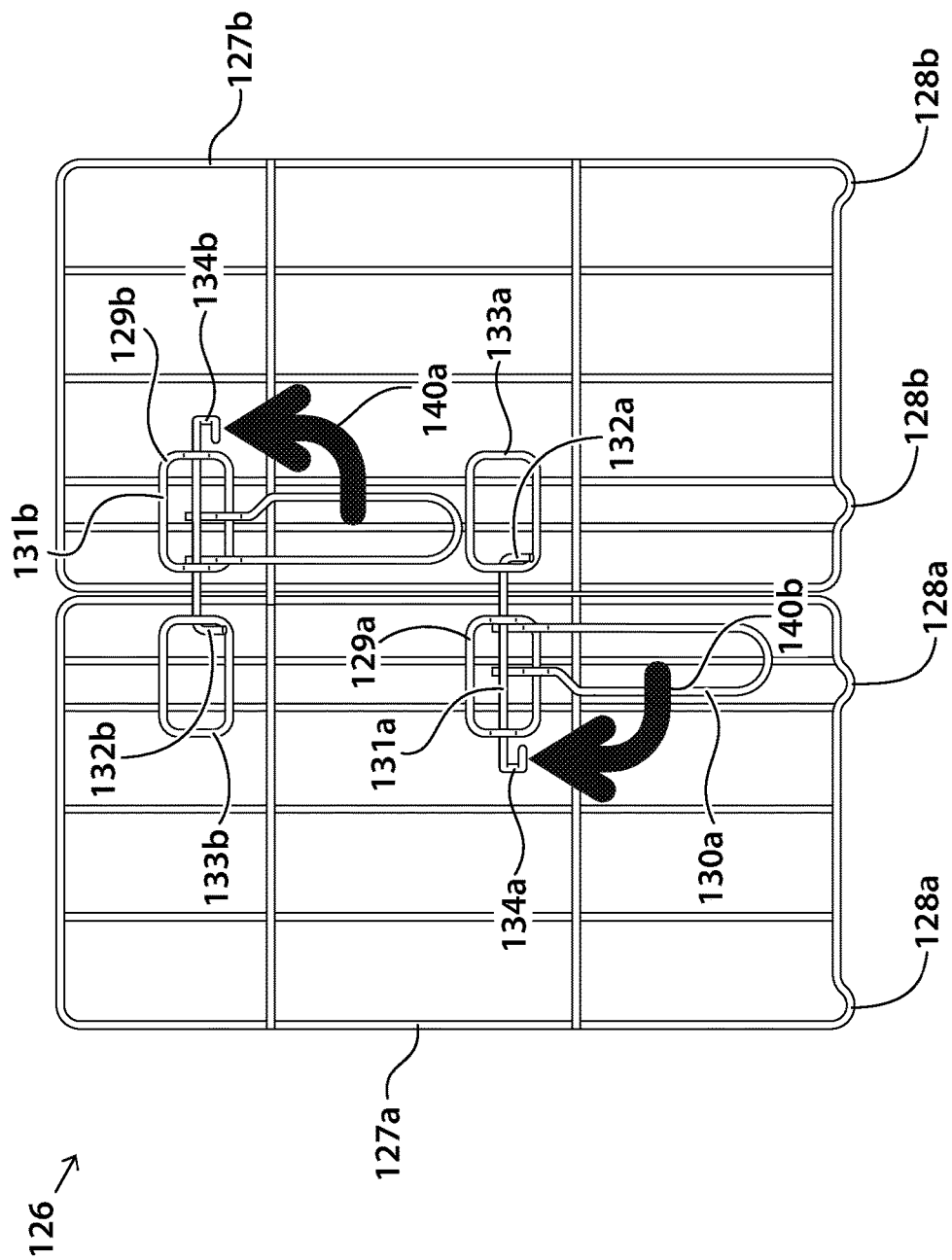
FIGS. 13A, 13B, 13C, illustrate front views of how to lock the first and second auto-indexing multi-position doors.
Figure 13B:
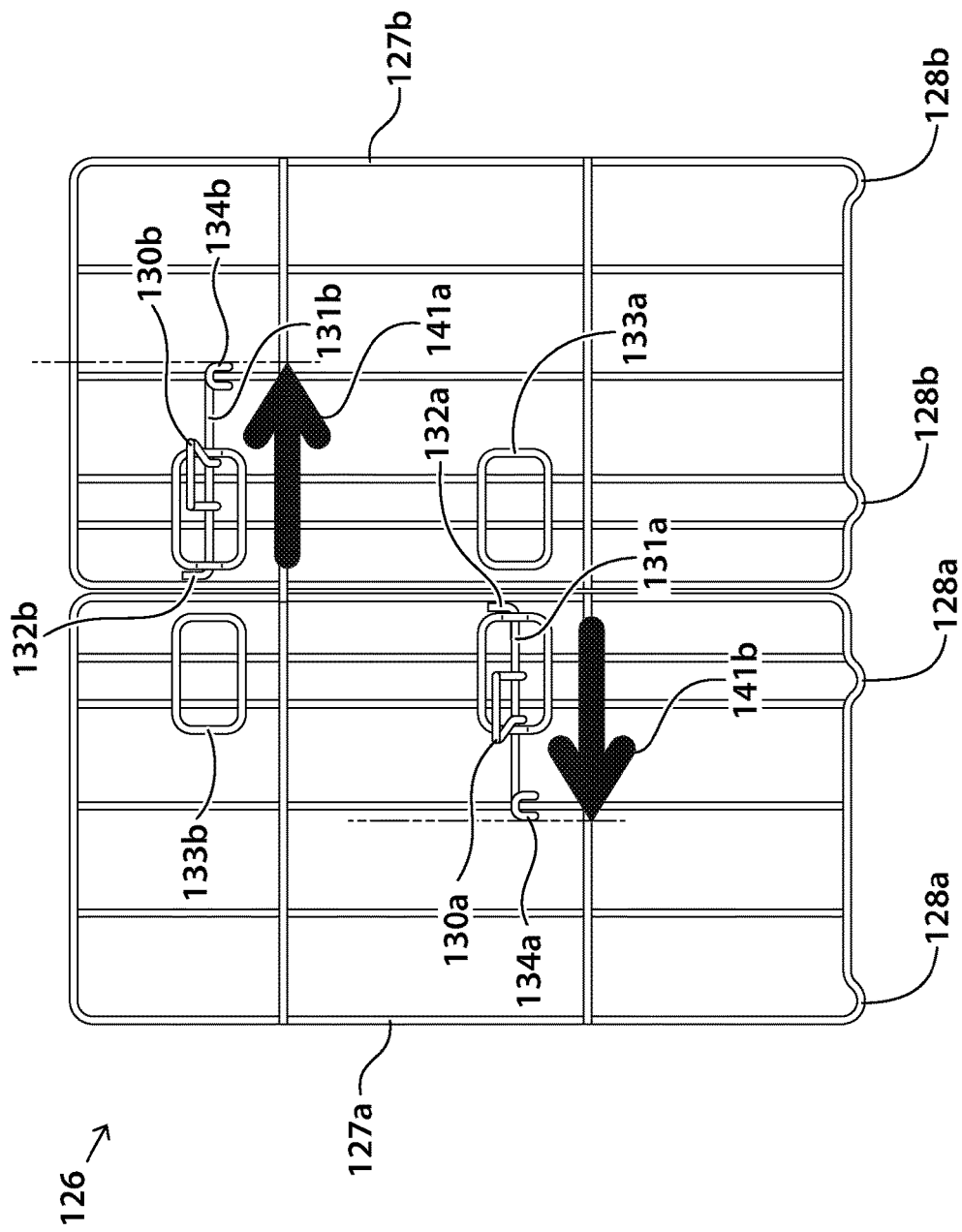
Figure 13C:
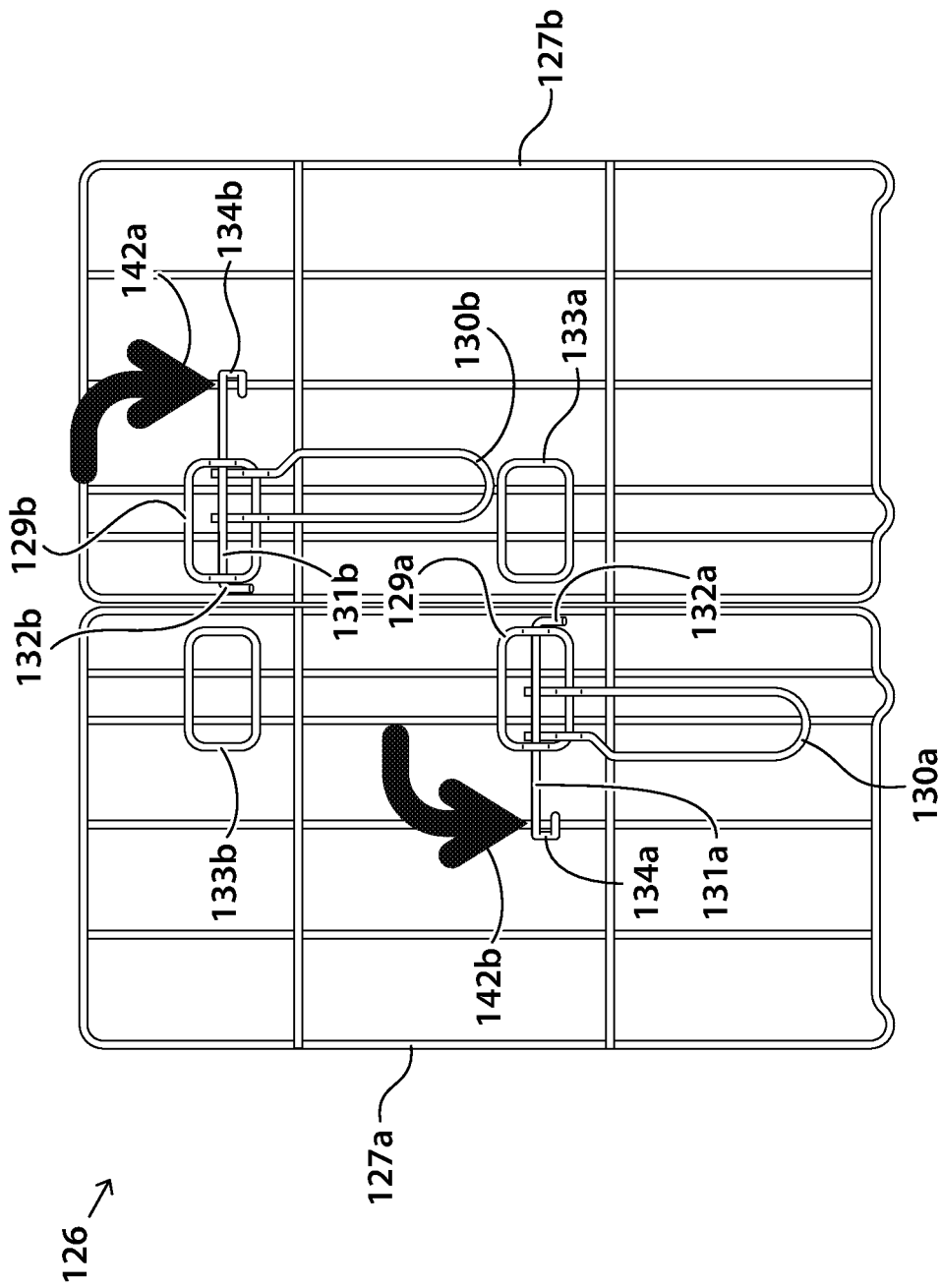
Figure 14A:
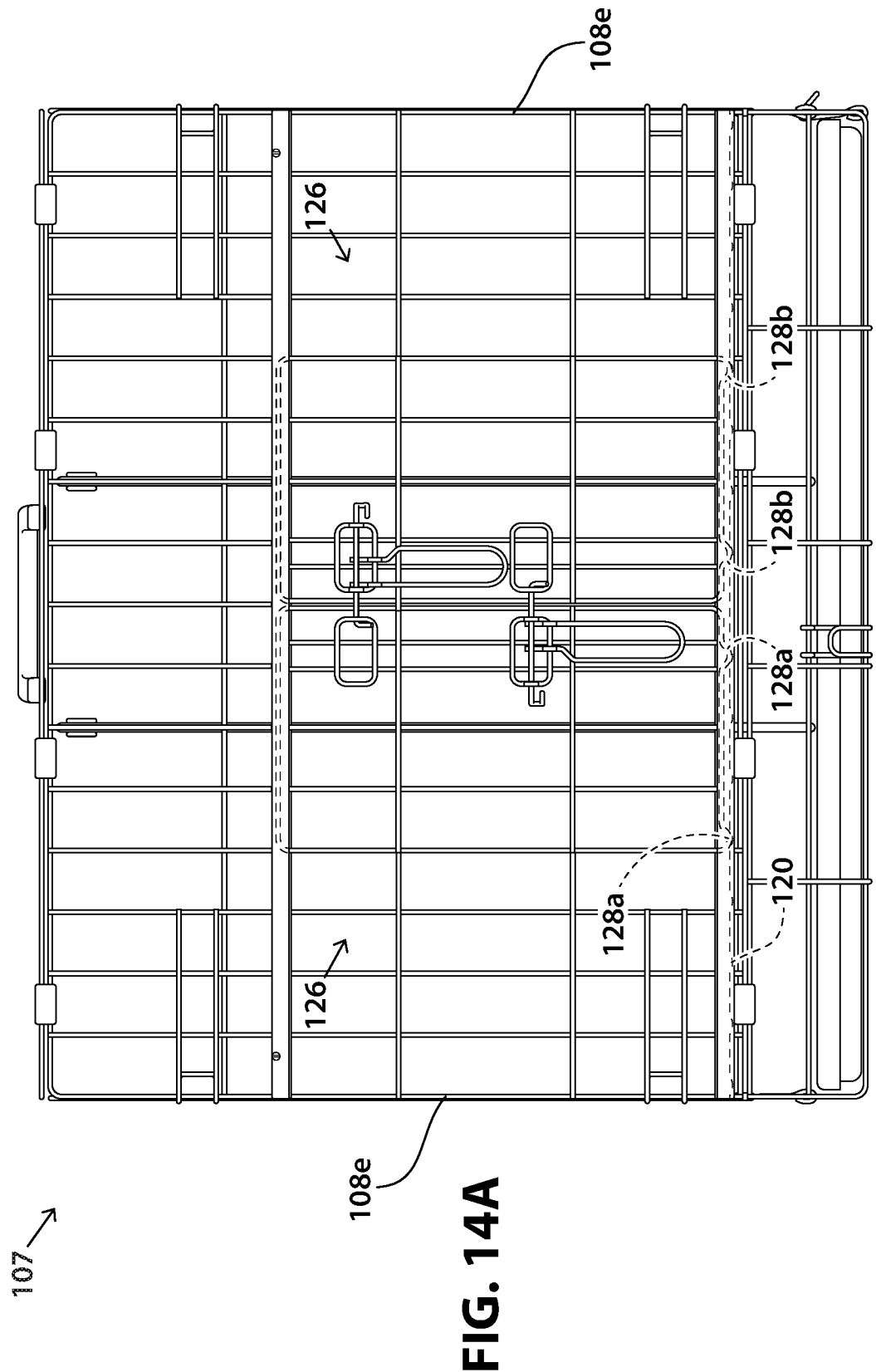
FIGS. 14A, 14B, 14C, 14D, and 14E illustrate front views of how to lock the first and second auto-indexing multi-position doors in multiple positions.
Figure 14B:
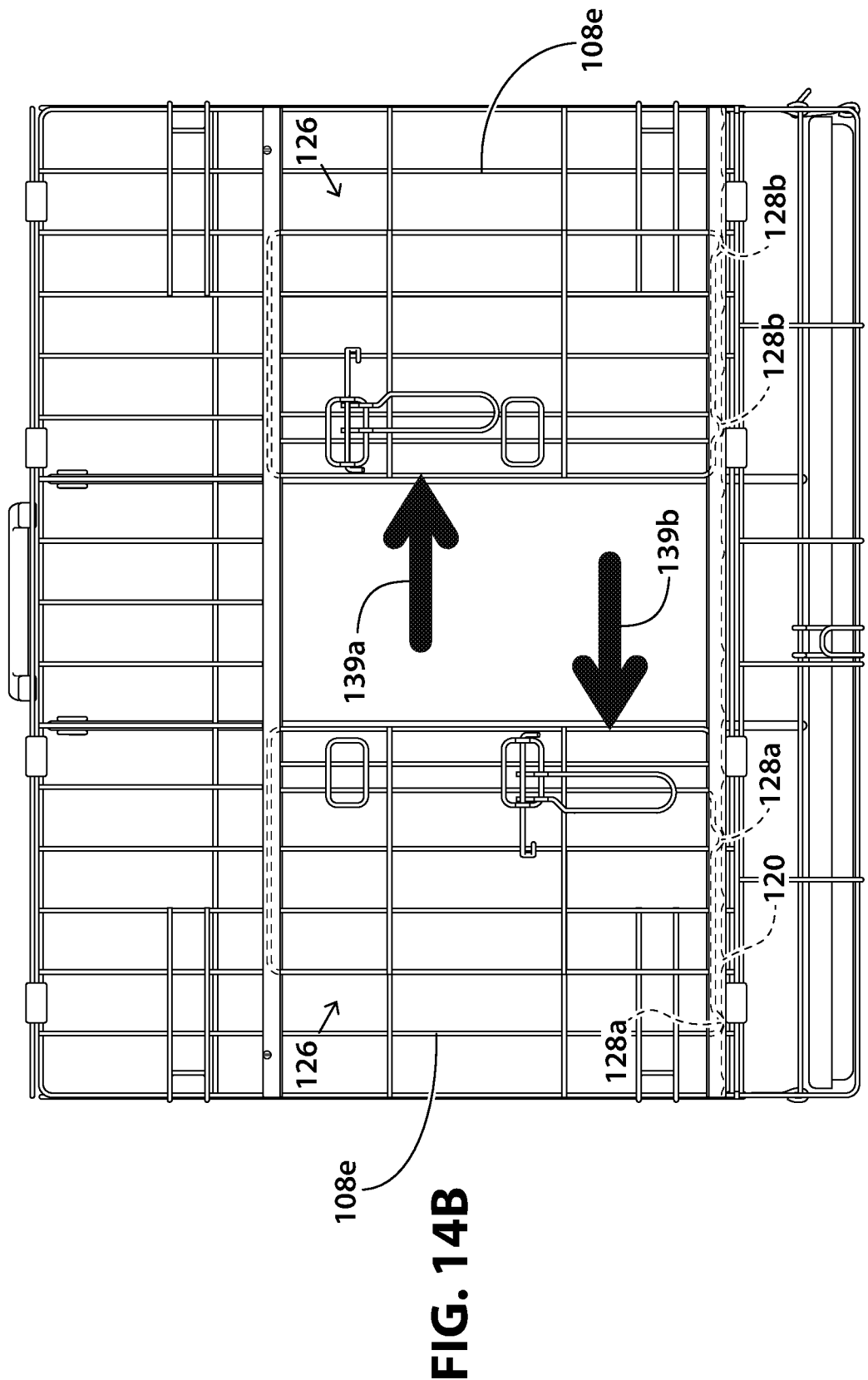
Figure 14C:
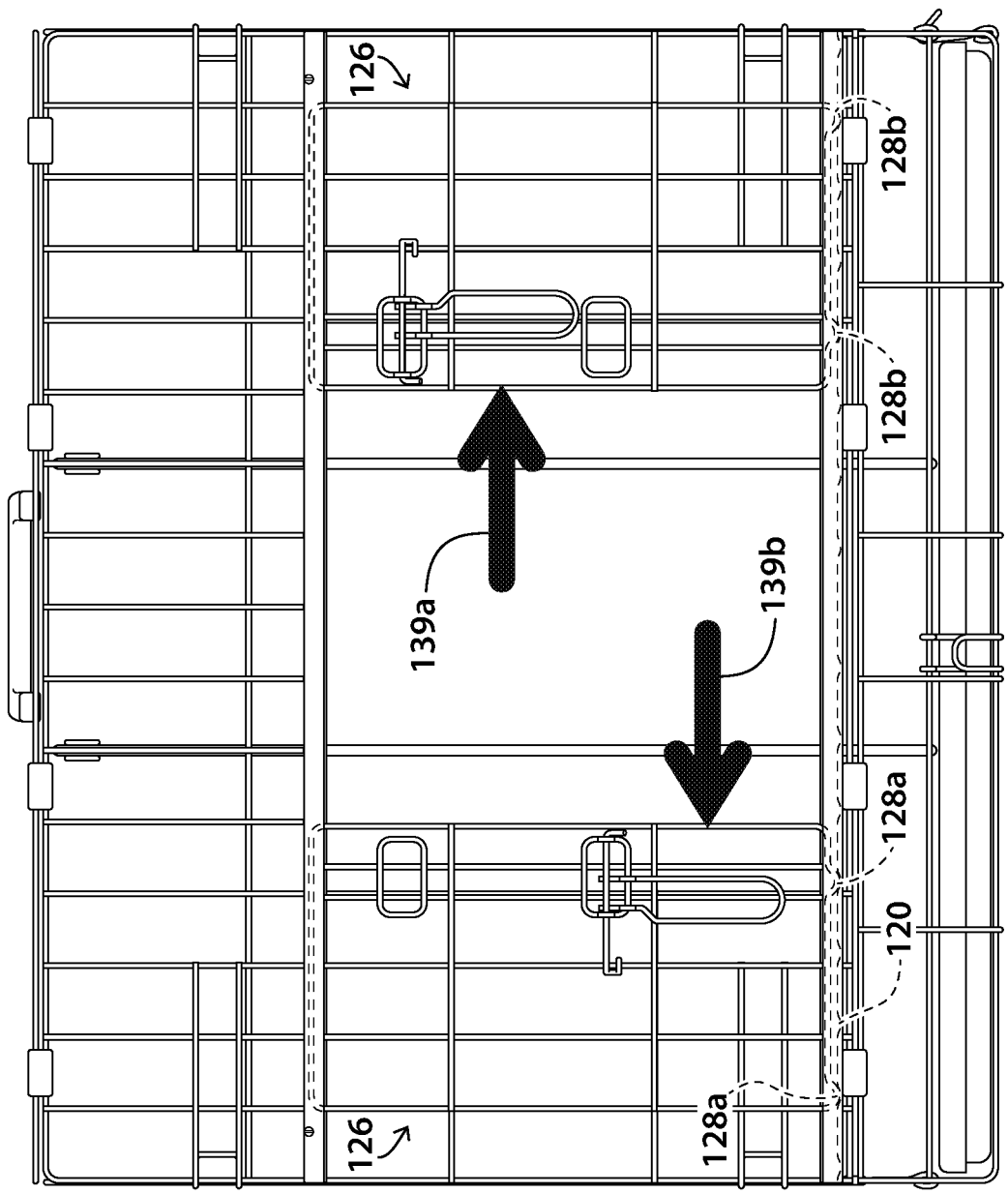
Figure 14D:
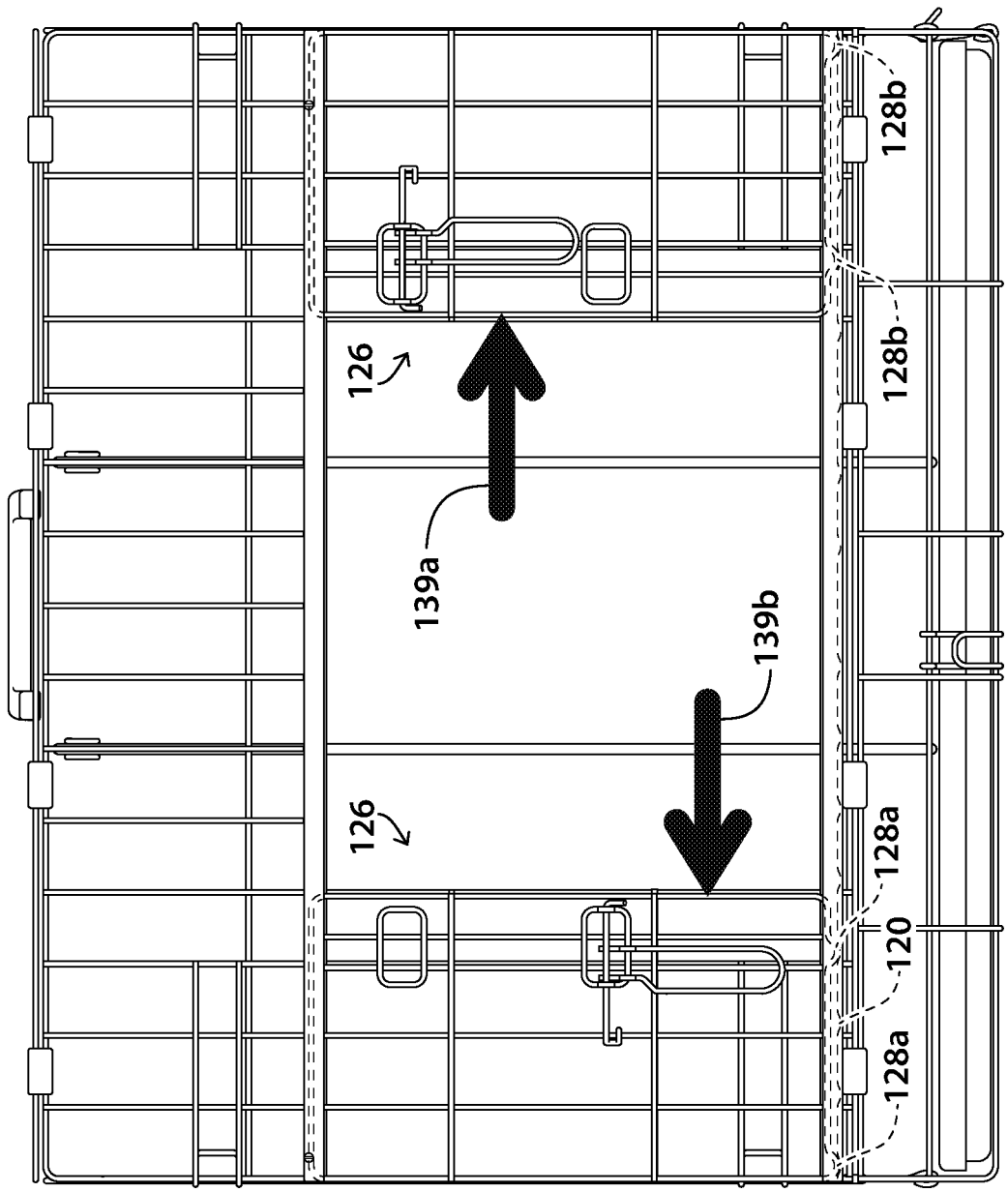
Figure 14E:
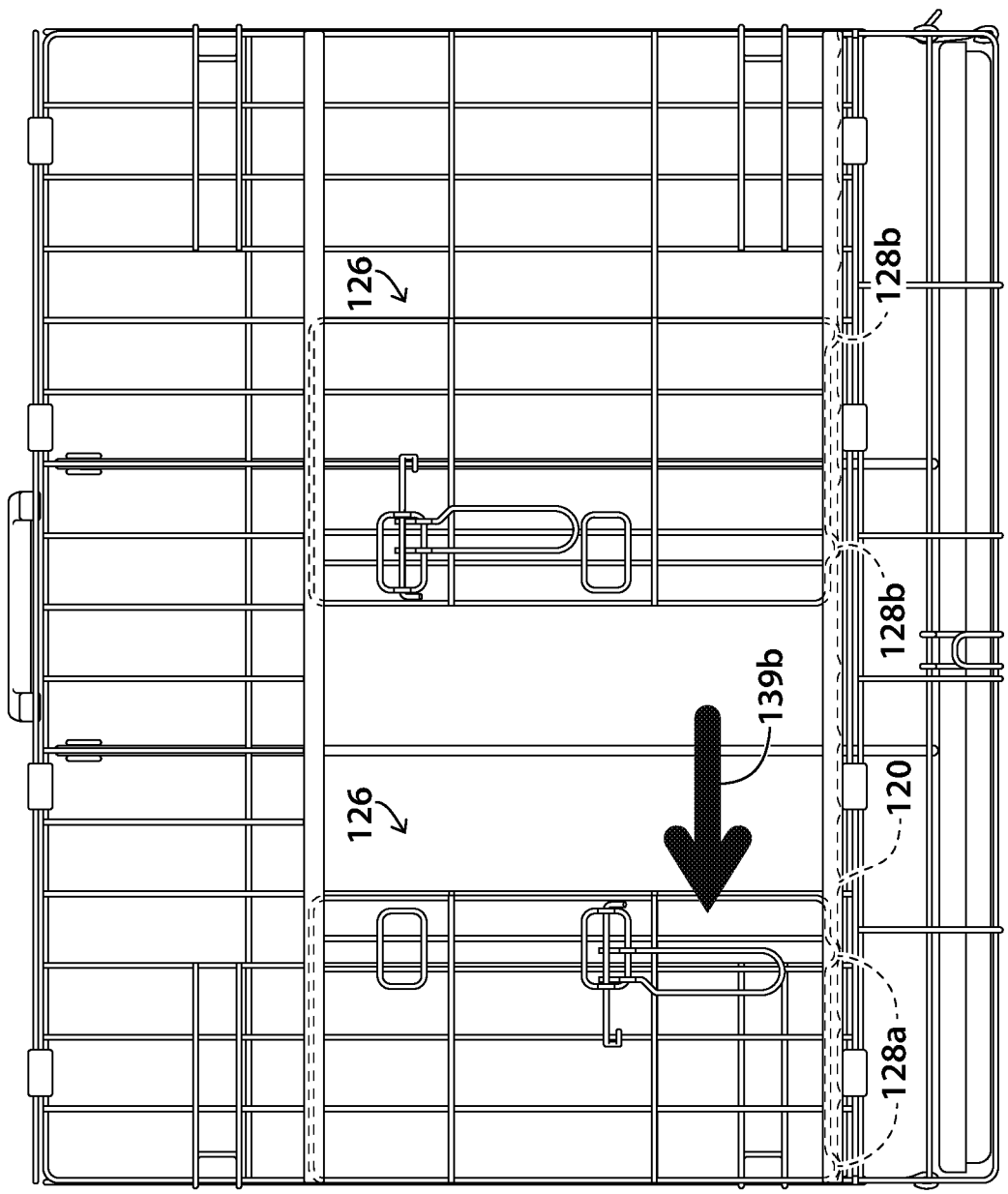
Figure 15B:
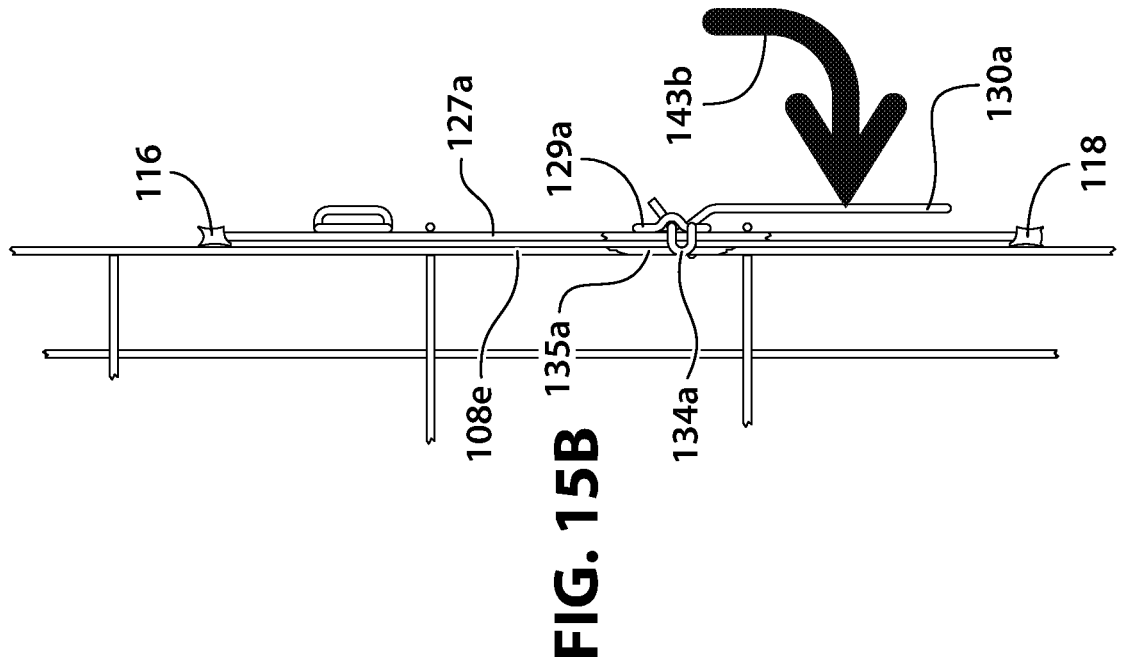
FIGS. 15A, 15B, 15C, 15D, 15E, and 15F illustrate front views of how to lock the first and second auto-indexing multi-position doors in multiple positions to the front panel in multiple positions.
Figure 15A:
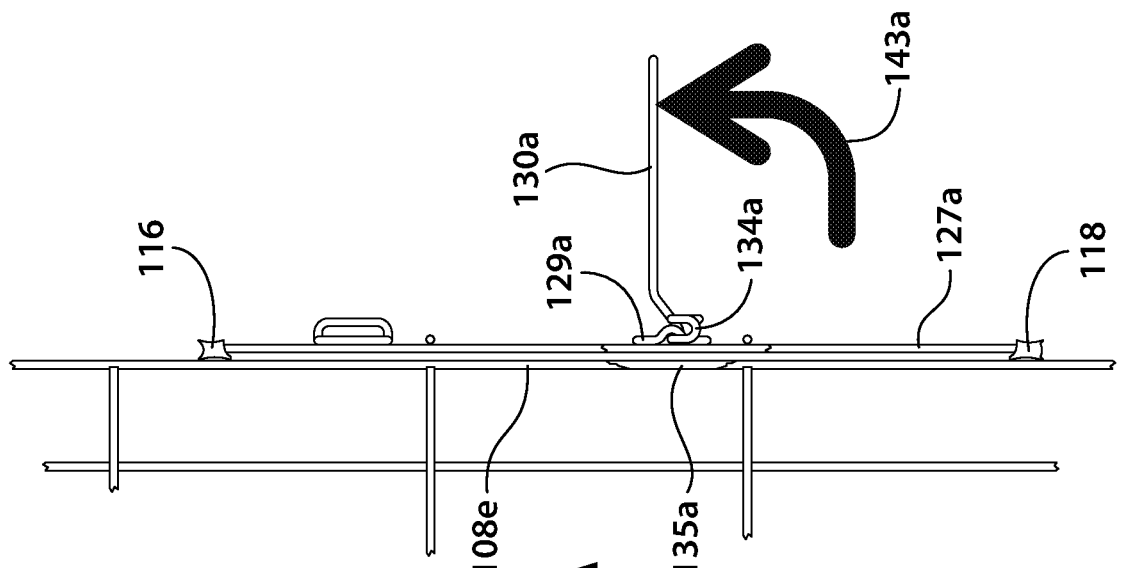
Figure 15C:
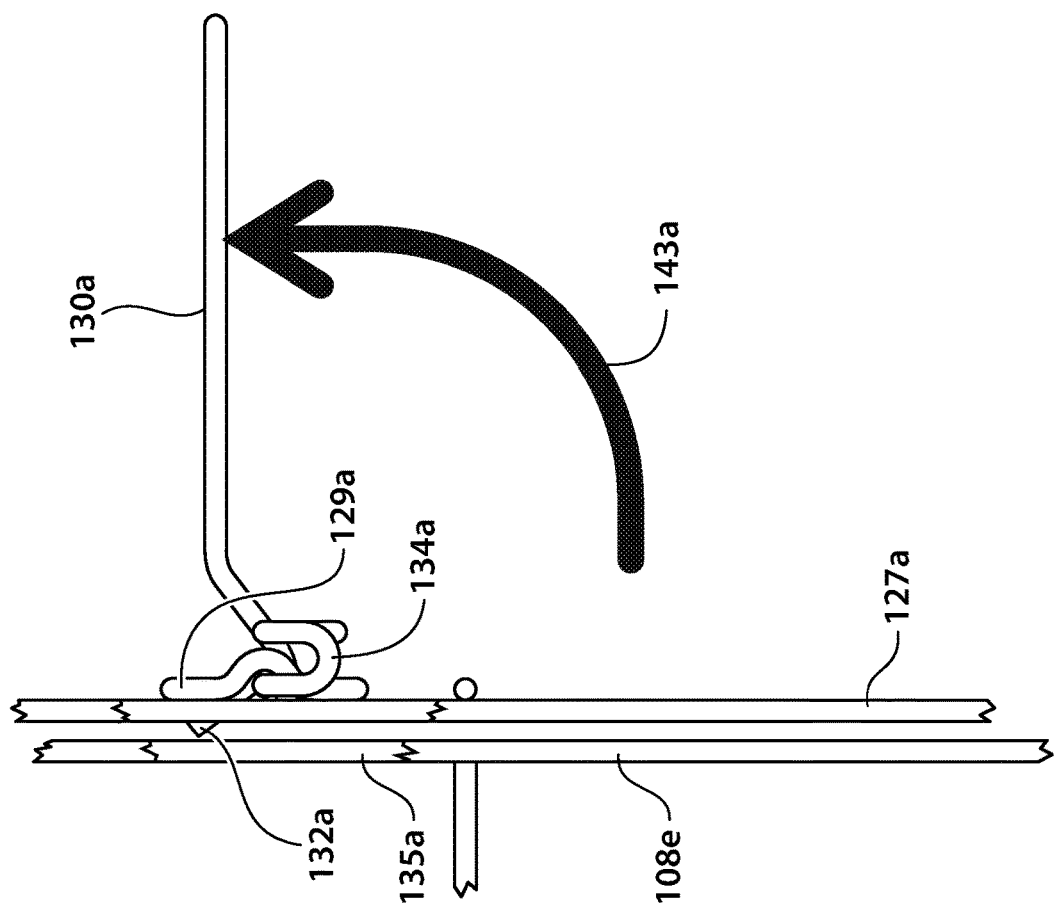
Figure 15D:
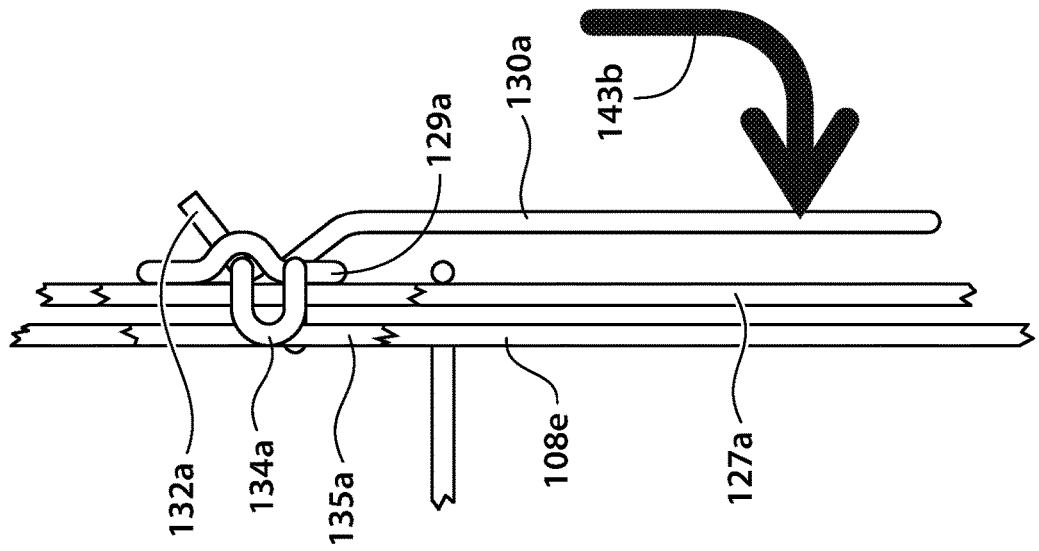
Figure 15F:
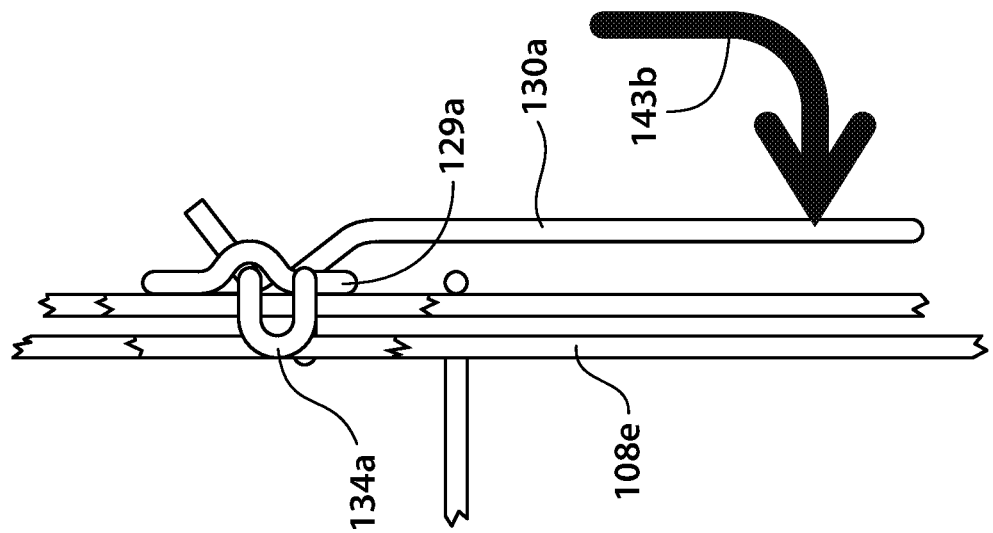
Figure 15E:
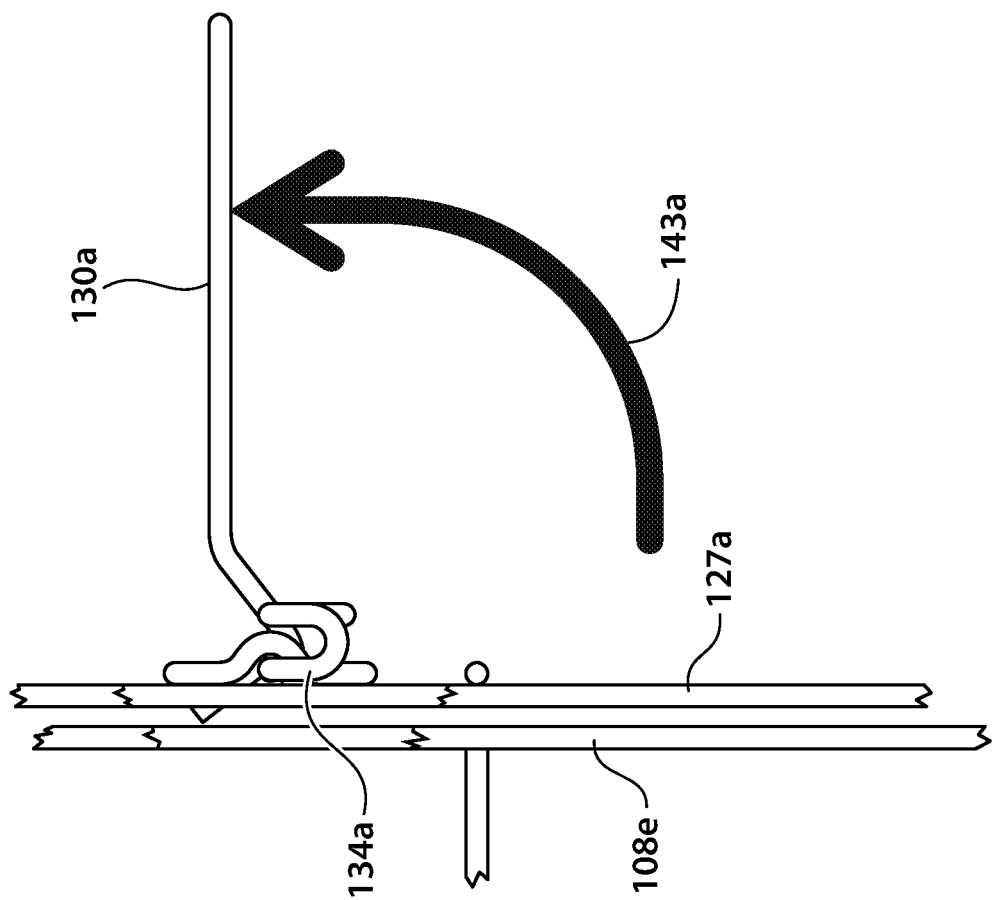
Figure 16A:
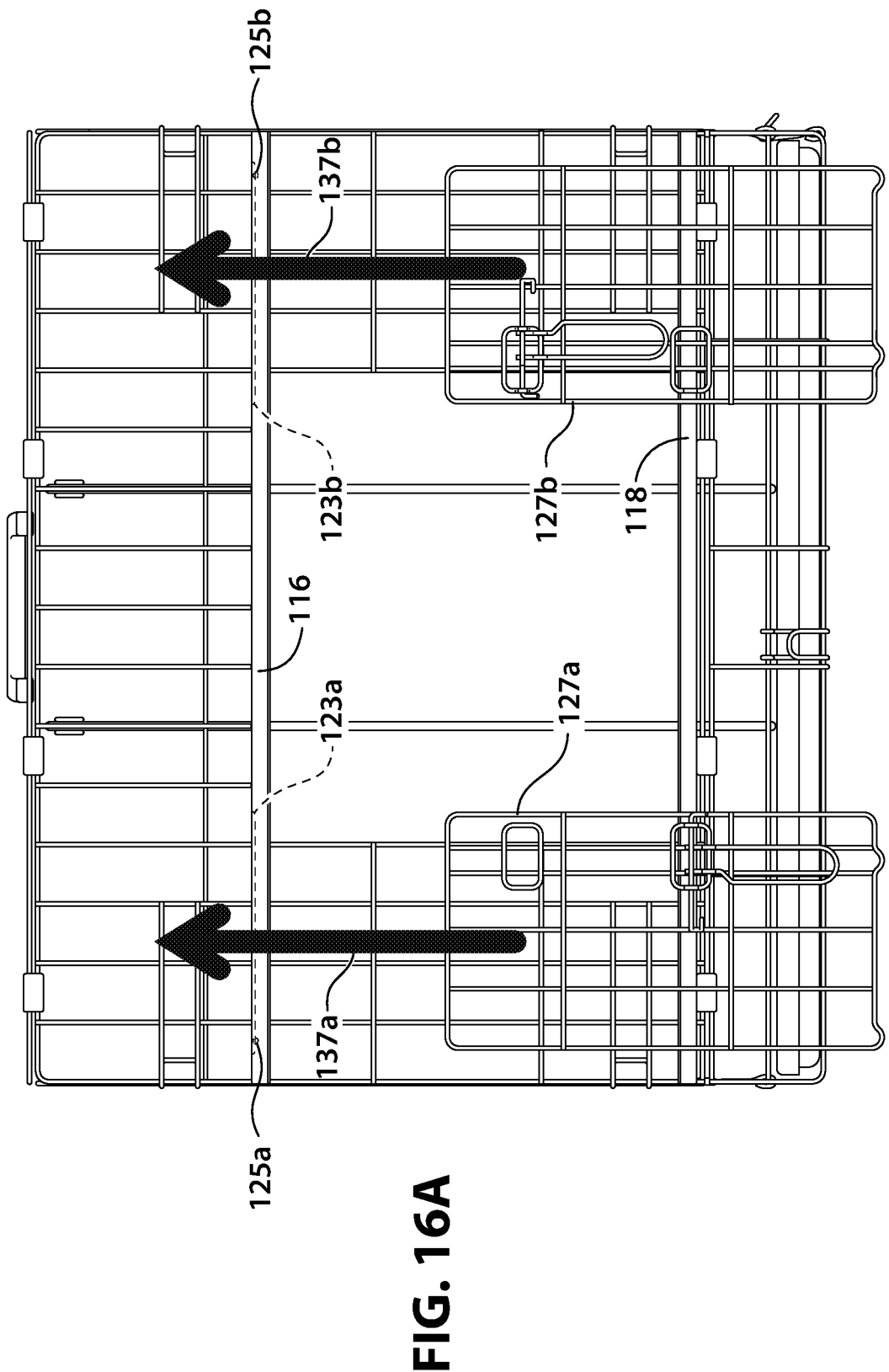
FIGS. 16A, 16B, and 16C illustrate front views of how to assemble the first and second auto-indexing multi-position doors.
Figure 16B:
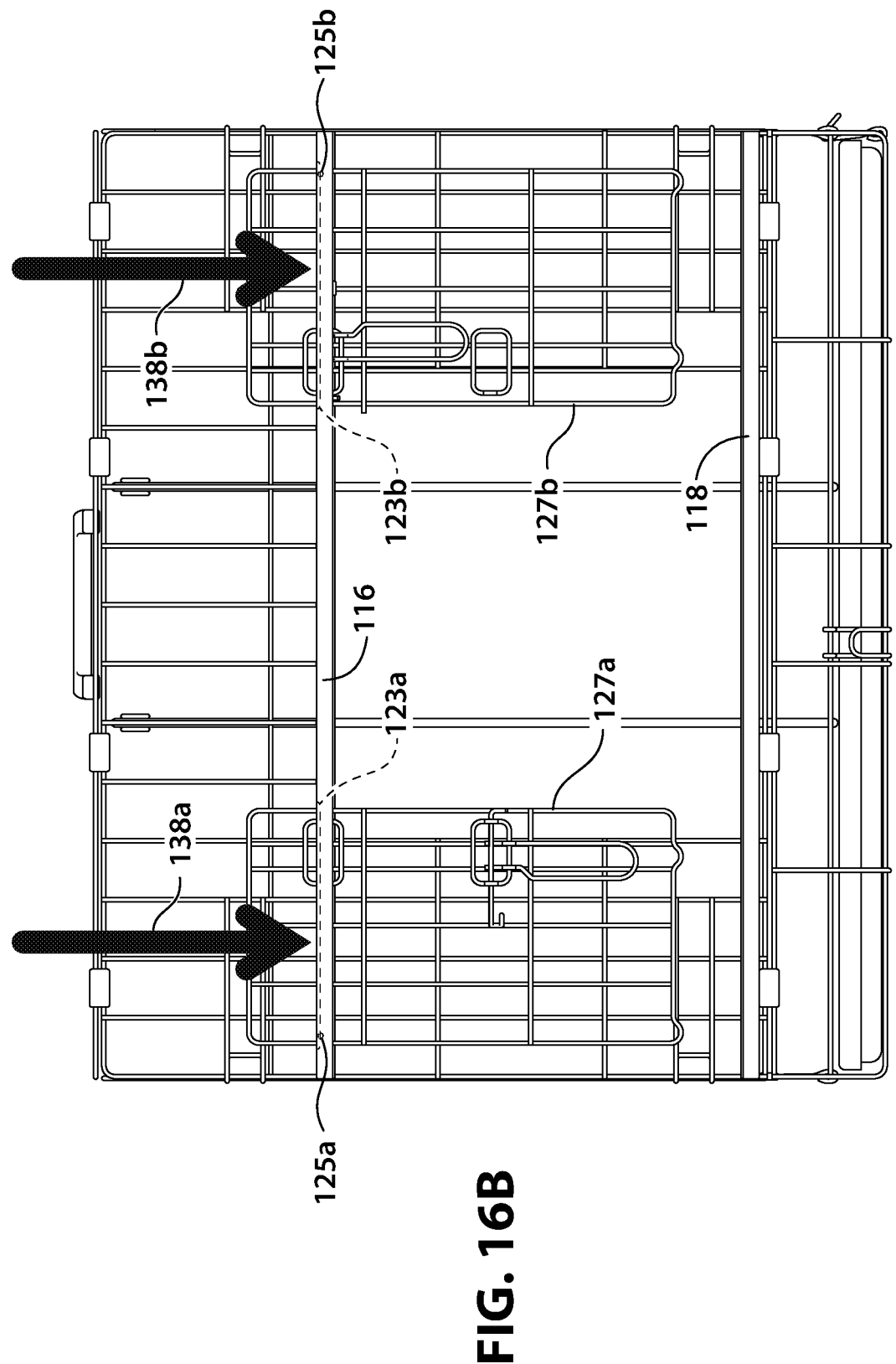
Figure 16C:
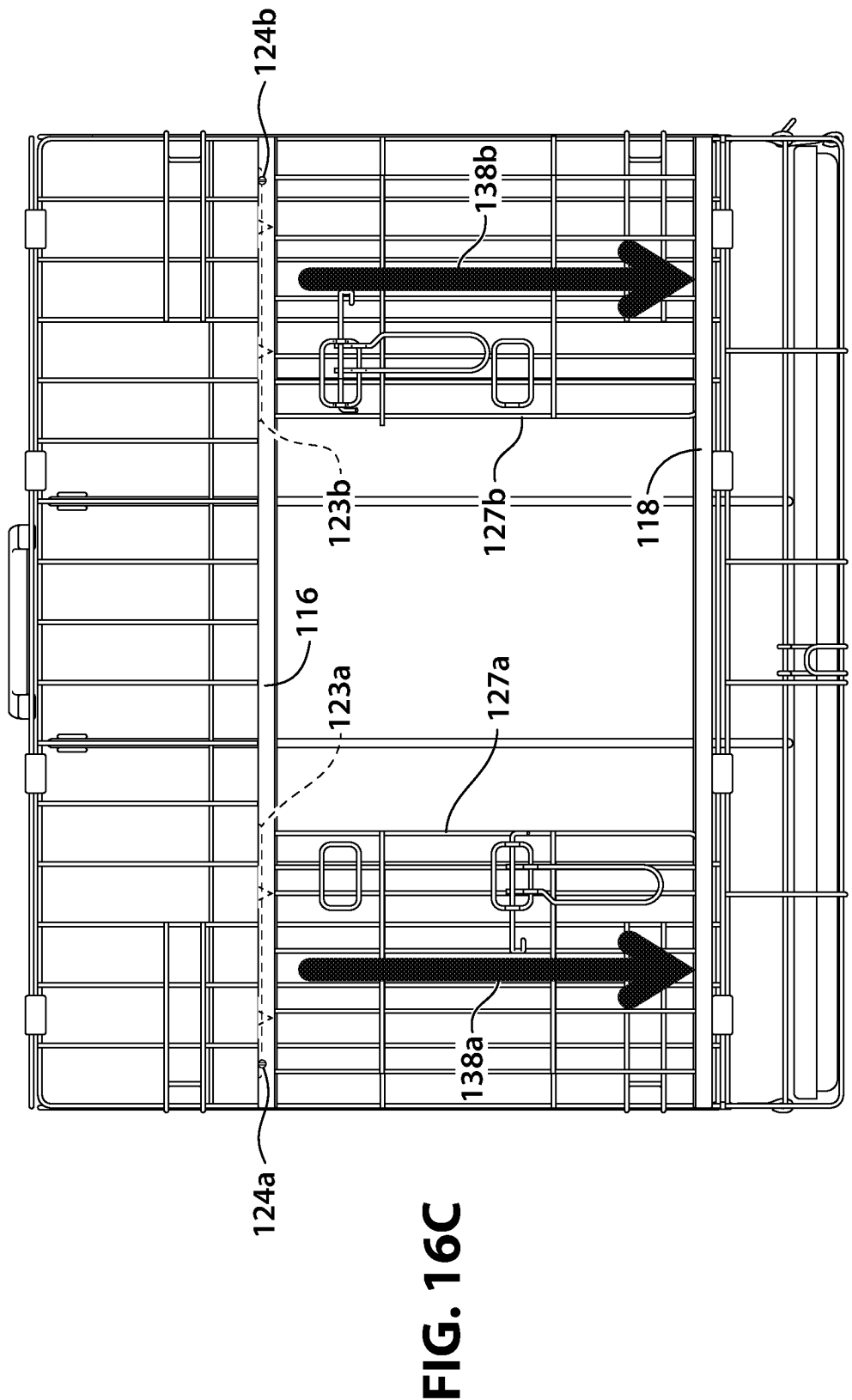
Figure 17:
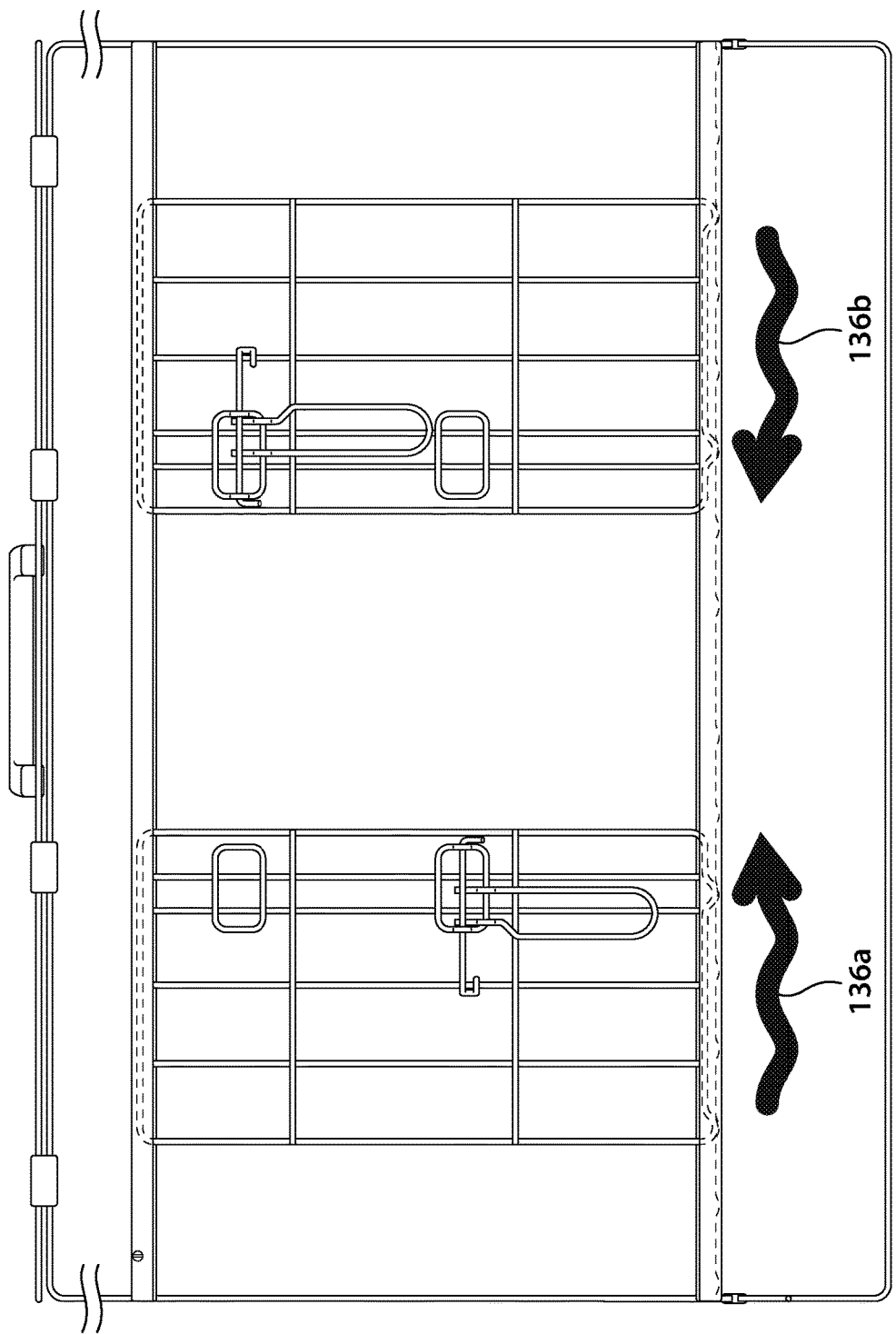
FIG. 17 illustrates a front view of how to lock the first and second auto-indexing multi-position doors in multiple positions.

5) Poop-bag-clamping handle clasps 105 respectively are for:
   a) Securely fastening poop bags to handle bridge 102;
   b) Being used as hooks,
      to securely fasten poop bags to handle bridge 102
      (see FIG. 9F);
   c) Being used as hooks,
      to store multi-grooming tools
      (see FIG. 9F);
   d) Being used as hooks,
      to hold pet toys
      (see FIG. 9F); and
   e) Being used as hooks,
      to hold leashes
      (see FIG. 9F).

6) Handle hooks 106 respectively are for:
   Detachably connecting handle bridge 102 to top panel 108*a*.

7) Multi-pet-containing panel system 107 is for performing the combined functions of its components.

8) Top, bottom, left, right, front, and rear panels 108*a*, 108*b*, 108*c*, 108*d*, 108*e*, and 108*f* respectively are for:
   Functioning as a roof, walls, and floor,
   to create a temporary pet enclosure.

9) Panel-locking hooks 109 respectively are for:
   Securably fastening top, bottom, left, right, front, and rear panels 108*a*, 108*b*, 108*c*, 108*d*, 108*e*, and 108*f* together.

10) Panel-folding clamp 110 is for:
    Foldably clamping multi-pet-containing panel system 107 together,
    to allow convenient storage and transport to multiple locations.

11) Panel-coupling clamps 111 respectively are for:
    Hingably and foldably coupling top, bottom, left, right, front, and rear panels 108*a*, 108*b*, 108*c*, 108*d*, 108*e*, and 108*f* together.

12) First and second door openings 112*a* and 112*b* respectively are for:
    a) Allowing first and second auto-indexing multi-position doors 127*a* and 127*b* to be locked in multiple positions; and
    b) Allowing multiple pets to enter and exit
       (see FIG. 3B, FIG. 3C, FIG. 3D, and FIG. 3E).

Figure 8A:
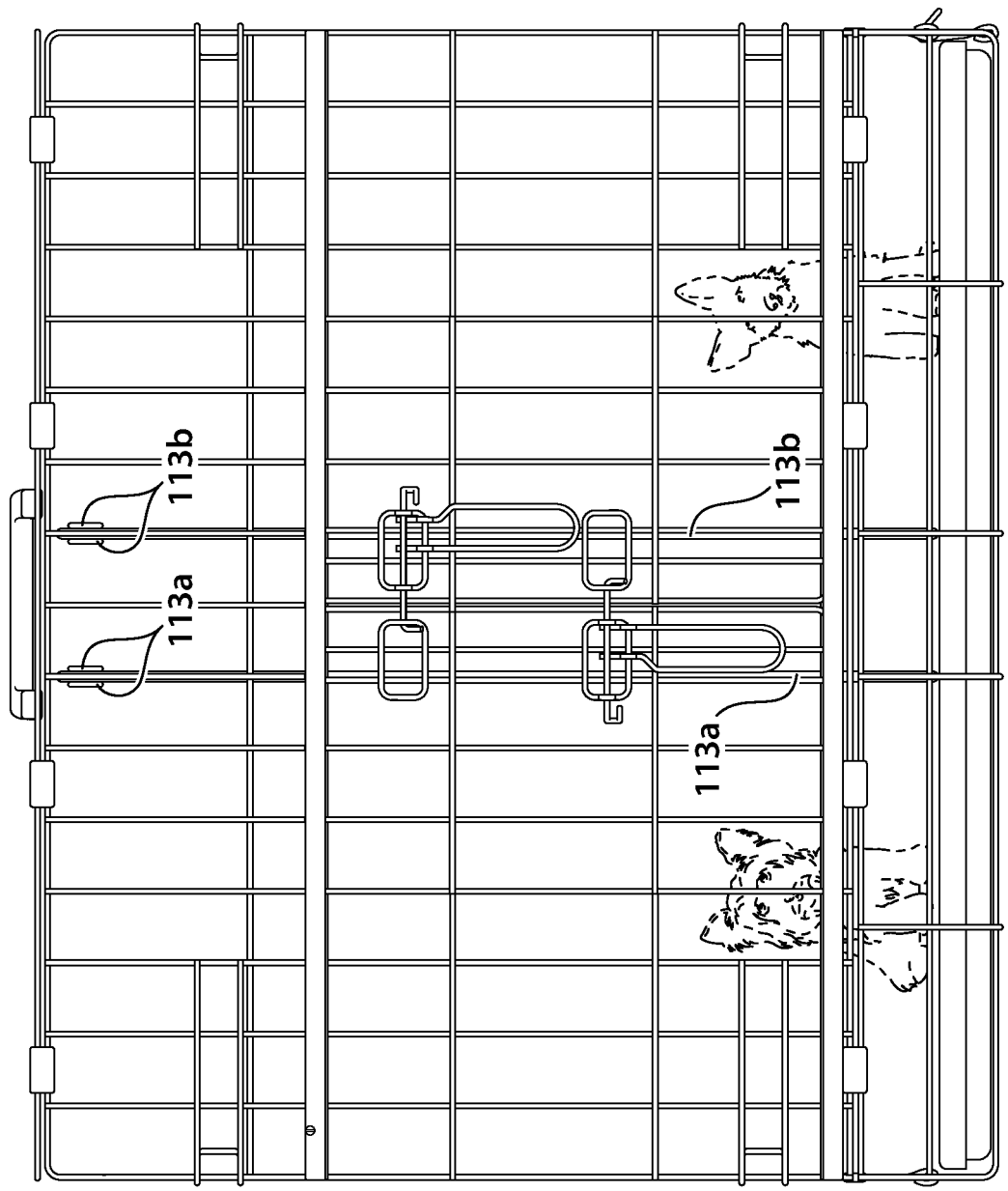
FIGS. 8A and 8B illustrate front views of the first and second movable crate dividers within the multi-pet-containing panel system, to accommodate multiple pets.
Figure 8B:
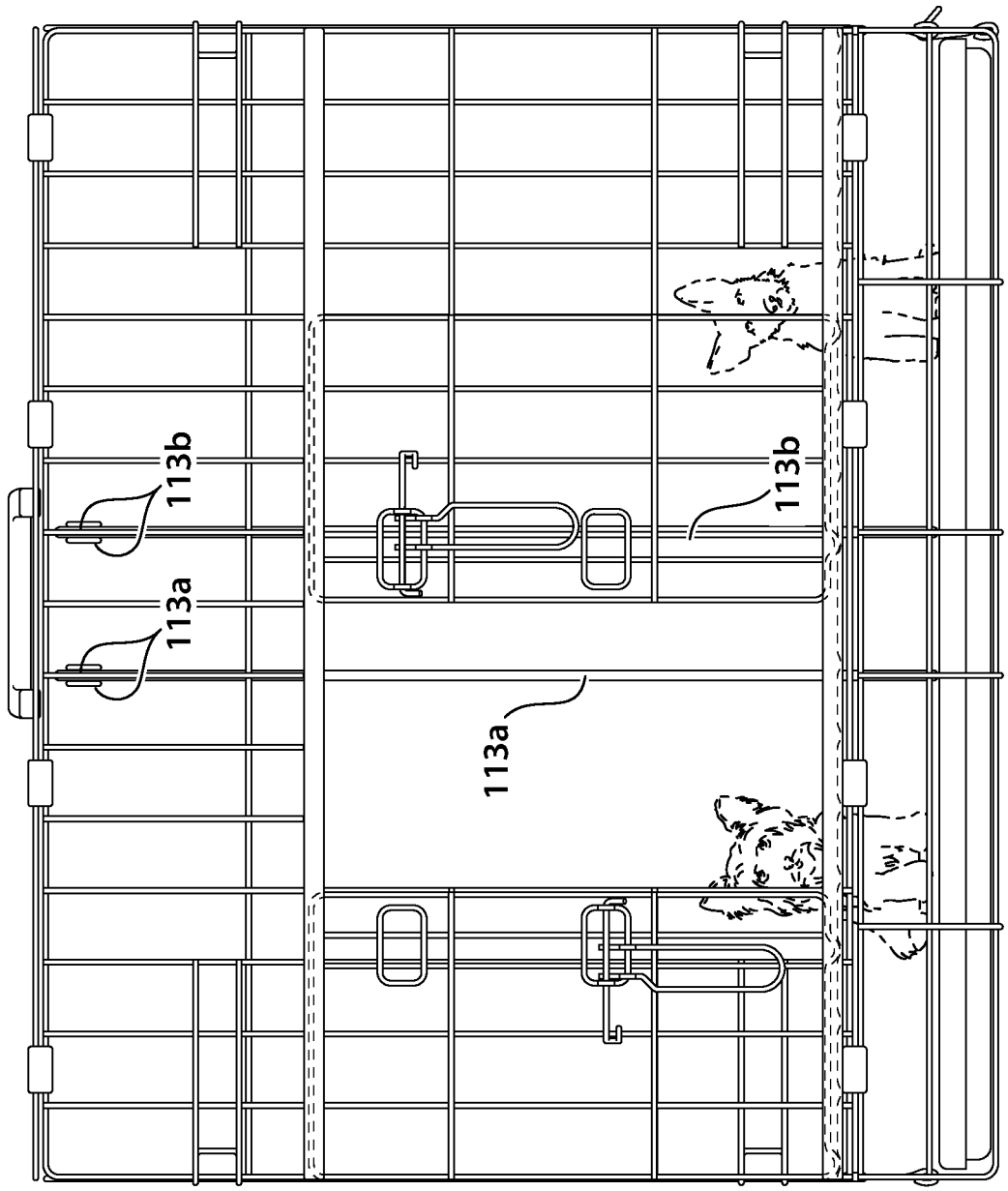

13) First and second movable crate dividers 113*a* and 113*b* respectively are for:
    a) Creating multiple pet-containing compartments,
       to accommodate multiple pets
       (see FIG. 8A and FIG. 8B);
    b) Creating multiple sized pet-containing compartments,
       to accommodate pet growth from puppy to adult stage
       (see FIG. 8A and FIG. 8B); and
    c) Creating multiple sized pet-containing compartments,
       to accommodate large and small pets simultaneously
       (see FIG. 8A and FIG. 8B).

14) Slanted urine-storing-gutter tray 114*a* is for:
    a) Draining the urine into urine-storing-gutters 114*b*,
       to keep slanted urine-storing-gutter tray 114*a* dry
       (see FIG. 12A and FIG. 12B);
    b) Comfortably accommodating pets,
       to allow pets to sit, stand, play, rest, and sleep thereon
       (see FIG. 12A and FIG. 12B);
    c) Conveniently keeping pets away and not on their urine,
       to keep pets dry; and
    d) Conveniently keeping pets away and not on their urine,
       to prevent pets from getting diseases and infections caused by their own urine.

Urine-storing gutters 114*b* respectively are for:
    a) Storing urine run-off from slanted urine-storing-gutter tray,
       to keep slanted urine-storing-gutter tray 114*a* dry
       (see FIG. 12A and FIG. 12B);
    b) Conveniently keeping pets away and not on their urine,
       to keep the pets dry;
    c) Conveniently keeping pets away and not on their urine,
       to prevent pets from getting diseases and infections; and
    d) Allowing quick and easy cleaning.

Figure 7A:
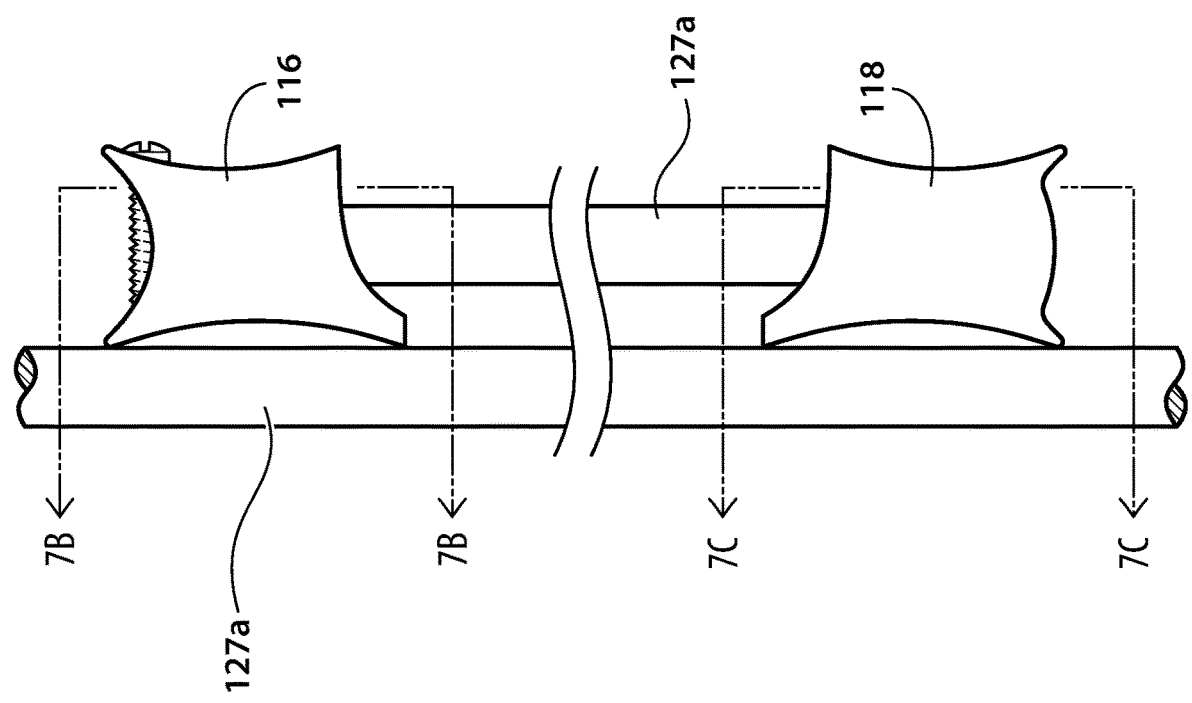
FIG. 7A illustrates a side view of the top low-friction rail, bottom low-friction rail, and the door-blocking slot screws.
Figure 7D:
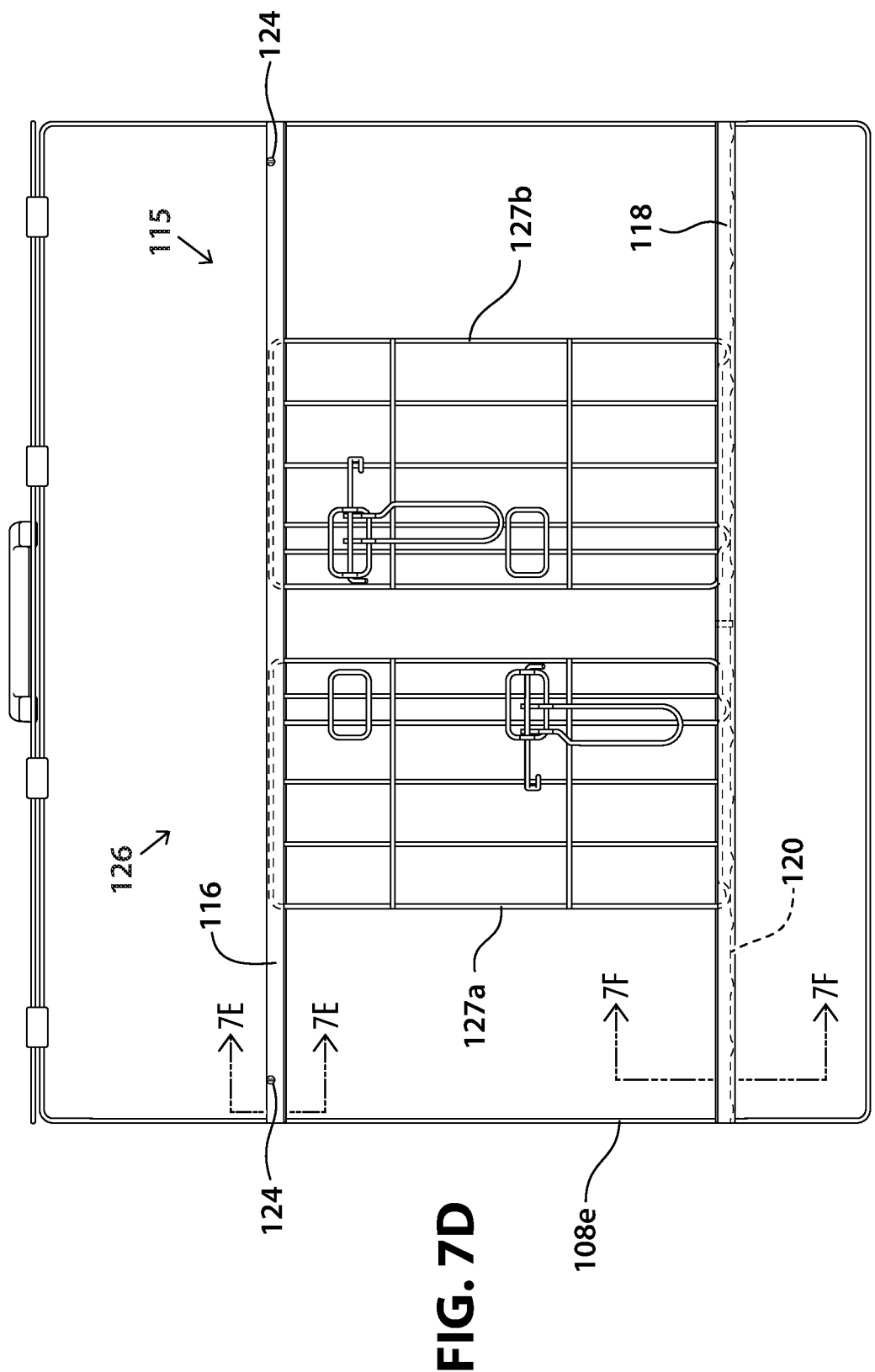
FIG. 7D illustrates a front view of the front panel, the first and second auto-indexing multi-position doors and the top and bottom low-friction rails.
Figure 7E:
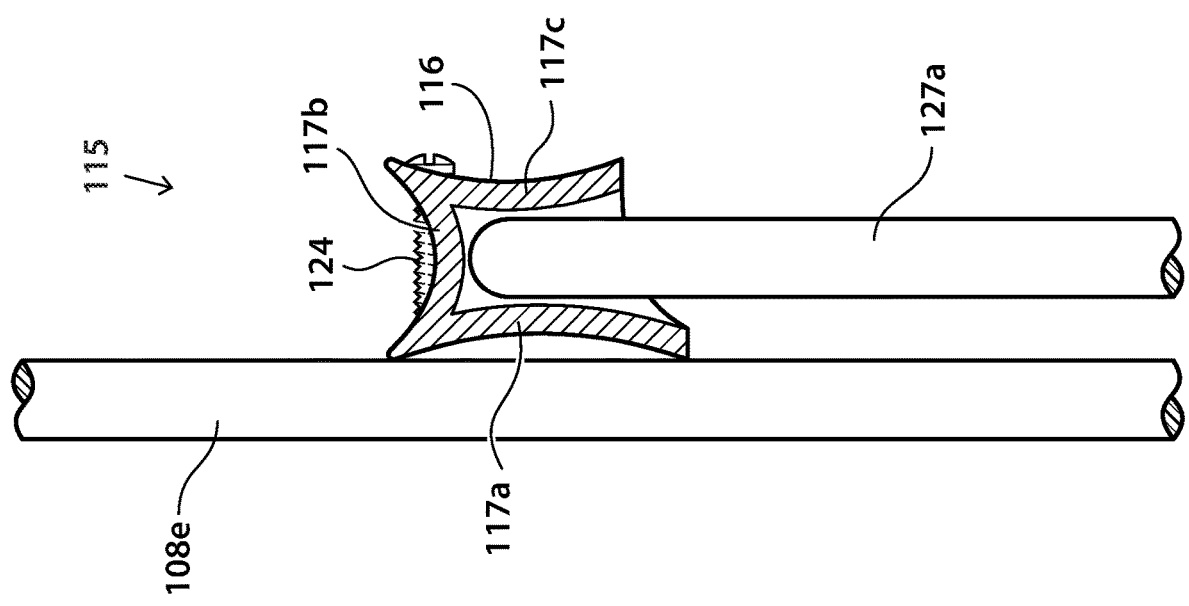
FIGS. 7E and 7F illustrate sectional side views of the top and bottom low-friction rails and the side and bottom low-friction rail arcs.
Figure 7F:
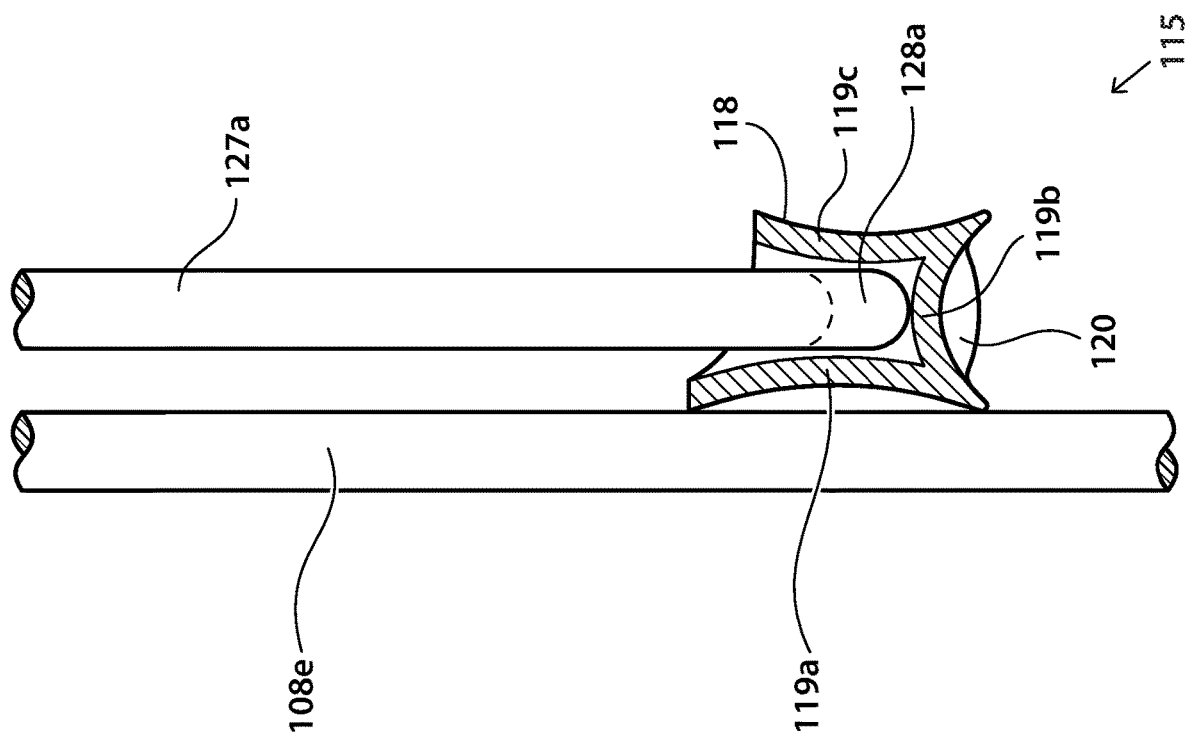
Figure 7G:
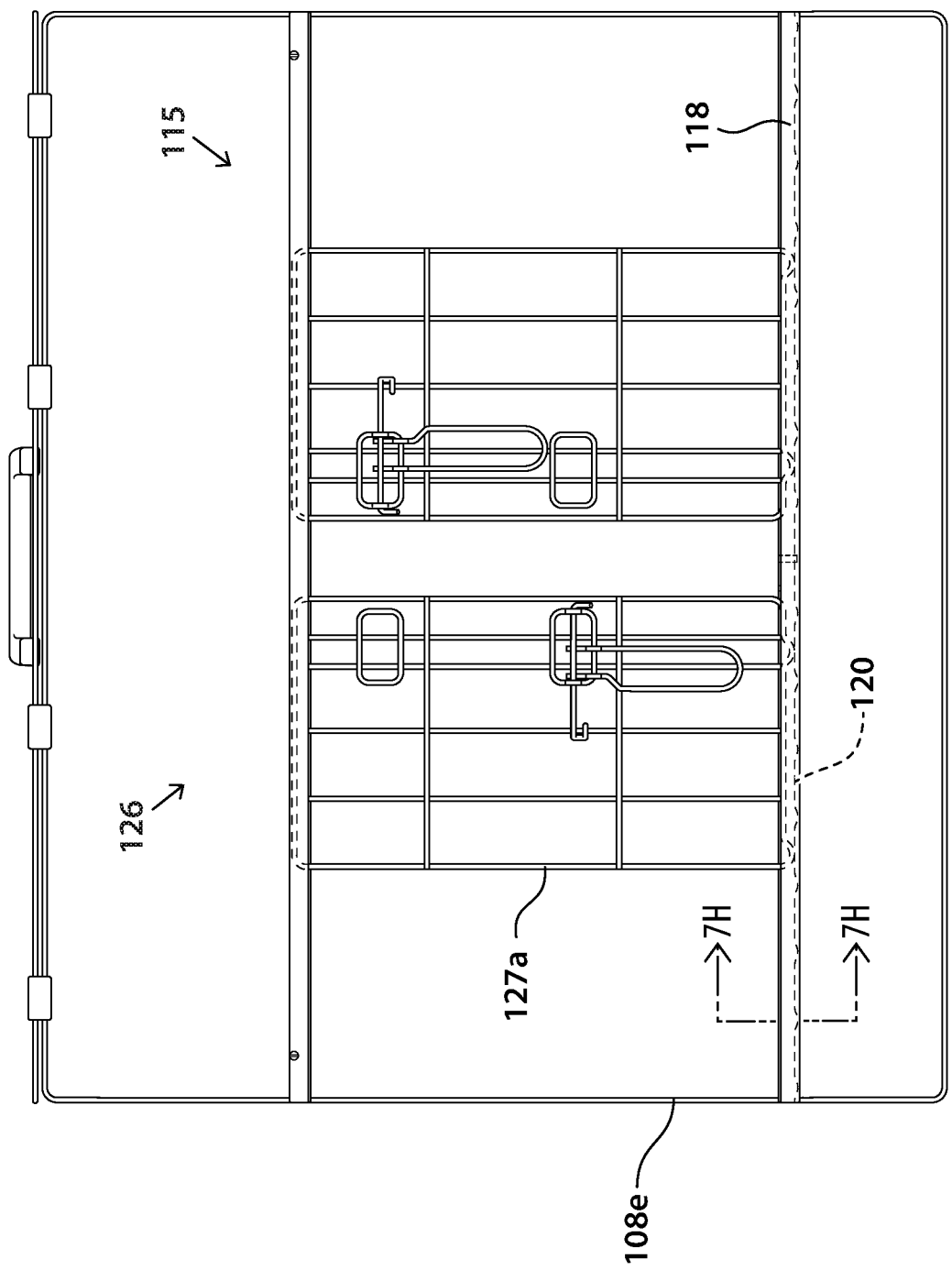
FIG. 7G illustrates a front view of the auto-indexing multi-position door and the top and bottom low-friction rails.
Figure 7H:
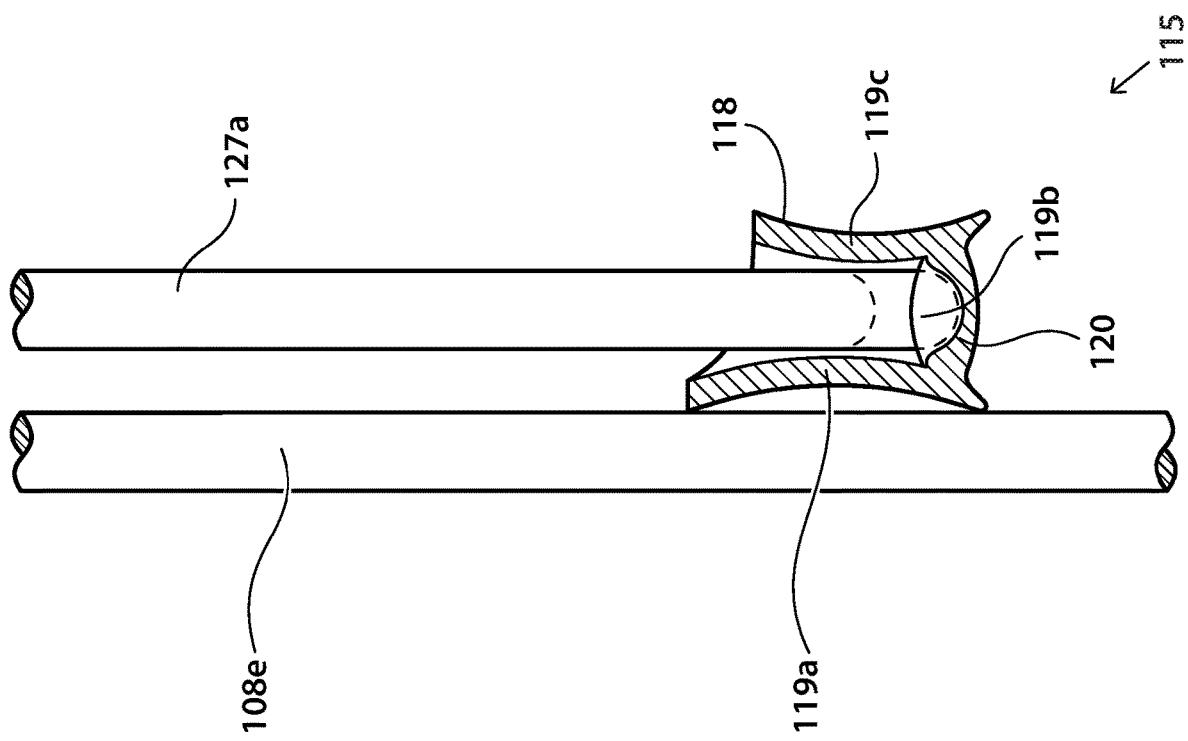
FIG. 7H illustrates a sectional view of the bottom low-friction rail, and its respective bottom low-friction rail arcs, the auto-indexing multi-position door, and the door-corner-glider-locking recess.

Gutter ridges 114*c* is for:
    a) Supporting a pet's paws while stepping upon
       to help pets to be comfortable and safe
       (see FIG. 12A and FIG. 12B);
    b) Conveniently keeping pets away and not on their urine, to keep pets dry;
c) Providing protrusions and recesses for urine to flow therein,
to separate urine from pet's area; and
d) Preventing pets from submersion in urine
to avoid infections and disease.
15) Low-friction door-corner-recess-arc-rail system 115 is for performing the combined functions of its components.
16) Top low-friction rail 116 is for:
a) Slidably securing first and second auto-indexing multi-position doors 127a and 127b
(see FIG. 7A. FIG. 7B and FIG. 7E);
b) Providing low-friction surfaces,
to enable easy sliding motions of first and second auto-indexing multi-position doors 127a and 127b
(see FIG. 7A. FIG. 7B and FIG. 7E);
c) Providing top low-friction rail arcs 117a, 117b, and 117c to allow easy sliding motions of first and second auto-indexing multi-position doors 127a and 127b
(see FIG. 7A. FIG. 7B and FIG. 7E); and
d) Providing top low-friction rail arcs 117a, 117b, and 117c;
to maintain minimum surface contact, for minimum friction
(see FIG. 7A. FIG. 7B and FIG. 7E).
17) Top low-friction rail arcs 117a, 117b, and 117c respectively are for:
a) Reducing surface contact, thereby lowering friction between top low-friction rail 116 and first and second auto-indexing multi-position doors 127a and 127b
(see FIG. 7E);
b) Slidably securing the tops of first and second auto-indexing multi-position doors 127a and 127b,
to provide a secure channel for first and second auto-indexing multi-position doors 127a and 127b to easily slide horizontally
(see FIG. 7E); and
c) Providing a tall rear wall of top low-friction rail arc 117a
to minimize potential fur and paws being caught in top low-friction rail 116.
18) Bottom low-friction rail 118 is for:
a) Slidably securing first and second auto-indexing multi-position doors 127a and 127b
(see FIG. 7C, FIG. 7F and FIG. 7H);
b) Providing low-friction surfaces,
to enable easy sliding motions of first and second auto-indexing multi-position doors 127a and 127b
(see FIG. 7C, FIG. 7F and FIG. 7H);
b) Providing bottom low-friction rail arcs 119a, 119b, and 119c to allow easy sliding motions of first and second auto-indexing multi-position doors 127a and 127b
(see FIG. 7C, FIG. 7F and FIG. 7H);
d) Providing bottom low-friction rail arcs 119a, 119b, and 119c;
to maintain minimum surface contact, for minimum friction
(see FIG. 7C, FIG. 7F and FIG. 7H).
19) Bottom low-friction rail arcs 119a, 119b, and 119c respectively are for:
a) Reducing surface contact, thereby lowering friction between bottom low-friction rail 118 and first and second auto-indexing multi-position doors 127a and 127b
(see FIG. 7C, FIG. 7F and FIG. 7H);
b) Slidably securing the tops of first and second auto-indexing multi-position doors 127a and 127b,
to provide a secure channel for first and second auto-indexing multi-position doors 127a and 127b to easily slide horizontally
(see FIG. 7C, FIG. 7F and FIG. 7H); and
c) Providing a tall rear wall of bottom low-friction rail arc 119a
to minimize potential fur and paws being caught in bottom low-friction rail 118.
20) Multi-position door-corner-glider-locking recesses 120 respectively are for:
a) Locking first and second auto-indexing multi-position door-corner-gliders 128a and 128b therein
to horizontally and slantedly lock first and second auto-indexing multi-position doors 127a and 127b in multiple horizontal or slanted and stationary or moving positions
in the direction of arrows 136a and 136b
(see FIG. 6, FIG. 7C, FIG. 7D, FIG. 7F, FIG. 7G, FIG. 7H, and FIG. 17);
b) Allowing multiple locked horizontal positions for first and second auto-indexing multi-position doors 127a and 127b,
at multiple locations
(see FIG. 6, FIG. 7C, FIG. 7D, and FIG. 7G);
c) Precisely self-adjusting each available incremental door position
(see FIG. 6, FIG. 7C, FIG. 7D, and FIG. 7G); and
d) Making door position adjustments quicker and easier for the user.
21) Central doorstop 121 is for:
Preventing further movement of first and second auto-indexing multi-position doors 127a and 127b.
22) Quick-assembly door-extracting-inserting system 122 is for performing the combined functions of its components.
23) Door extracting-inserting slots 123a and 123b respectively are for:
a) Quickly assembling first and second auto-indexing multi-position doors 127a and 127b by inserting them therethrough and lifting them up then down in the direction of the arrows 137a, 137b, 138a, and 138b
(see FIG. 5A, FIG. 5B, FIG. 5D, FIG. 5E, FIG. 16A, FIG. 16B, and FIG. 16C); and
b) Creating an access opening,
to extract first and second auto-indexing multi-position doors 127a and 127b during manufacturing and by the user
(see FIG. 5C).
24) Door-blocking slot screws 124a and 124b respectively are for:
Blocking first and second auto-indexing multi-position doors 127a and 127b after the assembly,
to prevent first and second auto-indexing multi-position doors 127a and 127b from vertical extraction through door extracting-inserting slots 123a and 123b.
25) Slot-screw holes 125a and 125b respectively are for:
Receiving door-blocking slot screws 124a and 124b.
26) Multi-pet multi-position-double-door system 126 is for performing the combined functions of its components.
27) First and second auto-indexing multi-position doors 127a and 127b respectively are for:
a) Locking in multiple pets and customizing each pet's exiting privileges in direction of arrows 139a and 139b
(see FIG. 14A, FIG. 14B, FIG. 14C, FIG. 14D, and FIG. 14E);
b) Locking in multiple pets and customizing each pet's entrance privilege;

c) Limiting the entrance to predetermined size pets;
d) Protecting smaller pets against larger predator's entrance while giving entrance-exit freedom to the smaller pet; and
e) Expanding the number of divided sections with each having a customizable entrance.
28) First and second auto-indexing multi-position door-corner-gliders 128a and 128b respectively are for:
   a) Reducing friction to sliding movement of first and second auto-indexing multi-position doors 127a and 127b;
   b) Precisely stopping door at incremental door positions;
   c) Providing a precise alignment for multi-position door-locking push-rod tails 134a and 134b with multi-position push-rod-tail-locking wires 135a and 135b, so that locking action requires no user judgment;
   d) Eliminating door lubrication maintenance; and
   e) Providing two equal points of contact and balance for easy sliding movements.
29) First and second push-rod hinges 129a and 129b respectively are for:
   Hingedly securing first and second push-rods 131a and 131b to first and second auto-indexing multi-position doors 127a and 127b.
30) First and second push-rod levers 130a and 130b respectively are for:
   a) Locking and unlocking first and second auto-indexing multi-position doors 127a and 127b;
   b) Sliding first and second push-rods 131a and 131b and 127b;
   c) Sliding first and second auto-indexing multi-position doors 127a and 127b from side to side; and
   d) Self-securing locking function,
      to safely lock while distracted or unattended.
31) First and second push-rods 131a and 131b respectively are for:
   slidably acting as a rigid connection between first and second multi-position door-locking push-rod tails 134a and 134b, and first and second door-locking push-rod heads 132a and 132b.
32) First and second door-locking push-rod heads 132a and 132b respectively are for:
   a) Locking onto first and second push-rod-head-locking rings 133a and 133b;
   b) Unlocking from first and second push-rod-head-locking rings 133a and 133b.
33) First and second push-rod-head-locking rings 133a and 133b respectively are for:
   Locking onto first and second door-locking push-rod heads 132a.
34) First and second multi-position door-locking push-rod tails 134a and 134b
   respectively are for:
   a) Horizontally and slantedly locking and self-aligning positions of first and second auto-indexing multi-position doors 127a and 127b to respectively first and second multi-position push-rod-tail-locking wires 135a and 135b, in multiple horizontal or slanted and stationary or moving positions, by moving
      in the direction of the arrows 140a, 140b, 141a, 141b, 142a, and 142b, to disengage first and second door-locking push-rod heads 132a and 132b from first and second push-rod-head-locking rings 133a and 133b.
      (see FIG. 2A, FIG. 2B, FIG. 2C, FIG. 3A, FIG. 3B, FIG. 3C, FIG. 3D, FIG. 3E, FIG. 3F, FIG. 13A, FIG. 13B, and FIG. 13C);
   b) Locking first and second auto-indexing multi-position doors 127a and 127b to front panel 108e, in multiple horizontal or slanted and stationary or moving positions, by moving
      in the direction of the arrows 143a and 143b
      to lock onto first and second multi-position push-rod-tail-locking wires 135a and 135b
      (see FIG. 15A, FIG. 15B, FIG. 15C, FIG. 15D, FIG. 15E, and FIG. 15F);
   c) Allowing first and second auto-indexing multi-position doors 127a and 127b to maintain a closed, locked, or open position when the multi-pet locking-tail-push-rod pet crate is situated on:
      A non-moving, flat house floors;
      A non-moving, inclined driveway or other surface;
      A moving vehicle floor;
      A moving, upwardly inclined vehicle floor; and
      A moving, downwardly inclined vehicle floor;
      Bumped or pushed by an object;
      Shaken by an energetic pet; and
      Moved or relocated
      (see FIG. 11A and FIG. 11B);
   d) Allowing minimal materials to manufacture; and
   e) Allowing minimal manufacturing resources,
      to save labor, time, material, and money.
35) First and second multi-position push-rod-tail-locking wires 135a and 135b respectively are for:
   Providing multiple locations to which to horizontally and slantedly lock first and second multi-position door-locking push-rod tails 134a and 134b,
      to provide multiple horizontal and slanted locking locations for first and second auto-indexing multi-position doors 127a and 127b
   (see FIG. 2A, FIG. 2B, FIG. 2C, FIG. 13A, FIG. 13B, and FIG. 13C).

Variation

Any component of the multi-pet locking-tail push-rod pet crate can have any shape and size.

Any component of the multi-pet locking-tail push-rod pet crate can be made of any material(s).

Figure 18A:
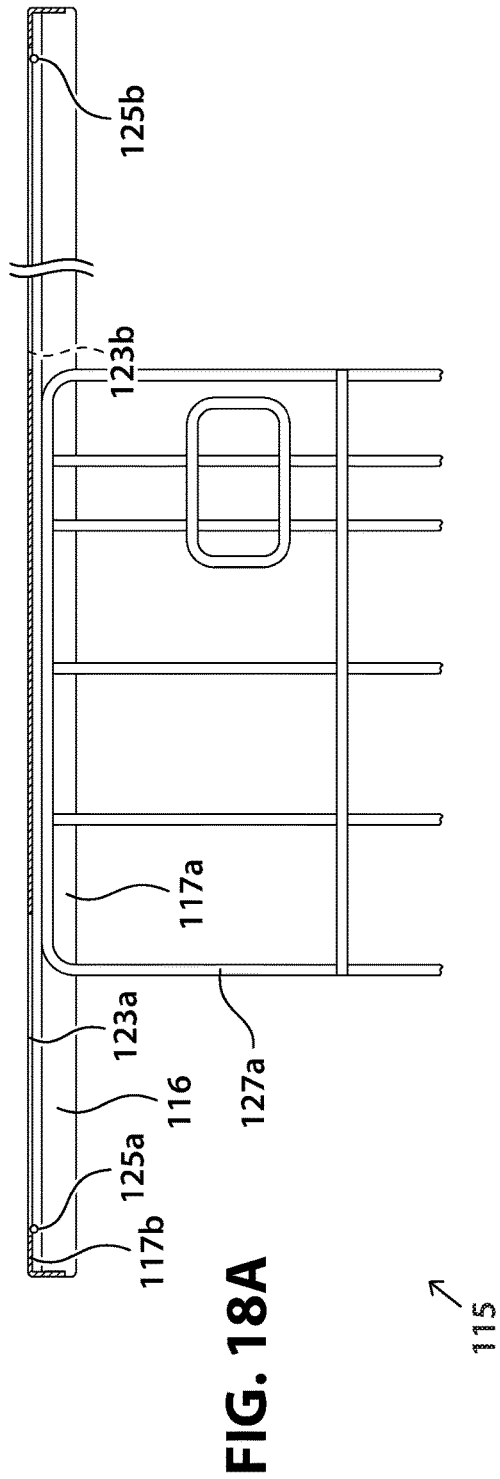
FIGS. 18A and 18B illustrate a front view of a variation of how to assemble the first and second auto-indexing multi-position doors first, then weld the first and second push-rod levers thereon later.
Figure 18B:
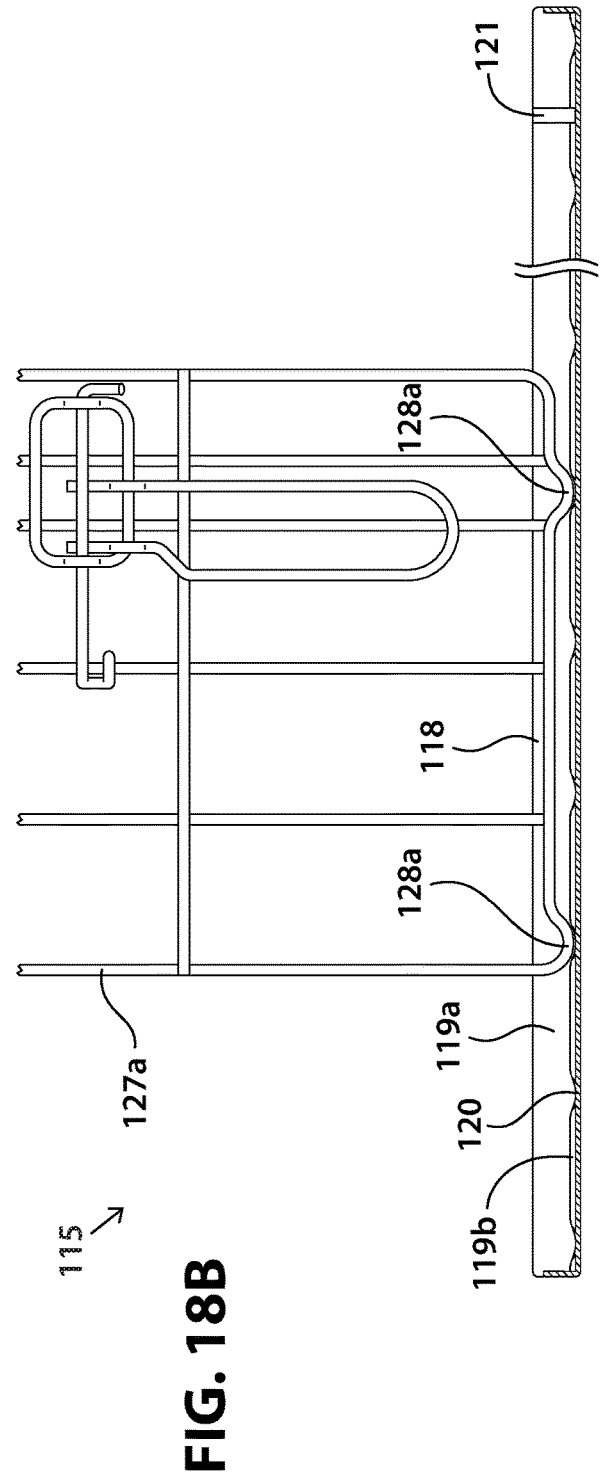

FIGS. 18A and 18B illustrate a front view of a variation of how to assemble the first and second auto-indexing multi-position doors first, then weld the first and second push-rod levers thereon later.

Figure 19:
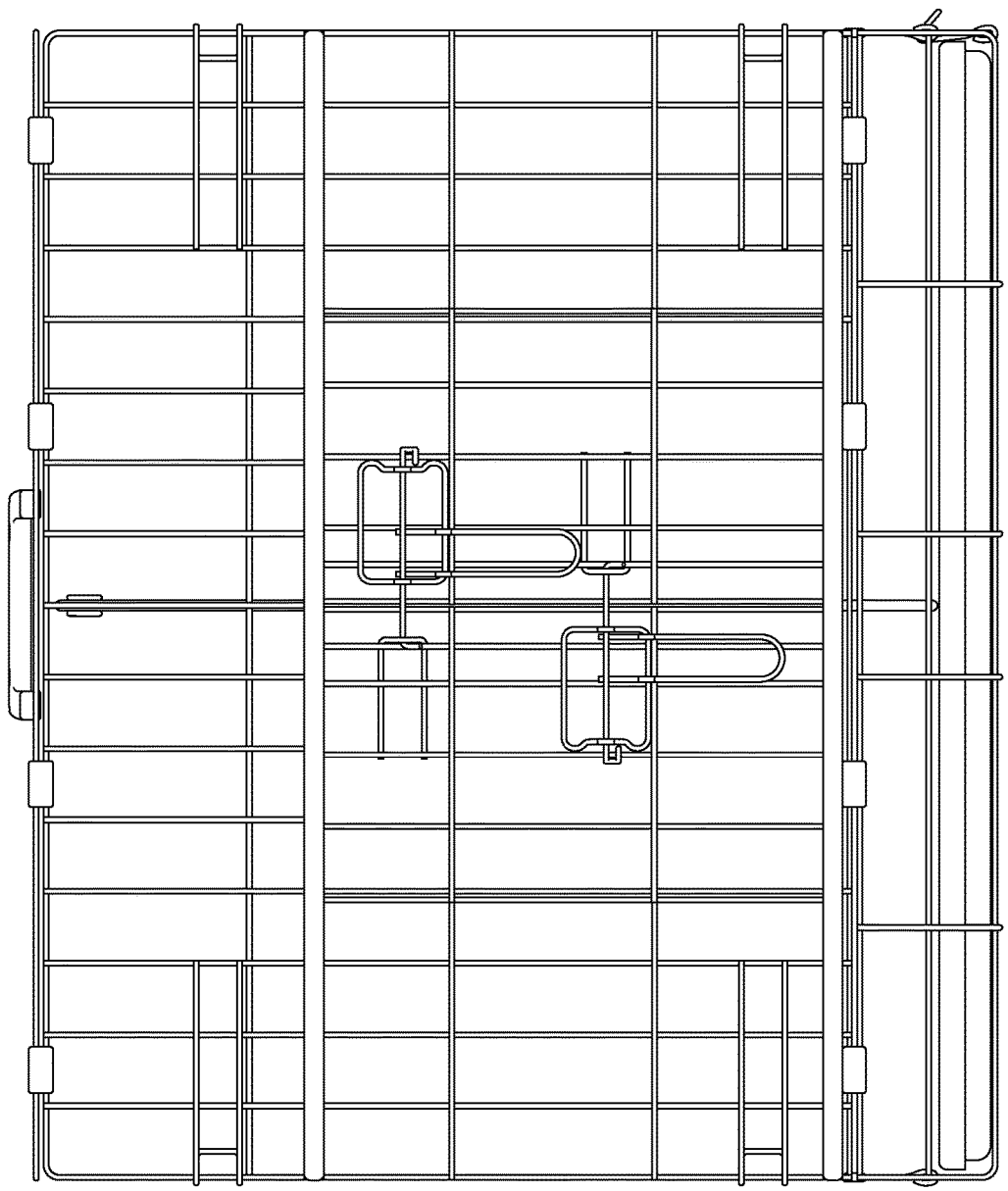
FIGS. 19, 20, and 21 illustrate front views of variations of the multi-pet multi-position-double-door system.
Figure 20:
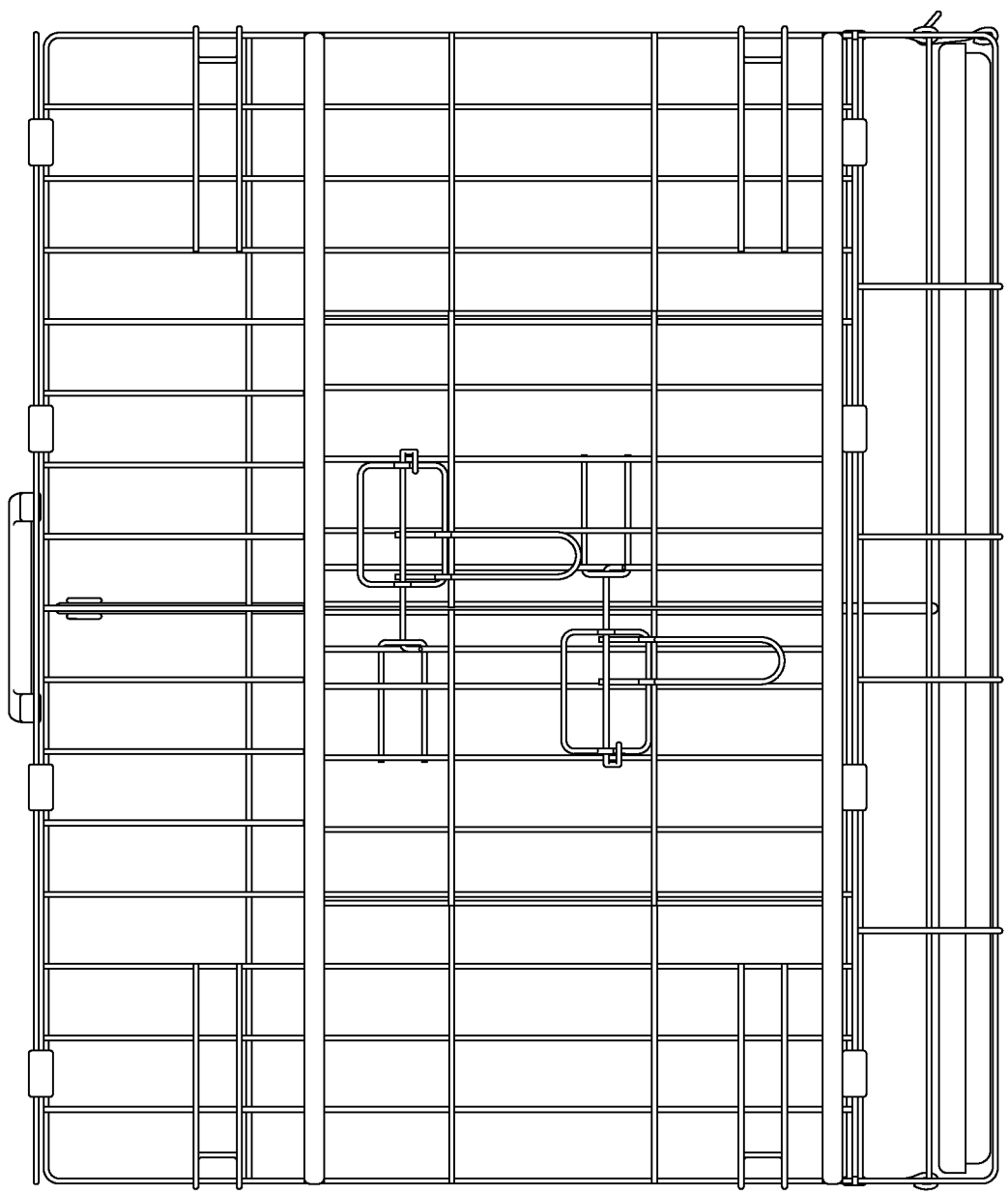
Figure 21:
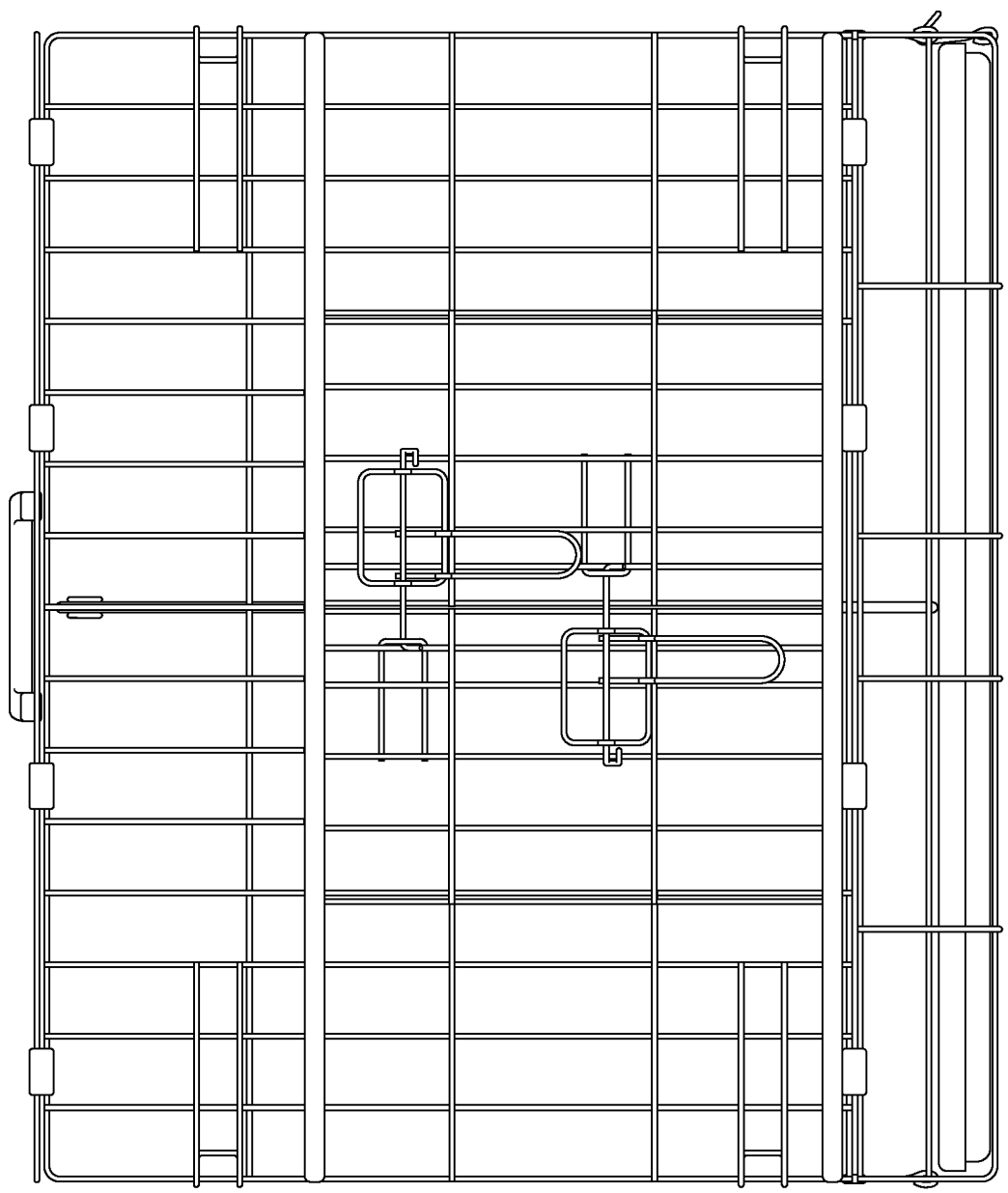

FIGS. 19, 20, and 21 illustrate front views of variations of multi-pet multi-position-double-door system 126.

Figure 22:
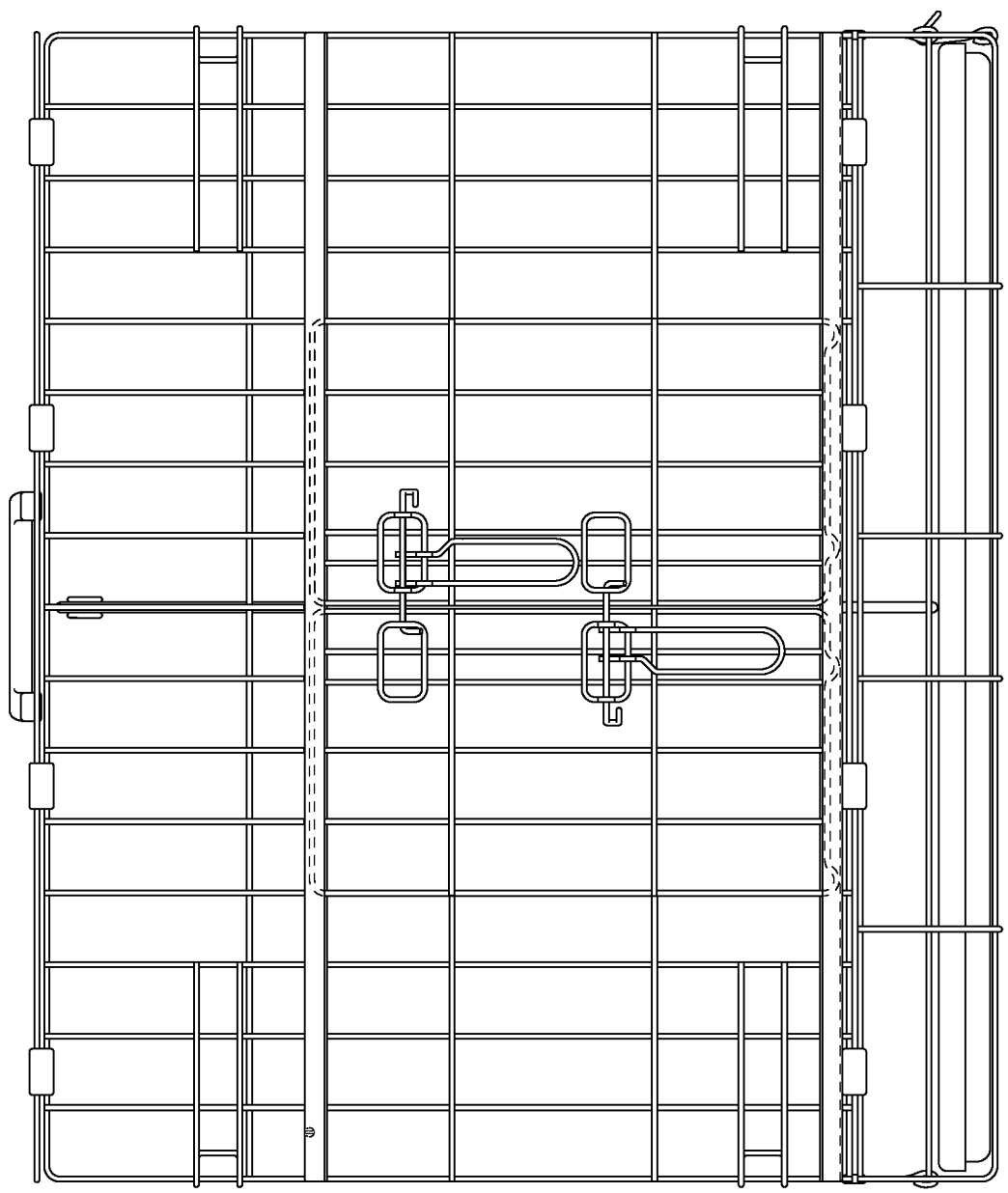
FIG. 22 illustrates a side view of variations of the door extracting-inserting slots and the top and bottom low-friction rail arcs.

FIG. 22 illustrates a side view of variations of the door extracting-inserting slots and the top and bottom low-friction rail arcs.

Figure 23:
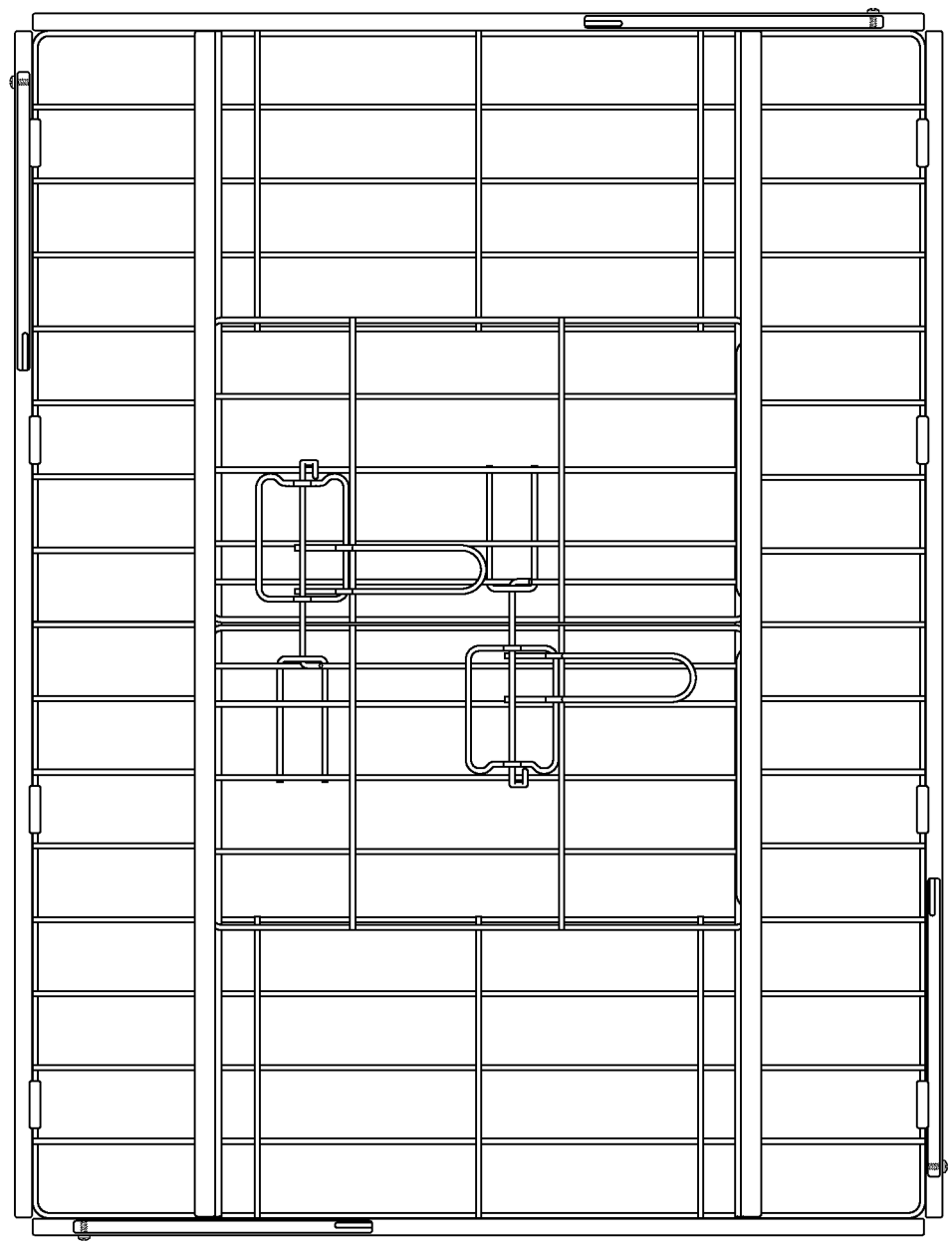
FIG. 23 illustrates a top view of a variation of the multi-pet locking-tail-push-rod pet crate having multi-pet multi-position-double-door systems on five sides.

FIG. 23 illustrates a top view of a variation of the multi-pet locking-tail-push-rod pet crate having multi-pet multi-position-double-door systems on five sides.

Figure 24:
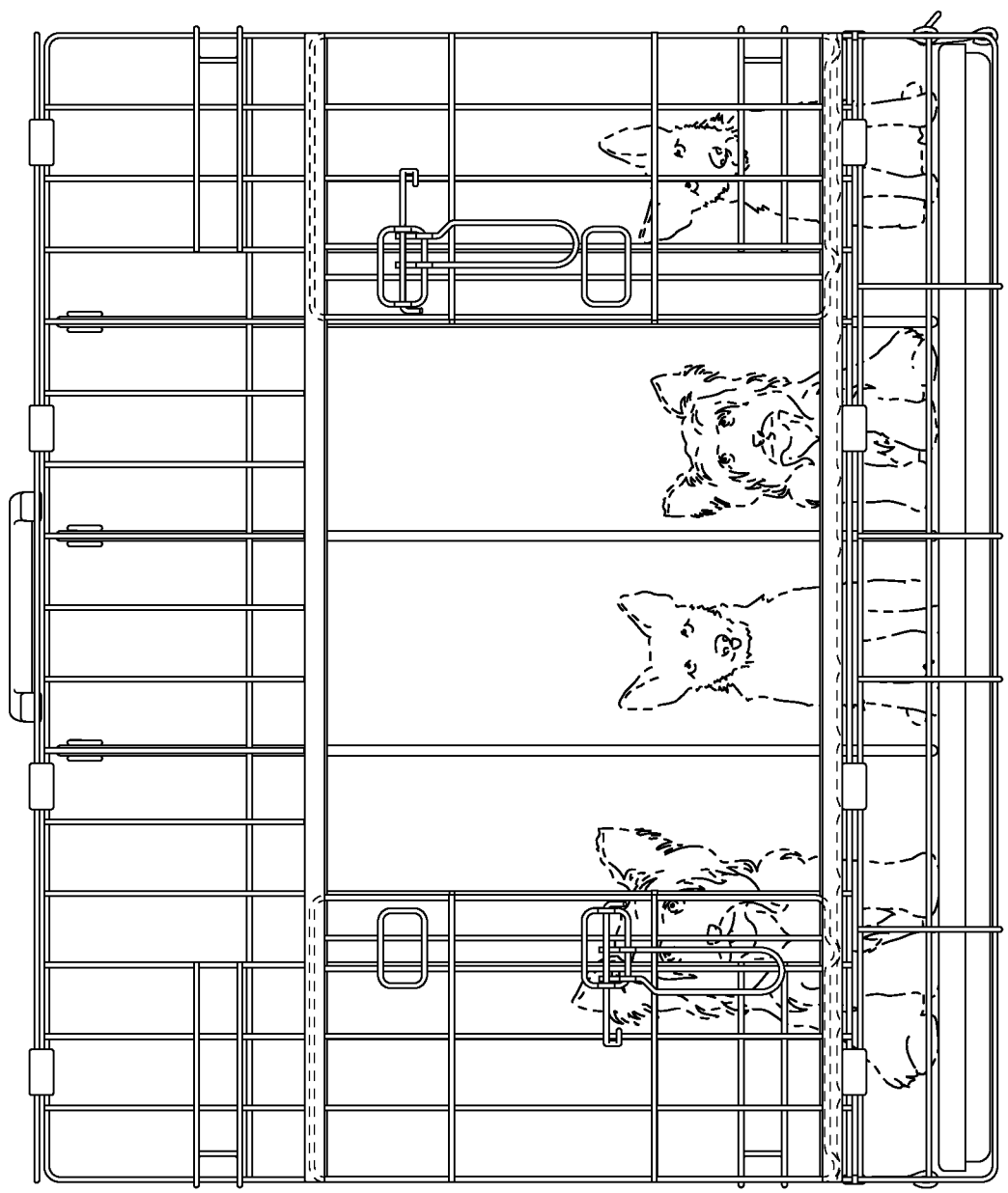
FIG. 24 illustrates a front view of a variation of the multi-pet locking-tail-push-rod pet crate having multiple movable crate dividers, to accommodate multiple pets.

FIG. 24 illustrates a front view of a variation of the multi-pet locking-tail-push-rod pet crate having multiple movable crate dividers, to accommodate multiple pets.

Figure 25:
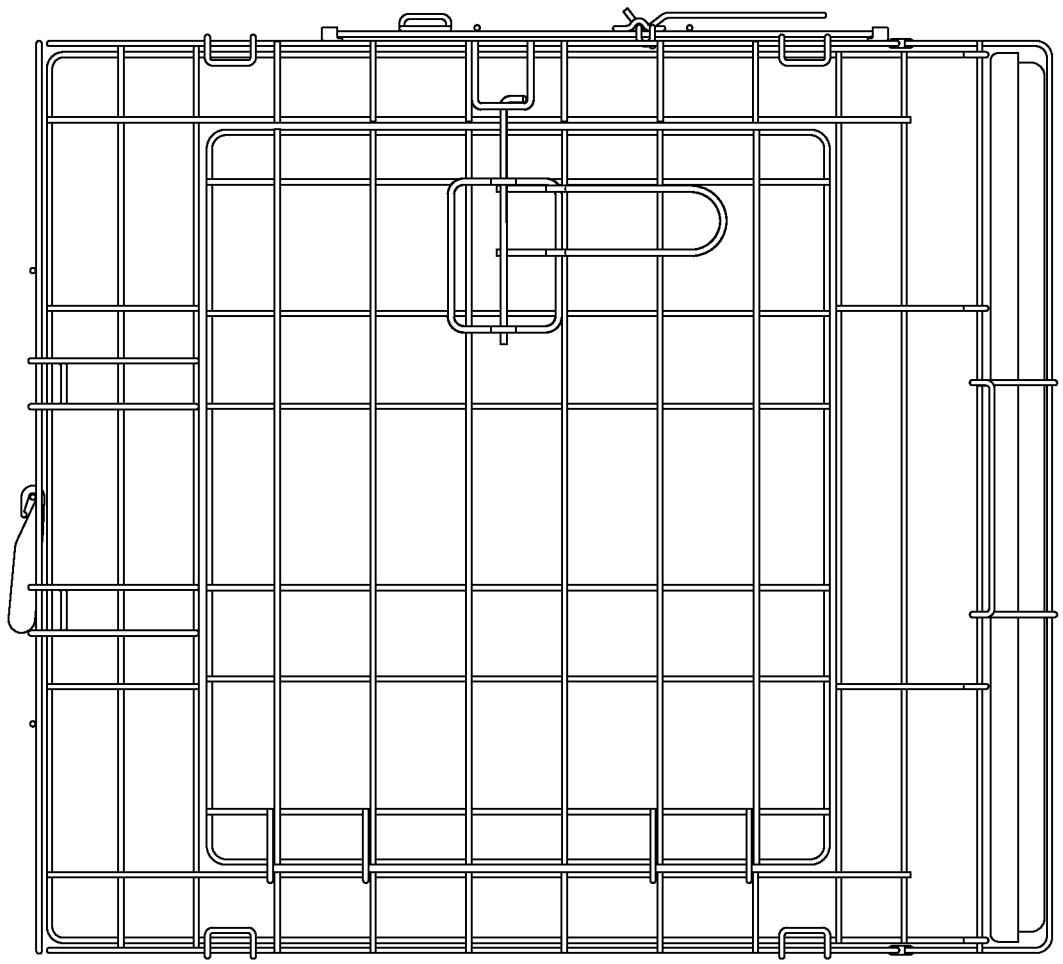
FIG. 25 illustrates a side view of a variation of the multi-pet locking-tail-push-rod pet crate having a swinging door system.

FIG. 25 illustrates a side view of a variation of the multi-pet locking-tail-push-rod pet crate having a swinging door system.

Figure 26A:
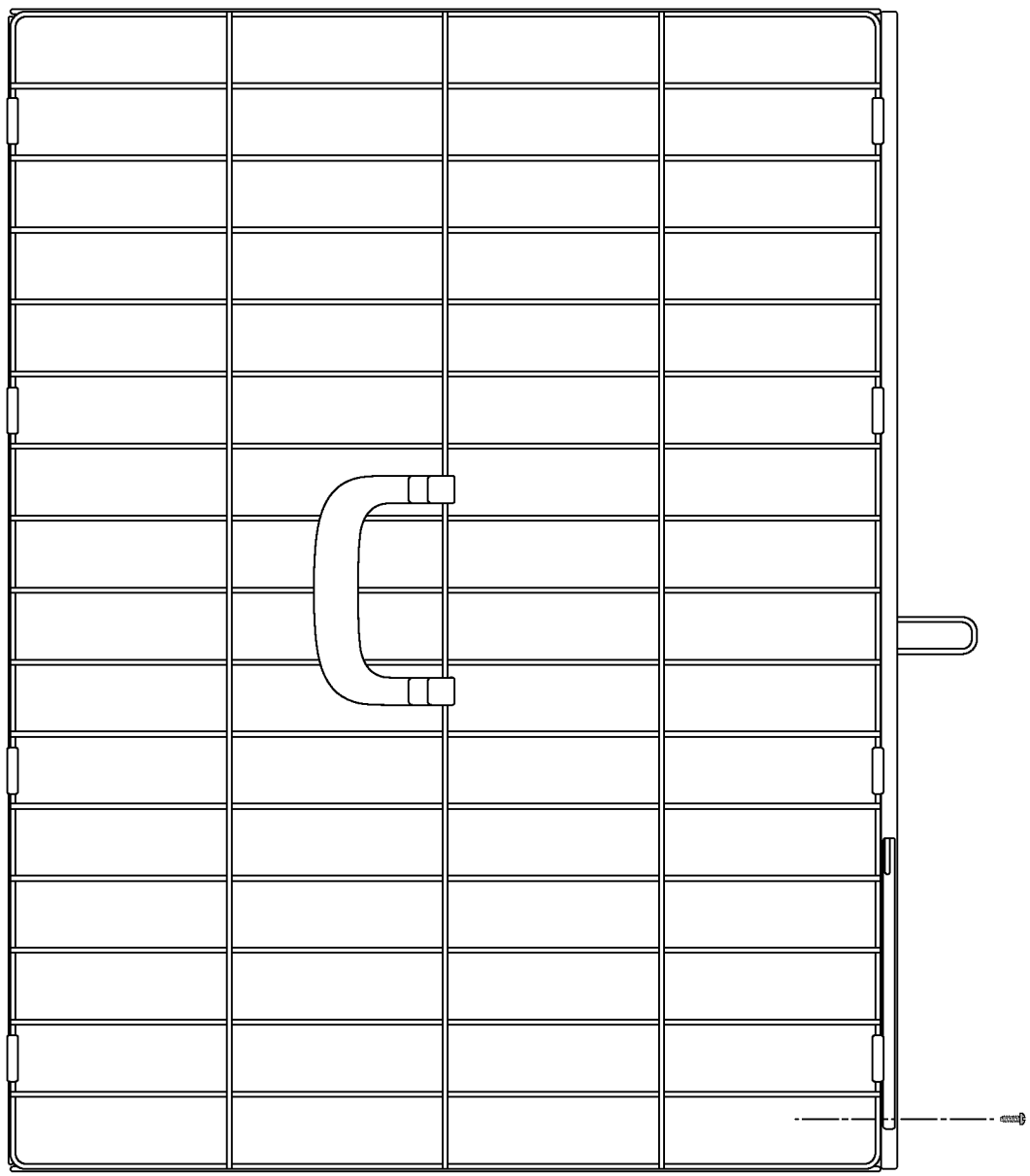
FIG. 26A illustrates a top view of a variation of the mobile-grooming-tool-and-poop-bag-retaining handle system and the quick-assembly door-extracting-inserting system.

FIG. 26A illustrates a top view of a variation of mobile-grooming-tool-and-poop-bag-retaining handle system 101 and quick-assembly door-extracting-inserting system 122.

Figure 26B:
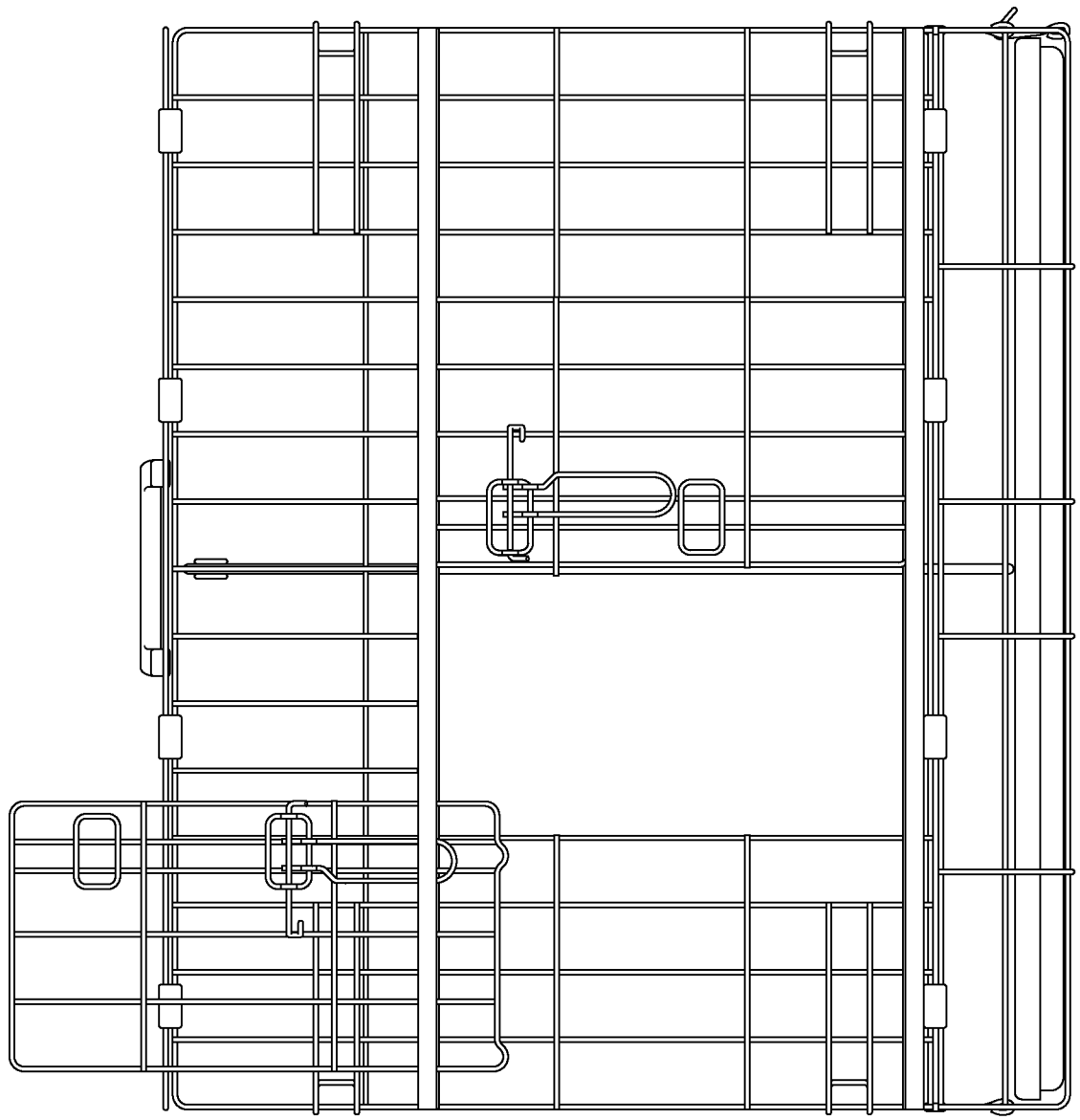
FIG. 26B illustrates a front view of a variation of how to install the multi-pet multi-position-double-door system through one door-extracting-inserting slot.

FIG. 26B illustrates a front view of a variation of how to install multi-pet multi-position-double-door system 126 through one of door extracting-inserting slots 123a and 123b.

Figure 27:
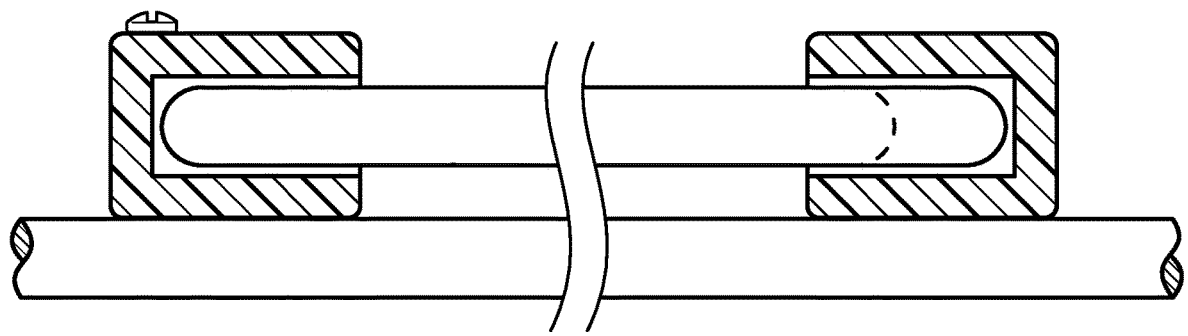
FIG. 27 illustrates a side view of a variation of the Low-friction door-corner-recess-arc-rail system.

FIG. 27 illustrates a side view of a variation of low-friction door-corner-recess-arc-rail system 115.

MAJOR ADVANTAGES OF THE INVENTION

The present invention substantially departs from the conventional concepts and designs of the prior art. In doing so, the present invention provides a multi-pet locking-head-and-locking-tail-push-rod pet crate (having: a) Grooming-tool-poop-bag handle system, b) Low-friction door-rail system, c) Quick-assembly door system, and d) Multi-position locking-head-and-locking-tail push-rod system), having many unique and significant features, functions, and advantages, which overcome all the disadvantages of the prior art, as follows:

1) It is an object of the new invention to provide a multi-pet locking-head-and-locking-tail-push-rod pet crate, having multi-grooming-tool-clamping handle channel 104.
   Therefore, the multi-pet locking-head-and-locking-tail-push-rod pet crate:
   a) Can be used as a hook,
      to store multi-grooming tools
      (see FIG. 9E);
   b) Can be used as a hook,
      to store pet toys
      (see FIG. 9E);
   c) Can be used as a hook,
      to hold leashes
      (see FIG. 9E); and
   d) Can be used as a clamp,
      to hold papers and documents
      (see FIG. 9E).
2) It is another object of the new invention to provide a multi-pet locking-head-and-locking-tail-push-rod pet crate, having
   poop-bag-clamping handle clasps 105.
   Therefore, the multi-pet locking-head-and-locking-tail-push-rod pet crate:
   a) Can be used as hooks,
      to securely fasten poop bags to handle bridge 102
      (see FIG. 9F);
   b) Can be used as hooks,
      to store multi-grooming tools
      (see FIG. 9F);
   c) Can be used as hooks,
      to hold pet toys
      (see FIG. 9F); and
   d) Can be used as hooks,
      to hold leashes
      (see FIG. 9F).
3) It is still another object of the new invention to provide a multi-pet locking-head-and-locking-tail-push-rod pet crate, having
   first and second door openings 112a and 112b.
   Therefore, the multi-pet locking-head-and-locking-tail-push-rod pet crate:
   a) Can be locked in multiple positions,
      to allow multiple pets to enter and exit
      (see FIG. 3B, FIG. 3C, FIG. 3D, and FIG. 3E,);
   b) Can be locked in multiple positions,
      to allow pets of various sizes to enter and exit
      (see FIG. 3B, FIG. 3C, FIG. 3D, and FIG. 3E,);
   c) Can be locked in multiple positions,
      to separately allow access to multiple pet-containing compartments
      (see FIG. 8A, and FIG. 8B,); and
   d) Can be locked in multiple positions,
      to provide security to multiple pets
      (see FIG. 8A, and FIG. 8B,).
4) It is a further object of the new invention to provide a multi-pet locking-head-and-locking-tail-push-rod pet crate, having
   first and second movable crate dividers 113a and 113b.
   Therefore, the multi-pet locking-head-and-locking-tail-push-rod pet crate:
   a) Can create multiple pet-containing compartments,
      to accommodate multiple pets
      (see FIG. 8A and FIG. 8B);
   b) Can provide separation to pets,
      to keep pets safe from each other
      (see FIG. 8A and FIG. 8B);
   c) Can create multiple sized pet-containing compartments,
      to accommodate pet growth from puppy to adult stage; and
   d) Can create multiple sized pet-containing compartments,
      to accommodate large and small pets simultaneously.
5) It is an even further object of the new invention to provide a multi-pet locking-head-and-locking-tail-push-rod pet crate, having
   a slanted urine-storing-gutter tray 114a.
   Therefore, the multi-pet locking-head-and-locking-tail-push-rod pet crate:
   a) Can drain urine into urine-storing-gutters 114b,
      to keep slanted urine-storing-gutter tray 114a dry
      (see FIG. 12A and FIG. 12B);
   b) Can comfortably accommodate pets,
      to allow pets to sit, stand, play, rest and sleep thereon
      (see FIG. 12A and FIG. 12B);
   c) Can conveniently keep pets away and not on their urine,
      to keep pets dry; and
   d) Can conveniently keep pets away and not on their urine,
      to prevent pets from getting diseases and infections caused by their own urine.
6) It is still another object of the new invention to provide a multi-pet locking-head-and-locking-tail-push-rod pet crate, having
   urine-storing gutters 114b.
   Therefore, the multi-pet locking-head-and-locking-tail-push-rod pet crate:
   a) Can store urine run-off from slanted urine-storing-gutter tray 114a,
      to keep slanted urine-storing-gutter tray 114a dry
      (see FIG. 12A and FIG. 12B);
   b) Can conveniently keep pets away and not on their urine,
      to keep pets dry
      (see FIG. 12A and FIG. 12B);
   c) Can conveniently keep pets away and not on their urine,
      to prevent pets from getting diseases and infections caused by their own urine
      (see FIG. 12A and FIG. 12B); and
   d) Can allow quick and easy cleaning,
      to help save on maintenance time.
7) It is yet another object of the new invention to provide a multi-pet locking-head-and-locking-tail-push-rod pet crate, having
   gutter ridges 114c.
   Therefore, the multi-pet locking-head-and-locking-tail-push-rod pet crate:

a) Can support a pet's paws while stepping upon,
to help pets to be comfortable and safe
(see FIG. 12A and FIG. 12B);
b) Can conveniently keep pets away and not on their urine,
to keep pets dry;
c) Can provide protrusions and recesses for urine to flow therein,
to separate urine from pet's area
(see FIG. 12A and FIG. 12B); and
d) Can prevent pets from submersion in urine,
to avoid infections and disease.

8) It is still yet another object of the new invention to provide a multi-pet locking-head-and-locking-tail-push-rod pet crate, having
top low-friction rail 116.
Therefore, the multi-pet locking-head-and-locking-tail-push-rod pet crate:
 a) Can slidably secure first and second auto-indexing multi-position doors 127*a* and 127*b*,
  to prevent cage rattling during transport
  (see FIG. 7A. FIG. 7B and FIG. 7E);
 b) Can provide low-friction surfaces,
  to enable easy sliding motions of first and second auto-indexing multi-position doors 127*a* and 127*b*
  (see FIG. 7A. FIG. 7B and FIG. 7E);
 c) Can provide top low-friction rail arcs 117*a*, 117*b*, and 117*c* to allow easy sliding motions of first and second auto-indexing multi-position doors 127*a* and 127*b*,
  to make operation easier
  (see FIG. 7E); and
 d) Can provide top low-friction rail arcs 117*a*, 117*b*, and 117*c*,
  to maintain minimum surface contact, for minimum friction
  (see FIG. 7E).

9) It is still yet another object of the new invention to provide a multi-pet locking-head-and-locking-tail-push-rod pet crate, having
top low-friction rail arcs 117*a*, 117*b*, and 117*c*.
Therefore, the multi-pet locking-head-and-locking-tail-push-rod pet crate:
 a) Can reduce surface contact, thereby lowering friction between top low-friction rail 116 and first and second auto-indexing multi-position doors 127*a* and 127*b*,
  to make operation easier
  (see FIG. 7E);
 b) Can slidably secure the tops of first and second auto-indexing multi-position doors 127*a* and 127*b*,
  to provide a secure channel for first and second auto-indexing multi-position doors 127*a* and 127*b* to easily slide horizontally
  (see FIG. 7E);
 c) Can slidably secure the tops of first and second auto-indexing multi-position doors 127*a* and 127*b*,
  to prevent crate rattling during transport
  (see FIG. 7E); and
 d) Can provide a tall rear wall of top low-friction rail arc 117*a*,
  to minimize potential fur and paws being caught in top low-friction rail 116.

10) It is still yet another object of the new invention to provide a multi-pet locking-head-and-locking-tail-push-rod pet crate, having
a bottom low-friction rail 118.
Therefore, the multi-pet locking-head-and-locking-tail-push-rod pet crate:
 a) Can slidably secure first and second auto-indexing multi-position doors 127*a* and 127*b*,
  to prevent cage rattling during transport
  (see FIG. 7C, FIG. 7F and FIG. 7H);
 b) Can provide low-friction surfaces,
  to enable easy sliding motions of first and second auto-indexing multi-position doors 127*a* and 127*b*
  (see FIG. 7C, FIG. 7F and FIG. 7H);
 c) Can provide bottom low-friction rail arcs 119*a*, 119*b*, and 119*c* to allow easy sliding motions of first and second auto-indexing multi-position doors 127*a* and 127*b*
  to make operation easier
  (see FIG. 7F and FIG. 7H); and
 d) Can provide a tall rear wall of bottom low-friction rail arc 119*a*,
  to minimize potential fur and paws being caught in bottom low-friction rail 118.

11) It is still yet another object of the new invention to provide a multi-pet locking-head-and-locking-tail-push-rod pet crate, having
bottom low-friction rail arcs 119*a*, 119*b*, and 119*c*.
Therefore, the multi-pet locking-head-and-locking-tail-push-rod pet crate:
 a) Can reduce surface contact, thereby lowering friction between bottom low-friction rail 118 and first and second auto-indexing multi-position doors 127*a* and 127*b*,
  to make operation easier
  (see FIG. 7C, FIG. 7F and FIG. 7H);
 b) Can slidably secure the bottoms of first and second auto-indexing multi-position doors 127*a* and 127*b*,
  to provide a secure channel for first and second auto-indexing multi-position doors 127*a* and 127*b* to easily slide horizontally
  (see FIG. 7C, FIG. 7F and FIG. 7H);
 c) Can slidably secure the bottoms of first and second auto-indexing multi-position doors 127*a* and 127*b*,
  to prevent crate rattling during transport
  (see FIG. 7C, FIG. 7F and FIG. 7H); and
 d) Can provide a tall rear wall of bottom low-friction rail arc 119*a*,
  to minimize potential fur and paws being caught in bottom low-friction rail 118.

12) It is still yet another object of the new invention to provide a multi-pet locking-head-and-locking-tail-push-rod pet crate, having
multi-position door-corner-glider-locking recesses 120.
Therefore, the multi-pet locking-head-and-locking-tail-push-rod pet crate:
 a) Can horizontally and slantedly lock first and second auto-indexing multi-position door-corner-gliders therein to horizontally and slantedly lock first and second auto-indexing multi-position doors 127*a* and 127*b* in multiple horizontal and slanted positions
  to allow for different door locking configurations
  (see FIG. 6, FIG. 7C, FIG. 7D, FIG. 7F, FIG. 7G and FIG. 7H);
 b) Can allow multiple locked horizontal positions for first and second auto-indexing multi-position doors 127*a* and 127*b*, at multiple locations,
  to allow for different door opening configurations
  (see FIG. 6, FIG. 7C, FIG. 7D, and FIG. 7G);
 c) Can precisely self-adjust each available incremental door position, to make operation easier; and
d) Can make door position adjustments quicker and easier for the user,
to help in ease of use
(see FIG. 6, FIG. 7C, FIG. 7D, and FIG. 7G).
13) It is still yet another object of the new invention to provide a multi-pet locking-head-and-locking-tail-push-rod pet crate, having
door extracting-inserting slots 123a and 123b.
Therefore, the multi-pet locking-head-and-locking-tail-push-rod pet crate:
a) Can quickly assemble first and second auto-indexing multi-position doors 127a and 127b by inserting them therethrough,
to make installation of doors easier
(see FIG. 5A, FIG. 5B, FIG. 5D, and FIG. 5E);
b) Can quickly insert to assemble first and second auto-indexing multi-position doors 127a and 127b,
to allow installation of doors without tools;
(see FIG. 5A, FIG. 5B, FIG. 5D, and FIG. 5E)
c) Can create an access opening to extract first and second auto-indexing multi-position doors 127a and 127b during manufacturing and by the user,
to make operation easier
(see FIG. 5C); and
d) Can create an access opening to extract first and second auto-indexing multi-position doors 127a and 127b during manufacturing and by the user,
to help in disassembly.
14) It is still yet another object of the new invention to provide a multi-pet locking-head-and-locking-tail-push-rod pet crate, having
first and second auto-indexing multi-position door-corner-gliders 128a and 128b.
Therefore, the multi-pet locking-head-and-locking-tail-push-rod pet crate:
a) Can reduce friction to sliding movement of first and second auto-indexing multi-position doors 127a and 127b,
to make opening and closing doors easier
(see FIG. 6, FIG. 7C and FIG. 7F);
b) Can precisely stop door at incremental door positions,
to operation easier
(see FIG. 6 and FIG. 7C);
c) Can provide a precise alignment for multi-position door-locking push-rod tails 134a and 134b with multi-position push-rod-tail-locking wires 135a and 135b, so that locking action requires no user judgment,
to make operation easier
(see FIG. 6 and FIG. 7C);
d) Can eliminate door lubrication maintenance,
to reduce cost and maintenance; and
e) Can provide two equal points of contact and balance for easy sliding movements,
to make opening and closing doors easier
(see FIG. 7C).
15) It is still yet another object of the new invention to provide a multi-pet locking-head-and-locking-tail-push-rod pet crate, having
first and second multi-position door-locking push-rod tails 134a and 134b.
Therefore, the multi-pet locking-head-and-locking-tail-push-rod pet crate:
a) Can horizontally and slantedly lock and self-align positions of first and second auto-indexing multi-position doors 127a and 127b to respectively first and second multi-position push-rod-tail-locking wires 135a and 135b,
to make operation easier
(see FIG. 2A, FIG. 2B, FIG. 2C, FIG. 3A, FIG. 3B, FIG. 3C, FIG. 3D, FIG. 3E, FIG. 3F, FIG. 13A, FIG. 13B, and FIG. 13C);
b) Can lock first and second auto-indexing multi-position doors 127a and 127b to front panel 108e,
to keep pets safe and secure;
c) Can allow first and second auto-indexing multi-position doors 127a and 127b to maintain a closed, locked, or open position when the multi-pet locking-tail-push-rod pet crate, is situated on:
A non-moving, flat house floor;
A non-moving, inclined driveway or other surface;
A moving vehicle floor;
A moving, upwardly inclined vehicle floor; and
A moving, downwardly inclined vehicle floor;
Bumped or pushed by an object;
Shaken by an energetic pet; and
Moved or relocated,
to provide added pet safety and security
(see FIG. 11A and FIG. 11B);
d) Can allow minimal materials to manufacture,
to reduce production costs; and
e) Can allow minimal manufacturing resources,
to save labor, time, material, and money.
16) It is still yet another object of the new invention to provide a multi-pet locking-head-and-locking-tail-push-rod pet crate, having
First and second multi-position push-rod-tail-locking wires 135a and 135b.
Therefore, the multi-pet locking-head-and-locking-tail-push-rod pet crate:
a) Can provide multiple locations to which to horizontally and slantedly lock first and second multi-position door-locking push-rod tails 134a and 134b,
to allow for options in horizontal and slanted configuration of doors
(see FIG. 2A, FIG. 2B, FIG. 2C, FIG. 13A, FIG. 13B, and FIG. 13C);
b) Can provide safety and security to pets,
to keep pet safe and secure;
c) Can provide a locking point for first and second auto-indexing multi-position doors 127a and 127b,
to keep doors locked when moving
(see FIG. 2A, FIG. 2B, FIG. 2C, FIG. 11A, FIG. 11B, FIG. 13A, FIG. 13B, and FIG. 13C); and
d) Can give the multi-pet locking-head-and-locking-tail-push-rod pet crate additional strength,
to keep the crate from collapsing.

What is claimed is:

1. A multi-position-double-locking-head-and-locking-tail-push-rod pet crate comprising:
a handle bridge;
a plurality of handle stabilizers,
said handle bridge molded to said handle stabilizers;
a multi-grooming-tool-clamping handle channel
molded inside said handle bridge
for insertably containing a plurality of grooming tools and
for being used as a hook or as a clamp;
a plurality of poop-bag-clamping handle clasps
respectively molded in said handle stabilizers
for securely fastening poop bags to said handle bridge and for being used as hooks;
a plurality of handle hooks,
said handle stabilizers respectively molded to said handle hooks;
top, bottom, left, right, front, and rear panels,
said handle hooks respectively hooked on said top panel;
a plurality of panel-locking hooks
respectively hooked on said top, said left, said right, said front, and said rear panels;
a panel-folding clamp
clamped on said top, said bottom, said left, said right, said front, and said rear panels;
a plurality of panel-coupling clamps
respectively clamped on said top, said bottom, said left, said right, said front, and said rear panels;
at least one movable crate divider
respectively disposed inside said top, said bottom, said left, said right, said front, and said rear panels
for creating multiple pet-containing compartments;
a slanted urine-storing tray
disposed on said bottom panel
for conveniently keeping pets away and not on urine;
a plurality of urine-storing gutters
respectively molded around said slanted urine-storing-gutter tray
for storing urine run-off from said slanted urine-storing-gutter tray and
for conveniently keeping pets away and not on urine;
a plurality of gutter ridges
respectively molded inside said urine-storing gutters
for supporting pet paws while stepping upon and
for conveniently keeping pets away and not on urine;
a top low-friction rail
welded to said front panel;
a bottom low-friction rail
welded to said front panel;
a plurality of multi-position door-corner-glider-locking recesses
respectively formed in said bottom low-friction rail;
a plurality of door extracting-inserting slots
respectively formed in said top low-friction rail;
first and second auto-indexing multi-position doors
conveniently inserted through said door extracting-inserting slots, and
respectively and slidably inserted between said top low-friction rail and said bottom low-friction rail;
first and second auto-indexing multi-position door-corner-gliders
respectively cast to said first and said second auto-indexing multi-position doors
for horizontally or slantedly being locked in said multi-position door-corner-glider-locking recesses
to horizontally or slantedly lock said first and said second auto-indexing multi-position doors in a plurality of horizontal or slanted and stationary or moving positions, and
for precisely or conveniently adjusting a plurality of horizontal or slanted and stationary or moving positions of said first and said second auto-indexing multi-position doors;
first and second push-rod hinges
respectively welded to said first and said second auto-indexing multi-position doors;
first and second push-rod levers
respectively welded to said first and said second push-rod hinges;
first and second push-rods
respectively and rotatably attached to said first and said second push-rod hinges;
first and second door-locking push-rod heads
respectively cast to said first and said second push-rods;
first and second push-rod-head-locking rings
respectively welded to said first and said second auto-indexing multi-position doors;
first and second multi-position door-locking push-rod tails
respectively cast to said first and said second push-rods
for horizontally or slantedly locking and aligning said first and said second auto-indexing multi-position doors to said front panel
to horizontally or slantedly lock said first and said second auto-indexing multi-position doors in a plurality of horizontal or slanted and stationary or moving positions, and
for precisely or conveniently adjusting a plurality of horizontal or slanted and stationary or moving positions of said first and said second auto-indexing multi-position doors;
first and second multi-position push-rod-tail-locking wires
respectively welded to said front panel
for providing a plurality of locations to which to horizontally or slantedly lock
said first and said second multi-position door-locking push-rod tails
to provide a plurality of horizontal or slanted locking locations for said first and said second auto-indexing multi-position doors.

2. The multi-position-double-locking-head-and-locking-tail-push-rod pet crate of claim 1,
further comprising
a plurality of slot-screw holes,
a plurality of door-blocking slot screws,
a central doorstop, and
at least one divider,
wherein
said slot-screw holes
respectively are drilled in said top low-friction rail
for receiving said door-blocking slot screws therethrough,
said door-blocking slot screws
respectively are screwed into said slot-screw holes
for preventing said first and said second auto-indexing multi-position doors from vertical extraction through said door extracting-inserting slots,
said central doorstop
is welded to said bottom low-friction rail
for preventing further movement of said first and said second auto-indexing multi-position doors,
said at least one divider
is respectively disposed inside said top, said bottom, said left, said right, said front, and said rear panels
for creating multiple pet-containing compartments.

3. The multi-position-double-locking-head-and-locking-tail-push-rod pet crate of claim 1,
wherein
said top low-friction rail has a plurality of top low-friction rail arcs cast therein and
said bottom low-friction rail has a plurality of bottom low-friction rail arcs cast therein,
wherein
said top low-friction rail arcs and
said bottom low-friction rail arcs each have a C shape
for reducing contact and thereby lowering friction between
said top low-friction rail,
said bottom low-friction rail,
said first auto-indexing multi-position door, and
said second auto-indexing multi-position door.

4. The multi-position-double-locking-head-and-locking-tail-push-rod pet crate of claim 1,
wherein
said top low-friction rail and
said bottom low-friction rail
each are formed into an I shape with a U-shaped cross-section.

5. The multi-position-double-locking-head-and-locking-tail-push-rod pet crate of claim 1,
wherein
said multi-position door-corner-glider-locking recesses
each are formed into a cup shape, and
said first and second auto-indexing multi-position door-corner-gliders
each are formed into a U shape.

6. The multi-position-double-locking-head-and-locking-tail-push-rod pet crate of claim 1,
wherein
said handle bridge
is made of plastic material,
said handle stabilizers
each are made of plastic material.

7. The multi-position-double-locking-head-and-locking-tail-push-rod pet crate of claim 1,
wherein
said top low-friction rail
is made of metallic material,
said bottom low-friction rail
is made of metallic material.

8. The multi-position-double-locking-head-and-locking-tail-push-rod pet crate of claim 1,
wherein
said first and said second auto-indexing multi-position doors
each are made of metallic material.

9. The multi-position-double-locking-head-and-locking-tail-push-rod pet crate of claim 1,
wherein
said multi-position-double-locking-head-and-locking-tail-push-rod pet crate
is made of plastic material, metallic material, or plastic and metallic materials.

10. A multi-position-double-locking-head-and-locking-tail-push-rod pet crate comprising:
a handle bridge;
a plurality of handle stabilizers,
said handle bridge molded to said handle stabilizers;
a multi-grooming-tool-clamping handle channel
molded inside said handle bridge;
a plurality of poop-bag-clamping handle clasps
respectively molded in said handle stabilizers;
a plurality of handle hooks,
said handle stabilizers respectively molded to said handle hooks;
top, bottom, left, right, front, and rear panels,
said handle hooks respectively hooked on said top panel;
a plurality of panel-locking hooks
respectively hooked on said top, said left, said right, said front, and said rear panels;
a panel-folding clamp
clamped on said top, said bottom, said left, said right, said front, and said rear panels;
a plurality of panel-coupling clamps
respectively clamped on said top, said bottom, said left, said right, said front, and said rear panels;
a urine-storing tray
disposed on said bottom panel
for conveniently keeping pets away and not on urine;
a top low-friction rail
welded to said front panel;
a bottom low-friction rail
welded to said front panel;
a plurality of multi-position door-corner-glider-locking recesses
respectively formed in said bottom low-friction rail;
first and second multi-position doors
respectively and slidably inserted between said top low-friction rail and said bottom low-friction rail;
first and second multi-position door-corner-gliders
respectively cast to said first and said second multi-position doors
for horizontally or slantedly being locked in said multi-position door-corner-glider-locking recesses
to horizontally or slantedly lock said first and said second multi-position doors in a plurality of horizontal or slanted and stationary or moving positions, and
for precisely or conveniently adjusting a plurality of horizontal or slanted and stationary or moving positions of said first and said second multi-position doors;
first and second push-rod hinges
respectively welded to said first and said second multi-position doors;
first and second push-rod levers
respectively welded to said first and said second push-rod hinges;
first and second push-rods
respectively and rotatably attached to said first and said second push-rod hinges;
first and second door-locking push-rod heads
respectively cast to said first and said second push-rods;
first and second push-rod-head-locking rings
respectively welded to said first and said second multi-position doors;
first and second multi-position door-locking push-rod tails
respectively cast to said first and said second push-rods
for horizontally or slantedly locking and aligning said first and said second multi-position doors to said front panel
to horizontally or slantedly lock said first and said second multi-position doors in a plurality of horizontal or slanted and stationary or moving positions, and
for precisely or conveniently adjusting a plurality of horizontal or slanted and stationary or moving positions of said first and said second multi-position doors;
first and second multi-position push-rod-tail-locking wires
respectively welded to said front panel
for providing a plurality of locations to which to horizontally or slantedly lock said first and said second multi-position door-locking push-rod tails to provide a plurality of horizontal or slanted locking locations for said first and said second multi-position doors.

11. The multi-position-double-locking-head-and-locking-tail-push-rod pet crate of claim 10,
further comprising
a central doorstop and
at least one divider,
wherein
said central doorstop
is welded to said bottom low-friction rail
for preventing further movement of said first and said second multi-position doors,
said at least one divider
is respectively disposed inside said top, said bottom, said left, said right, said front, and said rear panels
for creating multiple pet-containing compartments.

12. The multi-position-double-locking-head-and-locking-tail-push-rod pet crate of claim 10,
wherein
said top low-friction rail
has a plurality of top low-friction rail arcs cast therein and
said bottom low-friction rail
has a plurality of bottom low-friction rail arcs cast therein,
wherein
said top low-friction rail arcs and
said bottom low-friction rail arcs
each have a C shape
for reducing contact and thereby lowering friction between
said top low-friction rail,
said bottom low-friction rail,
said first multi-position door, and
said second multi-position door.

13. The multi-position-double-locking-head-and-locking-tail-push-rod pet crate of claim 10,
wherein
said top low-friction rail and
said bottom low-friction rail
each are formed into an I shape with a U-shaped cross-section.

14. The multi-position-double-locking-head-and-locking-tail-push-rod pet crate of claim 10,
wherein
said multi-position door-corner-glider-locking recesses
each are formed into a cup shape, and
said first and second multi-position door-corner-gliders
each are formed into a U shape.

15. The multi-position-double-locking-head-and-locking-tail-push-rod pet crate of claim 10,
wherein
said handle bridge
is made of plastic material,
said handle stabilizers
each are made of plastic material.

16. The multi-position-double-locking-head-and-locking-tail-push-rod pet crate of claim 10,
wherein
said top low-friction rail
is made of metallic material,
said bottom low-friction rail
is made of metallic material.

17. The multi-position-double-locking-head-and-locking-tail-push-rod pet crate of claim 10,
wherein
said first and said second multi-position doors
each are made of metallic material.

18. The multi-position-double-locking-head-and-locking-tail-push-rod pet crate of claim 10,
wherein
said multi-position-double-locking-head-and-locking-tail-push-rod pet crate
is made of plastic material, metallic material, or plastic and metallic materials.

19. A multi-position-double-locking-head-and-locking-tail-push-rod pet crate, comprising:
a handle bridge;
a plurality of handle stabilizers,
said handle bridge molded to said handle stabilizers;
a plurality of handle hooks,
said handle stabilizers respectively molded to said handle hooks;
top, bottom, left, right, front, and rear panels,
said handle hooks respectively hooked on said top panel;
a plurality of panel-locking hooks
respectively hooked on said top, said left, said right, said front, and said rear panels;
a panel-folding clamp
clamped on said top, said bottom, said left, said right, said front, and said rear panels;
a plurality of panel-coupling clamps
respectively clamped on said top, said bottom, said left, said right, said front, and said rear panels;
a urine-storing tray
disposed on said bottom panel;
a top low-friction rail
welded to said front panel;
a bottom low-friction rail
welded to said front panel;
first and second multi-position doors
respectively and slidably inserted between said top low-friction rail and said bottom low-friction rail;
first and second multi-position door-corner-gliders
respectively cast to said first and said second multi-position doors;
first and second push-rod hinges
respectively welded to said first and said second multi-position doors;
first and second push-rod levers
respectively welded to said first and said second push-rod hinges;
first and second push-rods
respectively and rotatably attached to said first and said second push-rod hinges;
first and second door-locking push-rod heads
respectively cast to said first and said second push-rods;
first and second push-rod-head-locking rings
respectively welded to said first and said second multi-position doors;
first and second multi-position door-locking push-rod tails
respectively cast to said first and said second push-rods
for horizontally or slantedly locking and aligning said first and said second multi-position doors to said front panel
to horizontally or slantedly lock said first and said second multi-position doors in a plurality of horizontal or slanted and stationary or moving positions, and for precisely or conveniently adjusting a plurality of horizontal or slanted and stationary or moving positions of said first and said second multi-position doors.

20. The multi-position-double-locking-head-and-locking-tail-push-rod pet crate of claim 10,
further comprising
a central doorstop and
at least one divider,
wherein
said central doorstop
is welded to said bottom low-friction rail
for preventing further movement of said first and said second multi-position doors,
said at least one divider
is respectively disposed inside said top, said bottom, said left, said right, said front, and said rear panels
for creating multiple pet-containing compartments.

* * * * *